(12) United States Patent
Howard et al.

(10) Patent No.: US 11,563,233 B1
(45) Date of Patent: Jan. 24, 2023

(54) CURVED BATTERY-PACK DEVICES AND ACCESSORIES

(71) Applicant: META PLATFORMS TECHNOLOGIES, LLC, Menlo Park, CA (US)

(72) Inventors: Jason Howard, Alpharetta, GA (US); Bryan W. Fan, San Francisco, CA (US); Jeffrey Taylor Stellman, Seattle, WA (US); Karthik Kadirvel, San Jose, CA (US); Jonathan Longhitano, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/818,614

(22) Filed: Mar. 13, 2020

Related U.S. Application Data

(60) Provisional application No. 62/901,082, filed on Sep. 16, 2019.

(51) Int. Cl.
*H01M 50/10* (2021.01)
*H01M 10/04* (2006.01)
*G02B 27/01* (2006.01)
*H01M 50/20* (2021.01)

(52) U.S. Cl.
CPC .... *H01M 10/0436* (2013.01); *G02B 27/0176* (2013.01); *H01M 50/10* (2021.01); *H01M 50/20* (2021.01); *H01M 2220/30* (2013.01)

(58) Field of Classification Search
CPC .. H01M 10/0436; H01M 50/10; H01M 50/20; H01M 2220/30
See application file for complete search history.

(56) References Cited

U.S. PATENT DOCUMENTS

| | | | |
|---|---|---|---|
| 1,935,790 A | 11/1933 | Vance | |
| 9,385,396 B2 | 7/2016 | Goh et al. | |
| 9,837,682 B1 * | 12/2017 | Nikkhoo | H01M 4/78 |
| 10,297,868 B2 | 5/2019 | Choi et al. | |
| 2010/0170022 A1 * | 7/2010 | Griffiths | A42B 3/145 2/6.1 |
| 2010/0330408 A1 | 12/2010 | Yoon et al. | |

(Continued)

OTHER PUBLICATIONS

Wikipedia, "LG G Flex", URL: https://en.wikipedia.org/wiki/LG_G_Flex, as accessed on Jun. 19, 2020, 2 pages.

(Continued)

*Primary Examiner* — Jane J Rhee
(74) *Attorney, Agent, or Firm* — Greenberg Traurig, LLP

(57) ABSTRACT

A wearable battery-pack accessory may include (1) one or more curved batteries, (2) charging circuitry that charges the one or more curved batteries, (3) supplying circuitry that supplies power to a connected external computing device, and (4) an outer housing including a curved surface shaped to conform to a portion of a wearer's body. A head-mounted display system may include (1) a head-mounted display, (2) a strap that is coupled to the head-mounted display and wraps around the back of a user's head when the user is wearing the head-mounted display, and (3) a battery-pack accessory detachably coupled to the strap. Various other apparatus, systems, and methods are also disclosed.

20 Claims, 51 Drawing Sheets

(56) References Cited

U.S. PATENT DOCUMENTS

| | | | |
|---|---|---|---|
| 2011/0097615 A1* | 4/2011 | Goh | H01M 50/105 |
| | | | 29/623.2 |
| 2013/0083496 A1 | 4/2013 | Franklin et al. | |
| 2015/0241917 A1* | 8/2015 | Seok | A61B 5/681 |
| | | | 361/679.03 |
| 2016/0043363 A1 | 2/2016 | Tajima et al. | |
| 2017/0338470 A1* | 11/2017 | Inoue | H01M 4/364 |

OTHER PUBLICATIONS

Magrath, Lesley Ribble, "Apparatus, System, and Method for Counter-Balancing the Weight of Head-Mounted Displays", U.S. Appl. No. 15/495,733, filed Apr. 24, 2017, 49 pages.

Lang, Ben, "HoloLens 2 Specs Reveal 2-3 Hour 'Active' Battery Life, Optional Top Strap, & More", URL: https://www.roadtovr.com/hololens-2-specs-resolution-field-of-view-battery-life/, Feb. 24, 2019, 5 pages.

Non-Final Office Action received for U.S. Appl. No. 16/818,611 dated Aug. 19, 2021, 22 pages.

* cited by examiner

CURVED BATTERY-PACK DEVICES AND ACCESSORIES

CROSS REFERENCE TO RELATED APPLICATION

This application claims the benefit of U.S. Provisional Application No. 62/901,082, filed 16 Sep. 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
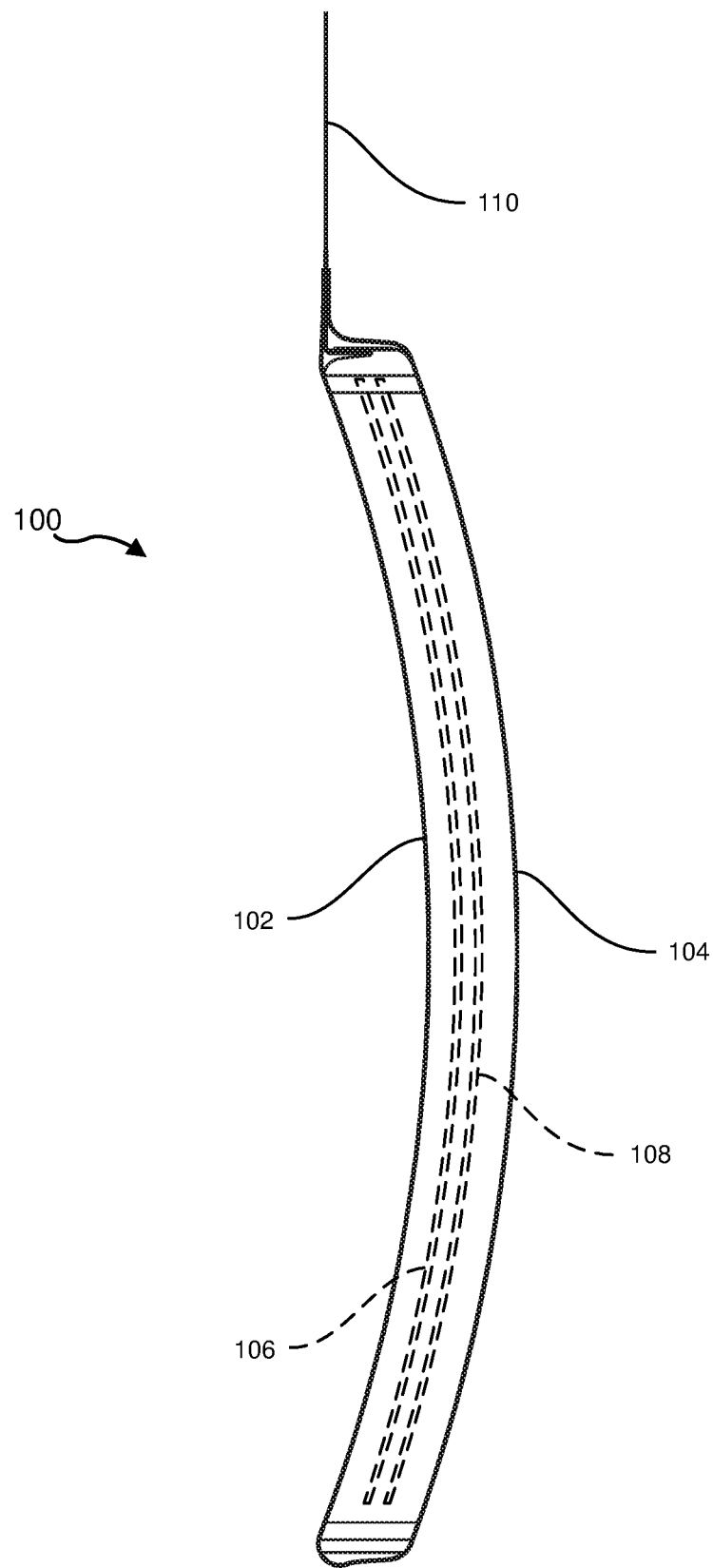
FIGS. 1 and 2 are illustrations of an exemplary curved battery cell, according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives.

DETAILED DESCRIPTION OF EXEMPLARY EMBODIMENTS

Batteries used in consumer electronic devices, such as lithium-ion batteries, have traditionally been cylindrical or cuboidal in shape. For many electronic devices, especially head-mounted and wearable devices, these traditional shapes may lead to constrained battery placement, larger than ideal product size and weight, and/or poor overall product ergonomics.

The present disclosure is generally directed to designs for curved batteries (e.g., curved battery cells, curved battery modules, and/or curved battery packs) and various designs and configurations for incorporating curved batteries into wearable devices (e.g., head-mounted devices or battery-pack accessories). Curved batteries, especially curved batteries whose curvatures are modelled using a series of splines that approximate the curvatures of one or more users' bodies, may enable wearable devices to be shaped, tuned, and/or customized to better fit individual users or particular populations of users. Curved batteries may be more suitably located within wearable devices, which may enable curved batteries to be better balanced within the wearable devices and/or used to counterbalance other elements. For example, a head-mounted device may incorporate well balanced curved batteries located on each side of a user's head. In another embodiment, one or more curved batteries shaped to conform to the back of a user's head may be used to counterbalance a head-mounted display located near the front of the user's head. In some embodiments, a battery pack accessory for use with a head-mounted display may incorporate one or more curved batteries for additional power.

In some embodiments, a battery's curvature may be modelled using a series of splines (e.g., curves with non-uniform radii) that approximate a complex curvature of one or more users' bodies rather than a single radius of curvature. Spline curvatures may enable the shape of a battery to better approximate or conform to the shape of a user's body or head. The curved batteries disclosed herein may include a single cell or multiple cells (e.g., a single lithium-ion cell or multiple lithium-ion cells). In some embodiments, a curved battery or battery pack may consist of (1) a single spline curved cell, (2) multiple cells, where each cell has the same or similar spline curve, or (3) multiple cells, where the spline curves differ among at least one of the cells. In some embodiments, the curved batteries disclosed herein may be customized or tuned to a specific person, an average person, or a specific subset of people.

Features from any of the embodiments described herein may be used in combination with one another in accordance with the general principles described herein. These and other embodiments, features, and advantages will be more fully understood upon reading the following detailed description in conjunction with the accompanying drawings.

The following will provide, with reference to FIGS. 1-6, detailed descriptions of example curved batteries. Detailed descriptions of example head-mounted display systems that may integrate embodiments of these curved batteries will be provided in connection with FIGS. 7-18. In addition, detailed descriptions of an example curved battery-pack accessory having curved batteries will be provided in connection with FIGS. 19-31. The descriptions corresponding to FIGS. 32-34 will provide examples of systems implementing embodiments of the curved battery-pack accessory presented herein. The descriptions corresponding to FIGS. 35 and 36 will provide examples of wearable devices that may incorporate embodiments of the curved batteries described herein. The discussions corresponding to FIGS. 37-41 will provide examples of methods for manufacturing, assembling, configuring, and/or using curved batteries and curved battery-pack accessories presented herein. The descriptions corresponding to FIGS. 42-44 will provide examples of non-uniform curves that may be used to model the curved batteries presented herein. Finally, with reference to FIGS. 45-51, the following will provide detailed descriptions of various artificial-reality systems and components that may implement embodiments of the present disclosure.

Figure 2:
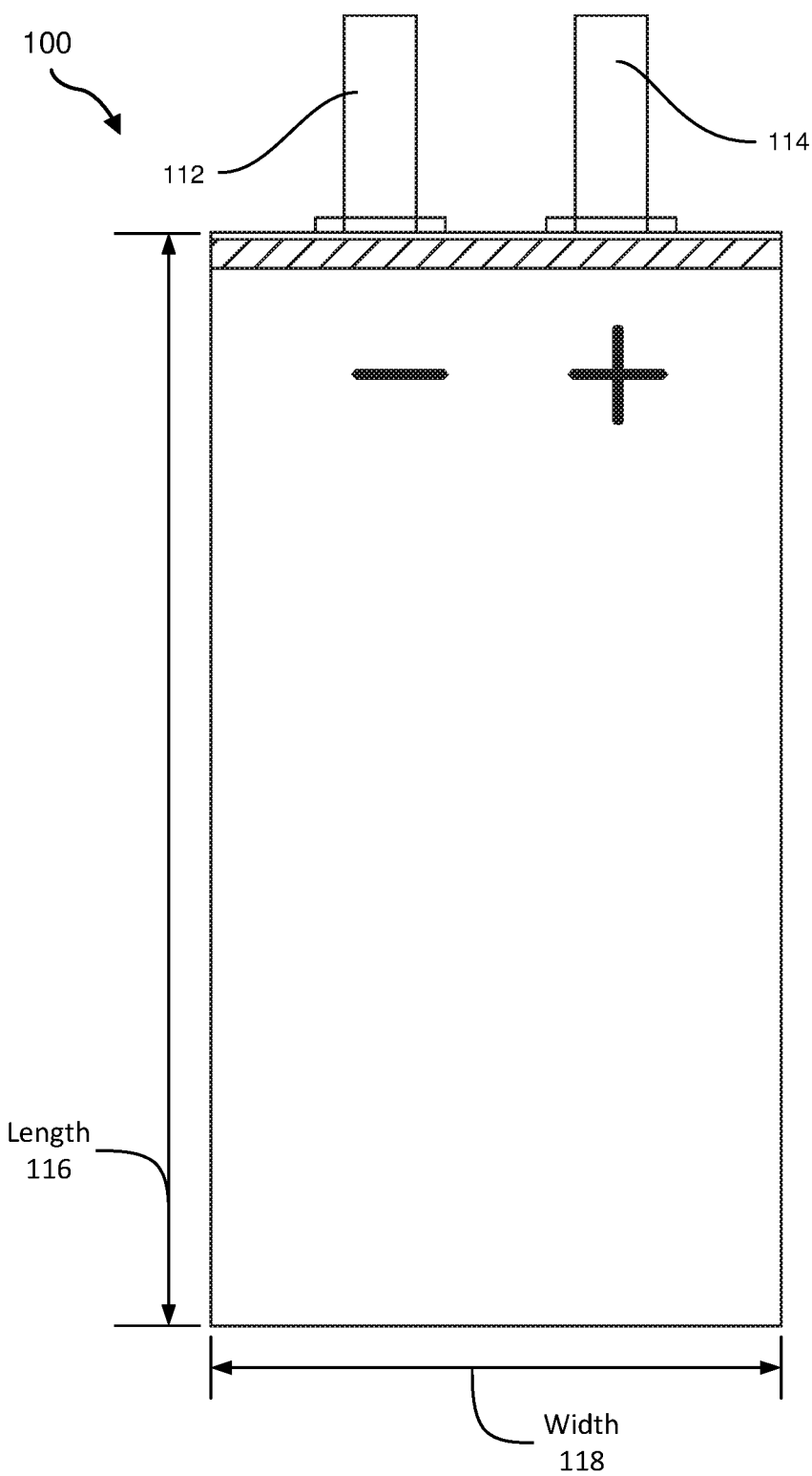

FIGS. 1 and 2 are illustrations of an exemplary curved battery cell 100, according to some embodiments. As shown, curved battery cell 100 may have a curved inner surface 102 and a curved outer surface 104. In at least one embodiment, surface 102 and surface 104 may be substantially parallel to each other. In some embodiments, one or more of curved inner surface 102 and curved outer surface 104 may conform to a curve having a uniform or constant radius of curvature. Additionally or alternatively, one or more of curved inner surface 102 and curved outer surface 104 may conform to a curve having a non-uniform or varying radius of curvature. In some embodiments, surfaces 102 and 104 may have radii of curvature in the range of 90 mm-120 mm (e.g., 95 mm or 110 mm). In one embodiment, surfaces 102 and 104 may have 95 mm and 100 mm radii, respectively. In other embodiments, surfaces 102 and 104 may have 110 mm and 115 mm radii, respectively. In some embodiments, curved inner surface 102 and/or curved outer surface 104 may be spline surfaces. In some examples, the term "spline surface" may refer to any curved surface that may be modelled or represented using one or more spline curves. In some examples, the term "spline curve" may refer to an approximating curve that passes near one or more control points. Additionally or alternatively, the term "spline curve" may refer to an interpolating curve that passes through one or more control points. In some examples, the term "spline curve" may refer to a complex or piecewise polynomial curve constructed from two or more curve segments.

In some examples, curved battery cell 100 may be formed from multiple planar electrodes (e.g., electrodes 106 and 108) and separators in a stacked configuration. As shown, curved battery cell 100 may have terminals 110 (e.g., a negative terminal 112 and a positive terminal 114). Curved battery cell 100 may have any suitable length, width, or thickness and/or may be optimized for a specific use case of curved battery cell 100. In some embodiments, curved battery cell 100 may have a length 116 in the range of 60 mm-100 mm or in the range of 70 mm-80 mm, a width 118 in the range of 35 mm-45 mm (e.g., approximately 39.50 mm), and a thickness in the range of 4-7 mm. In some examples, curved battery cell 100 may be a curved lithium-ion cell.

In some embodiments, curved battery cell 100 may be constructed to have a rigid and/or substantially rigid structure from the time of manufacture. Alternatively, curved battery cell 100 may be constructed to have a flexible and/or substantially flexible structure. In some embodiments, multiple rigid curved cells may be combined to give a curved battery a flexible and/or substantially flexible structure. In some embodiments, the multiple rigid curved cells may be connected by a flexible connector (e.g., a hinging connector). By having a non-uniform curvature, curved battery cell 100 may better conform to a user's body. In some embodiments curved battery cell 100 may have a conformal structure that matches or approximates the shape of one or more users' heads (e.g., foreheads, backs of heads, etc.).

Figure 3:
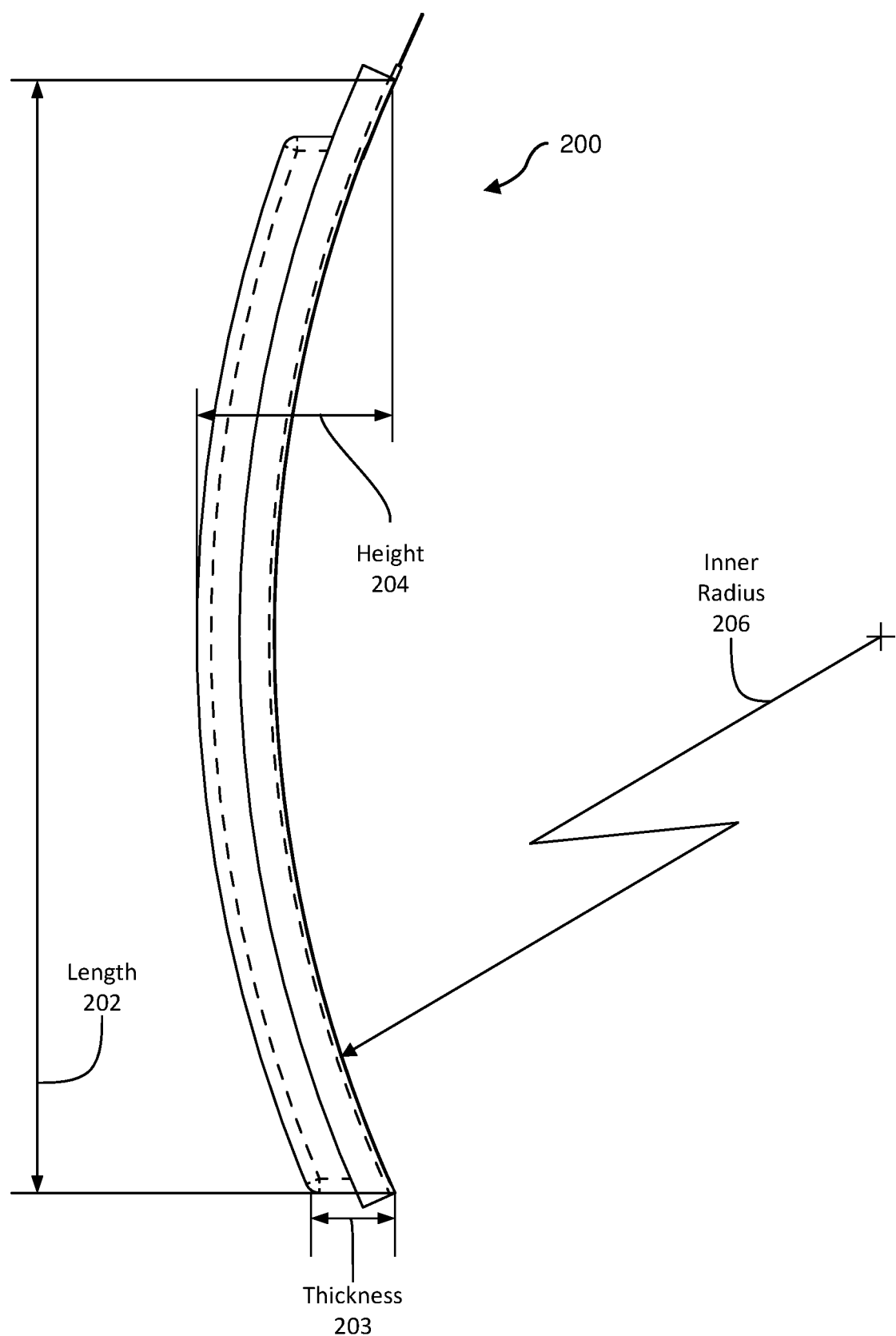
FIG. 3 is an illustration of another exemplary curved battery cell, according to some embodiments.

FIG. 3 is an illustration of exemplary dimensions of an exemplary curved battery cell 200, according to some embodiments. As shown, exemplary dimensions of curved battery cell 200 may include a curved length 202, a curved thickness 203, a curved height 204, and an inner radius 206. Curved length 202 may be any suitable length and/or may be optimized for a specific use case of curved battery cell 200. In some examples, curved length 202 may be in the range of 60 mm to 100 mm or in the range of 70 mm to 80 mm (e.g., approximately 74.48 mm). Curved thickness 203 may be any suitable thickness and/or may be optimized for a specific use case of curved battery cell 200. In some examples, thickness 203 may be in the range of 4-7 mm (e.g., approximately 5.50 mm). Curved height 204 may be any suitable height and/or may be optimized for a specific use case of curved battery cell 200. In some examples, curved height 204 may be in the range of 10 mm to 18 mm (e.g., approximately 14.00 mm). Inner radius 206 may be any suitable radius and/or may be optimized for a specific use case of curved battery cell 200. In some examples, curved battery cell 200 may form all or part of a head-mounted battery and be optimally sized to conform to one or more users' heads or an average human head. In one such example, inner radius 206 may optimally be between approximately 80 mm and 95 mm. In another such example, inner radius 206 may optimally be between approximately 70 mm and 125 mm. In some examples, inner radius 206 may be approximately 95 mm (e.g., 95 mm+/−5 mm) or approximately 110 mm (e.g., 110 mm+/−5 mm).

Figure 4:
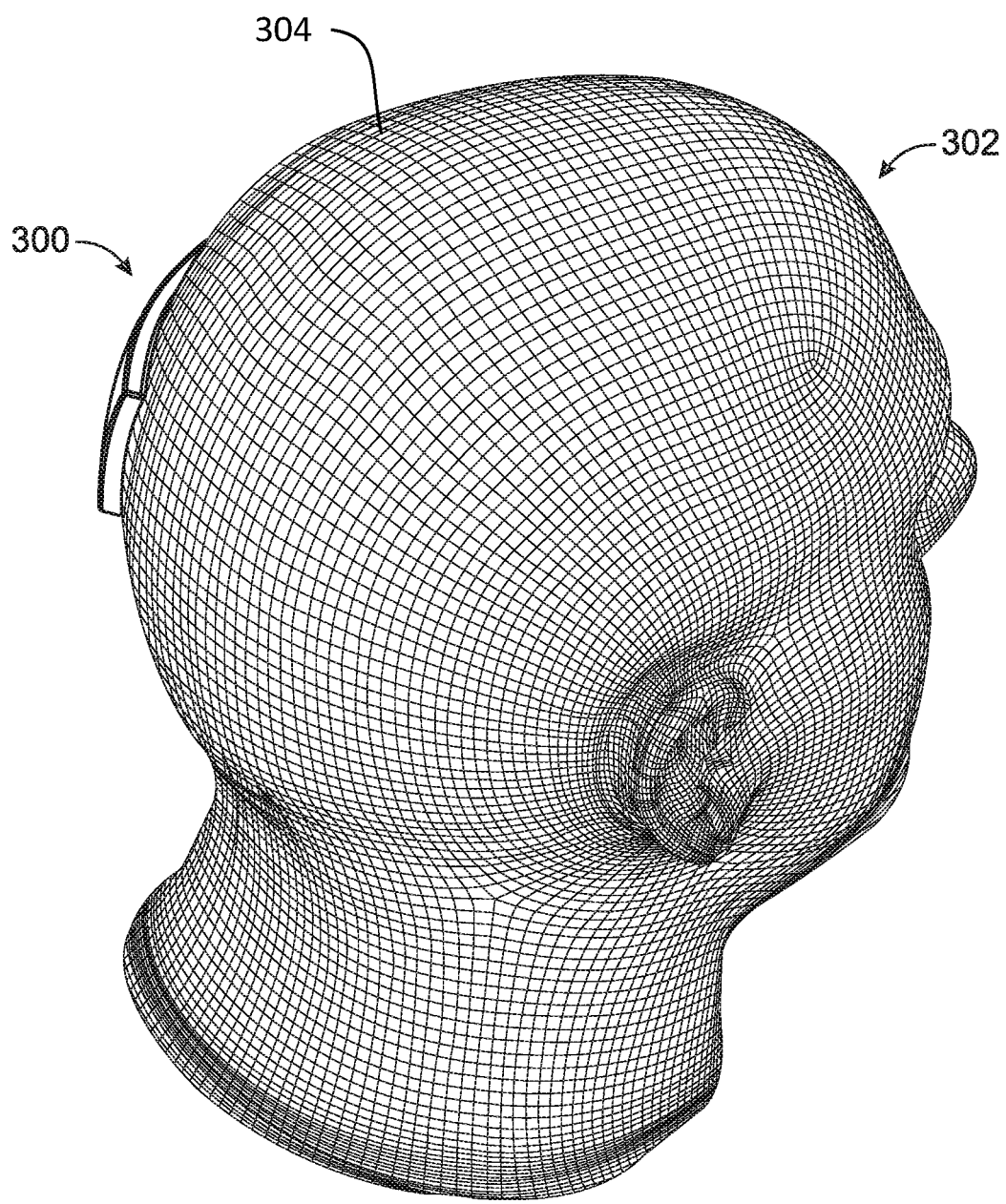
FIGS. 4 and 5 are illustrations of an exemplary curved battery having a spline curvature shaped to conform to a user's head, according to some embodiments.
Figure 5:
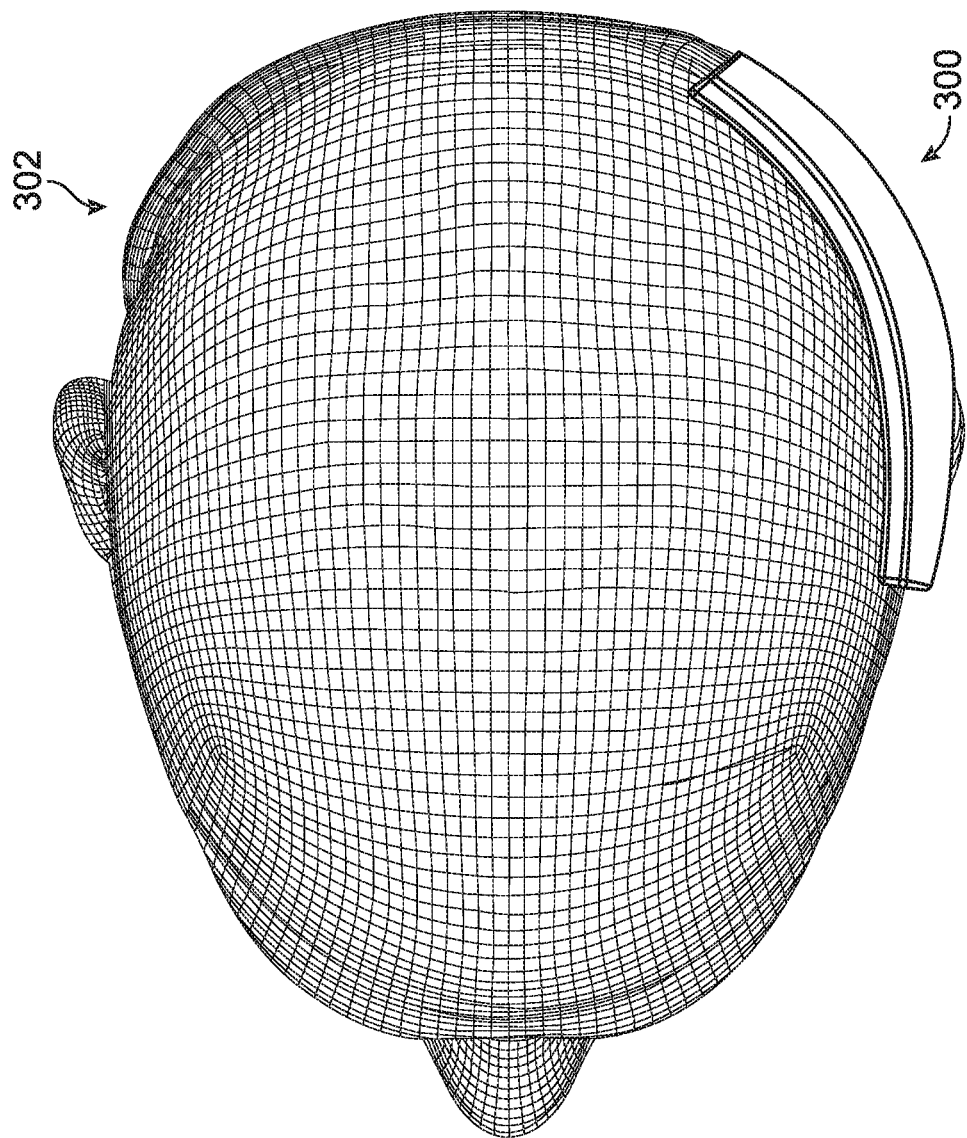

In some embodiments, the disclosed curved batteries may have fixed, constant, or uniform radii of curvature. Additionally or alternatively, the disclosed curved batteries may have varying, non-fixed, or non-uniform radii of curvature. FIGS. 4 and 5 are illustrations of an exemplary curved battery 300 having non-uniform radii of curvature. In the example shown, curved battery 300 is shaped to conform to the curvatures and contours of a head 302 (illustrated having contour lines 304). Head 302 may represent a measured or scanned head of a single person or a head whose contours are derived by averaging the head contours of a particular group of people. For example, head 302 may represent the head of an average 10, 15, or 21 year old person. While battery 300 is illustrated as conforming to the side of head 302, the curved batteries described herein may be manufactured to conform to any other part of head 302 or any other body part and/or manufactured to approximate the curvatures of any of contour lines 304. In some embodiments, the curvature of battery 300 may be selected to conform, within a margin or a degree of comfort, to the heads or bodies of certain population or groups (e.g., the 95th percentile of the largest measured male head to the 5th percentile of the smallest measured female head).

In some embodiments, the curvatures of one or more surfaces of battery 300 and/or the curvatures of battery 300 as a whole may be modelled using a series of splines. In some embodiments, the term "spline" may refer to a non-simple curve, a non-uniform curve, a complex curve, a curve with a non-continuous radius or circumradius, a piecewise polynomial curve, or any curve without a single fixed radius or circumradius. In some embodiments, the batteries disclosed herein may be produced using a single cell or multiple cells. For example, battery 300 may consist of (1) a single cell, with a spline curved cell, (2) multiple cells, where each cell has the same or similar spline curve, or (3) multiple cells, where the spline curves differ among at least one of the cells. Batteries having spline-based curvatures may enable better designs for wearable devices, such as head-mounted display devices. In some instances, head-mounted display devices with integrated curved batteries may have improved ergonomics which may reduce neck strain and/or other types of fatigue. In some embodiments, the curved batteries, devices, and accessories disclosed herein may be personalized to fit a particular person, much like prescription glasses are personalized.

Figure 6:
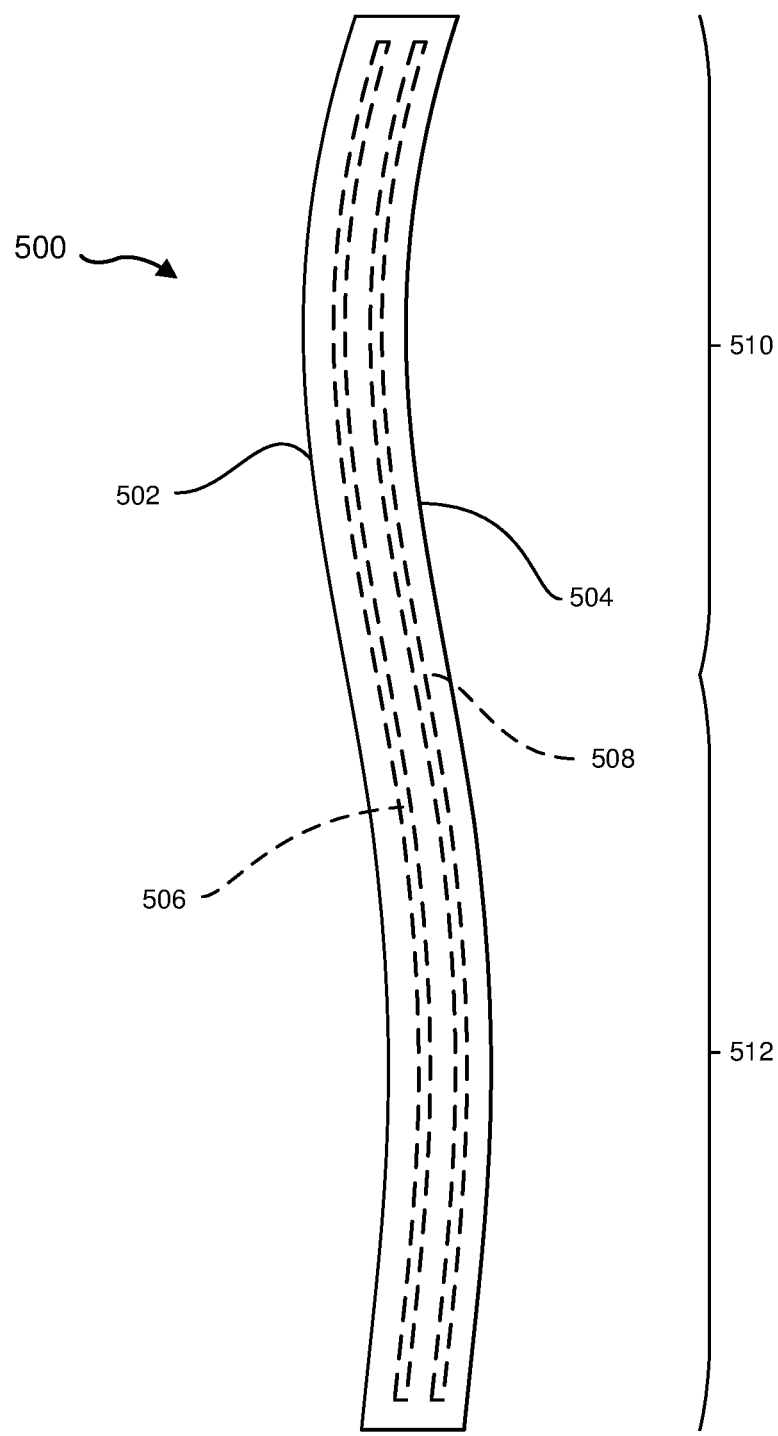
FIG. 6 is a cross-sectional view of an exemplary curved battery having a spline curvature, according to some embodiments.

FIG. 6 is an illustration of an exemplary spline battery 500, according to some embodiments. As shown, spline battery 500 may have a spline-fit surface 502 and a spline-fit surface 504. In some embodiments, the spline curvatures of surfaces 502 and 504 may have radii in the range of 90 mm-120 mm. In some examples, spline battery 500 may be formed from multiple planar electrodes (e.g., electrodes 506 and 508) and separators in a stacked configuration. As shown in FIG. 5, spline battery 500 may have multiple curved regions (region 510 and region 512), each with uniform or non-uniform curvatures.

The batteries disclosed herein may generally have curvatures with radii suitable to conform to portions of a wearer's body or suitable to be integrated into wearable devices and/or accessories that conform to portions of a wearer's body. In some embodiments, the batteries disclosed herein may have curvatures with radii within the range of 90 mm-120 mm, 70 mm-110 mm, 85 mm-110 mm, 76 mm-84 mm, 72 mm-88 mm, 68 mm-92 mm, 64 mm-96 mm, 80.75 mm-89.25 mm, 76.5 mm-93.5 mm, 72.25 mm-97.75 mm, 68 mm-102 mm, 85.5 mm-94.5 mm, 81 mm-99 mm, 76.5 mm-103.5 mm, 72 mm-108 mm, 90.25 mm-99.75 mm, 85.5 mm-104.5 mm, 80.75 mm-109.25 mm, 76 mm-114 mm, 95 mm-105 mm, 90 mm-110 mm, 85 mm-115 mm, 80 mm-120 mm, 99.75 mm-110.25 mm, 94.5 mm-115.5 mm, 89.25 mm-120.75 mm, 84 mm-126 mm, 104.5 mm-115.5 mm, 99 mm-121 mm, 93.5 mm-126.5 mm, 88 mm-132 mm, 85.5 mm-104.5 mm, 76 mm-114 mm, 66.5 mm-123.5 mm, 57 mm-133 mm, 47.5 mm-142.5 mm, 38 mm-152 mm, 28.5 mm-161.5 mm, 19 mm-171 mm, or 9.5 mm-180.5 mm. In some embodiments, the batteries disclosed herein may have single curvatures with radii that range between 90 mm and 120 mm, 70 mm and 110 mm, 85 mm and 110 mm, 76 mm and 84 mm, 72 mm and 88 mm, 68 mm and 92 mm, 64 mm and 96 mm, 80.75 mm and 89.25 mm, 76.5 mm and 93.5 mm, 72.25 mm and 97.75 mm, 68 mm and 102 mm, 85.5 mm and 94.5 mm, 81 mm and 99 mm, 76.5 mm and 103.5 mm, 72 mm and 108 mm, 90.25 mm and 99.75 mm, 85.5 mm and 104.5 mm, 80.75 mm and 109.25 mm, 76 mm and 114 mm, 95 mm and 105 mm, 90 mm and 110 mm, 85 mm and 115 mm, 80 mm and 120 mm, 99.75 mm and 110.25 mm, 94.5 mm and 115.5 mm, 89.25 mm and 120.75 mm, 84 mm and 126 mm, 104.5 mm and 115.5 mm, 99 mm and 121 mm, 93.5 mm and 126.5 mm, 88 mm and 132 mm, 85.5 mm and 104.5 mm, 76 mm and 114 mm, 66.5 mm and 123.5 mm, 57 mm and 133 mm, 47.5 mm and 142.5 mm, 38 mm and 152 mm, 28.5 mm and 161.5 mm, 19 mm and 171 mm, or 9.5 mm and 180.5 mm.

FIGS. 7-12 illustrate an exemplary head-mounted-display system 600 in accordance with some embodiments. While the components illustrated in these figures are not illustrated as incorporating the curved batteries disclosed herein, any of the curved components of head-mounted-display system 600 may include or integrate curved batteries. Similarly, any of the devices or components disclosed herein may similarly include or integrate curved batteries. Head-mounted display system 600 includes a head-mounted display device 602 (e.g., a head-mounted display), audio subsystems 604, a strap assembly 606, and a facial-interface subsystem 608. In some embodiments, the term "head-mounted display" may refer to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

In some embodiments, head-mounted display device 602 may include an outer housing 610 that may surround, contain, and protect various display, optical, and other electronic components of head-mounted display device 602. As shown, head-mounted display device 602 may include one or more optical sensors 612 (such as two-dimensional (2D) or 3D cameras, time-of-flight depth sensors, single-beam or sweeping laser rangefinders, 3D LiDAR sensors, and/or any other suitable type or form of optical sensor), ports 613 (e.g., an audio port, a power port, a data port, or a Universal Serial Bus (USB) port), and/or a volume rocker button 630. Outer housing 610 may be attached to strap assembly 606 by any suitable interfaces. Facial-interface subsystem 608 may be configured to comfortably rest against a region of a user's face, including a region surrounding the user's eyes, when head-mounted display system 600 is worn by the user. In these embodiments, facial-interface subsystem 608 may include a facial-interface cushion 614. Facial-interface cushion 614 may surround a viewing region 616 that includes the user's field of vision while the user is wearing head-mounted display system 600.

Figure 7:
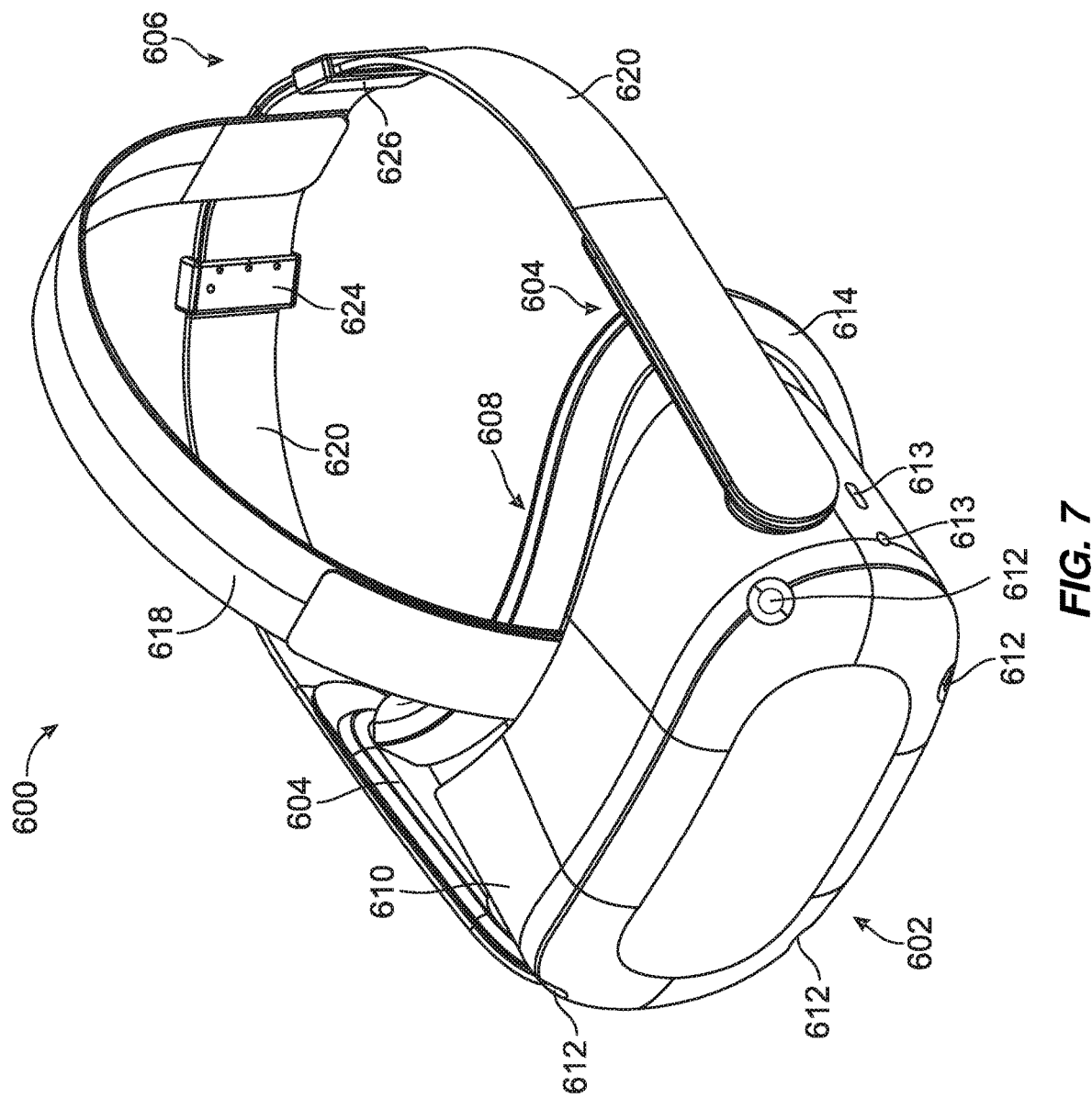
FIG. 7 is a perspective view of an exemplary head-mounted display device in accordance with some embodiments.
Figure 8:
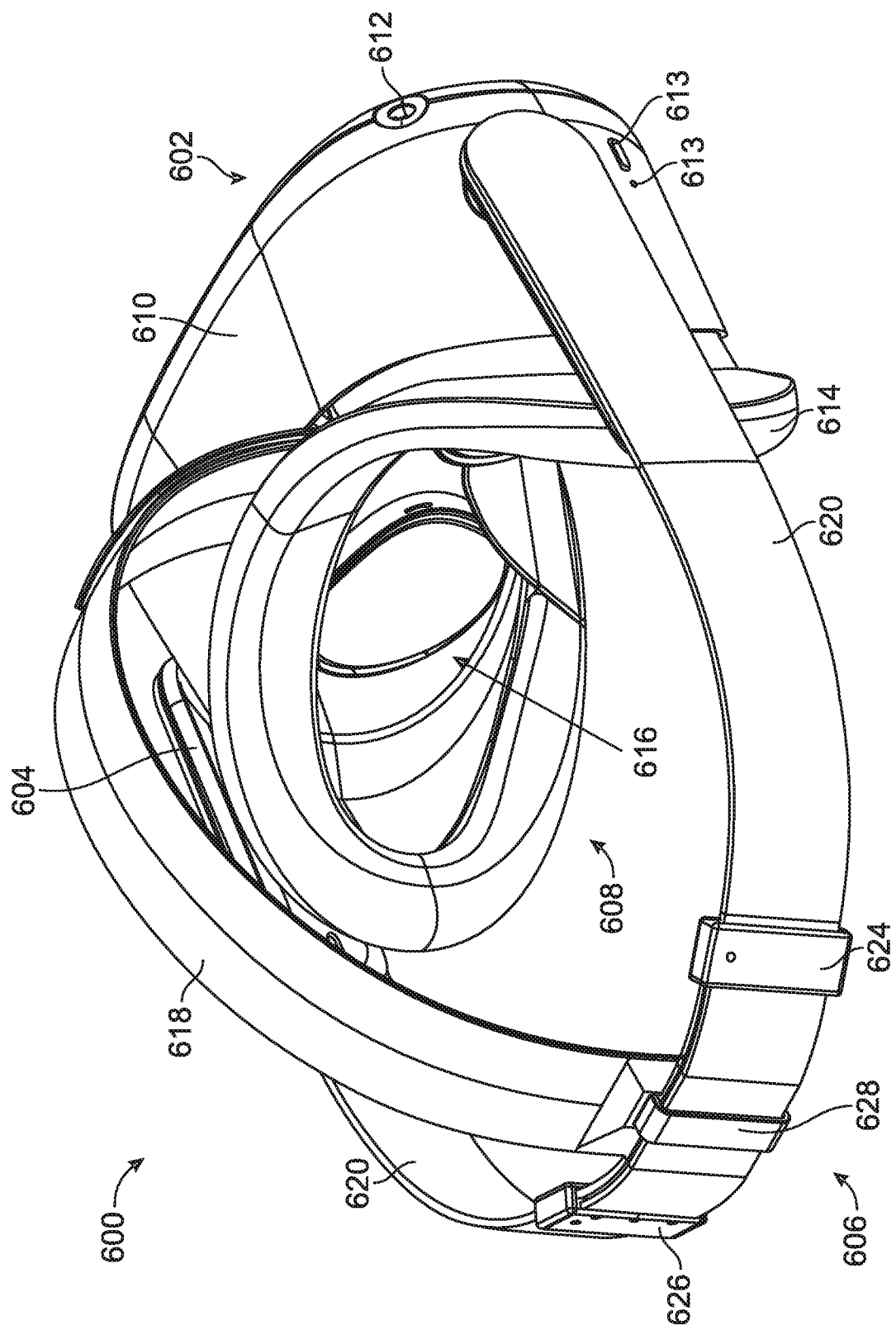
FIG. 8 is another perspective view of the exemplary head-mounted display device illustrated in FIG. 7.
Figure 9:
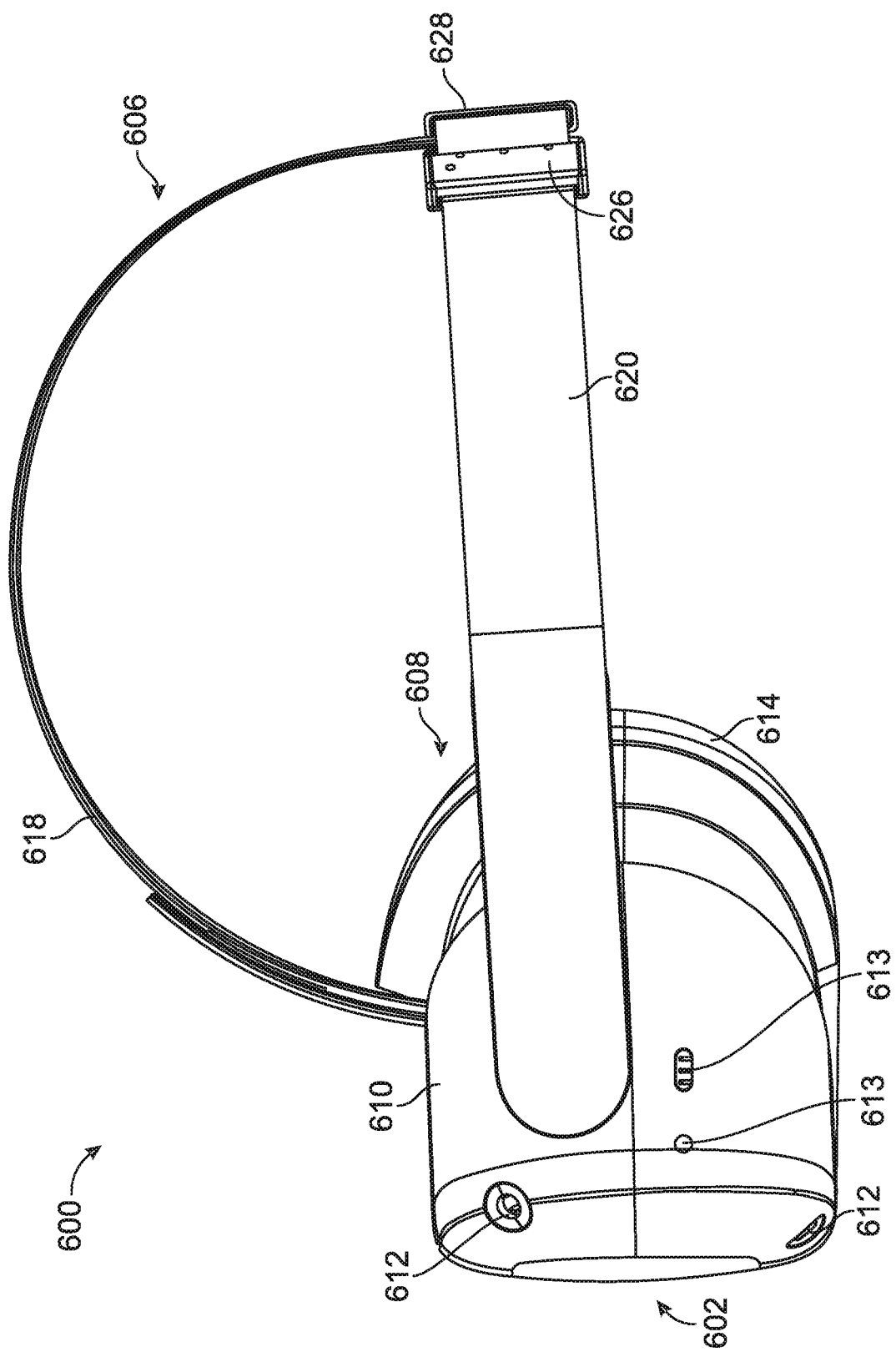
FIG. 9 is a side view of the exemplary head-mounted display device illustrated in FIG. 7.
Figure 10:
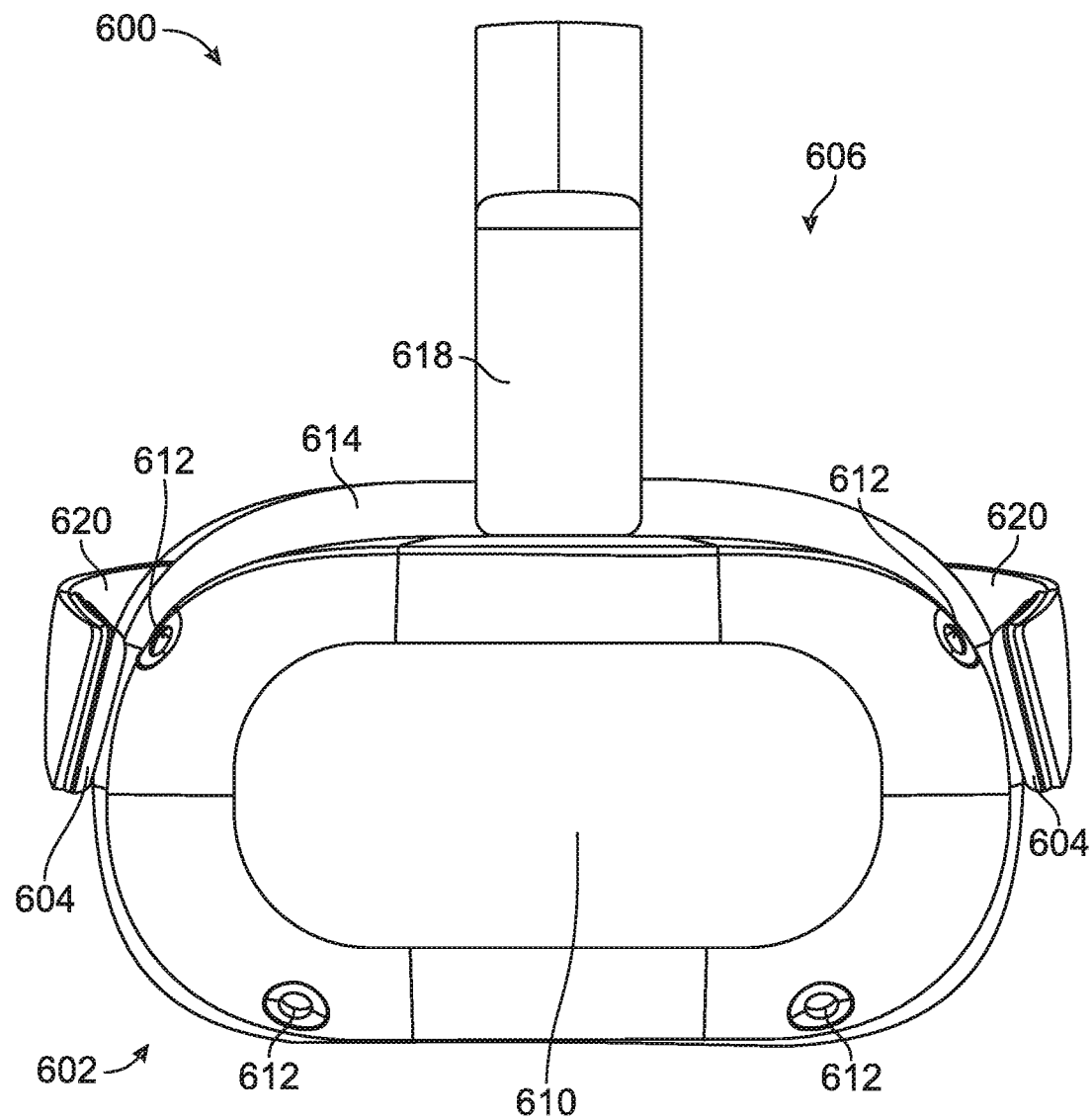
FIG. 10 is a front view of the exemplary head-mounted display device illustrated in FIG. 7.
Figure 11:
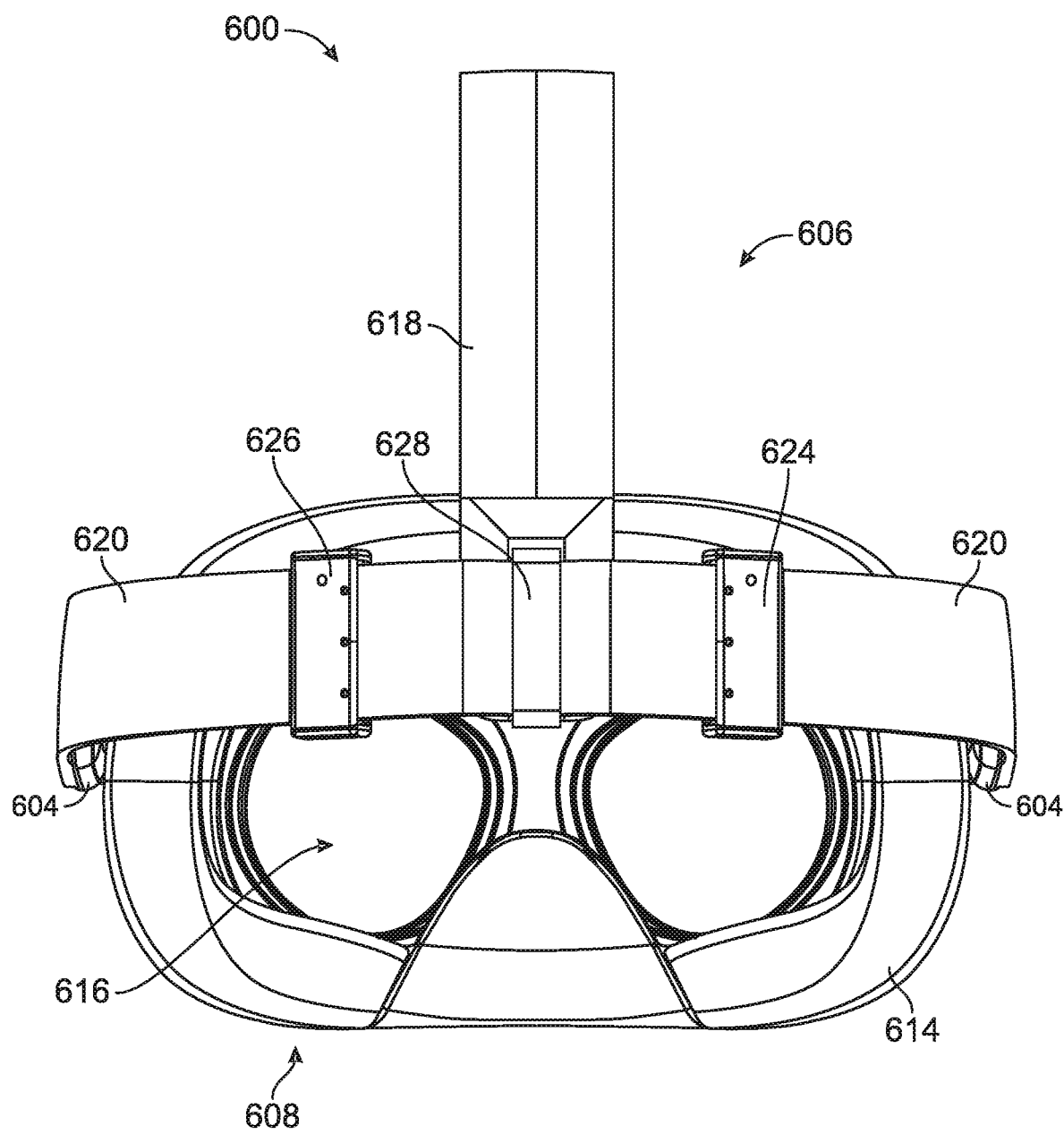
FIG. 11 is a rear view of the exemplary head-mounted display device illustrated in FIG. 7.
Figure 12:
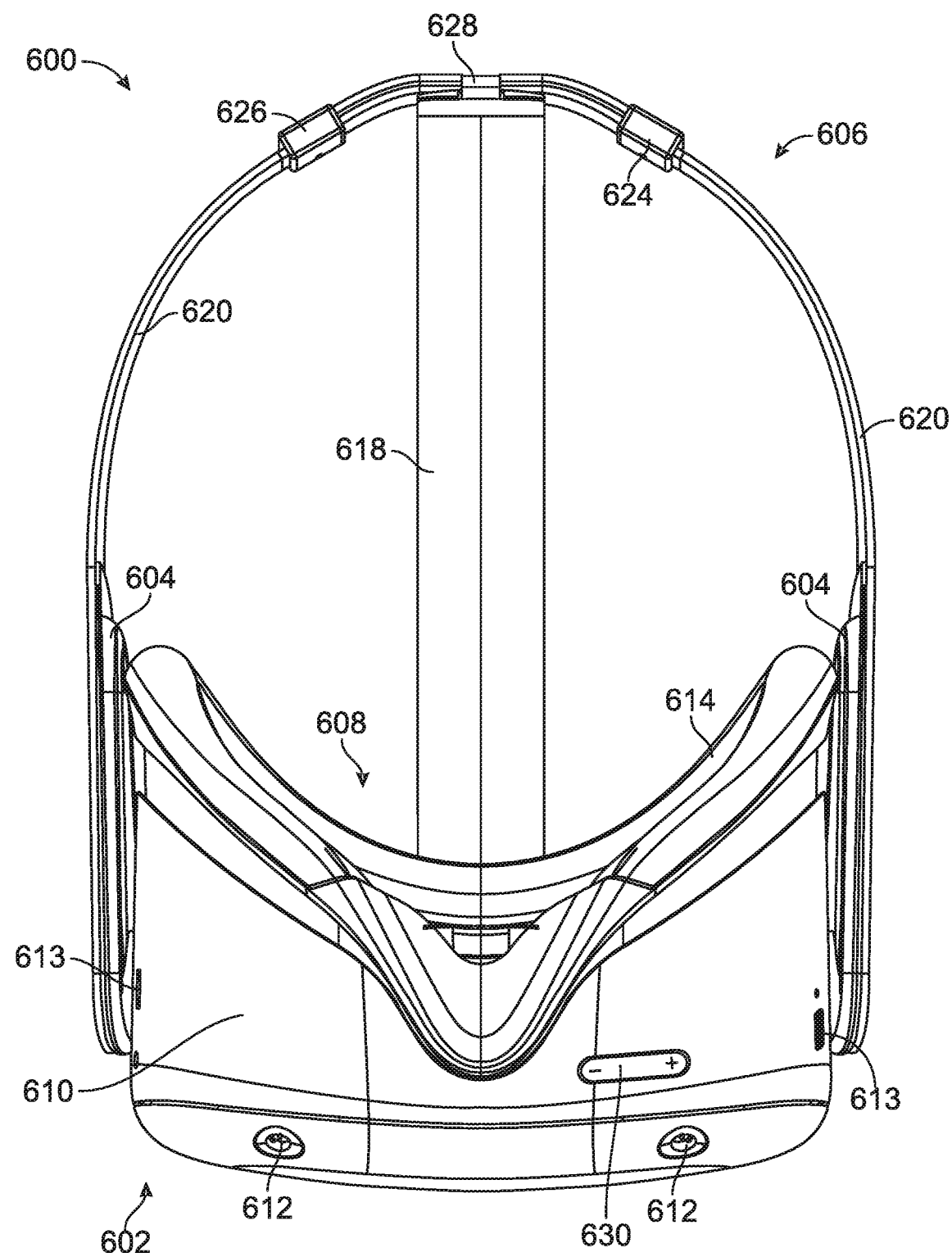
FIG. 12 is a bottom view of the exemplary head-mounted display device illustrated in FIG. 7.
Figure 13:
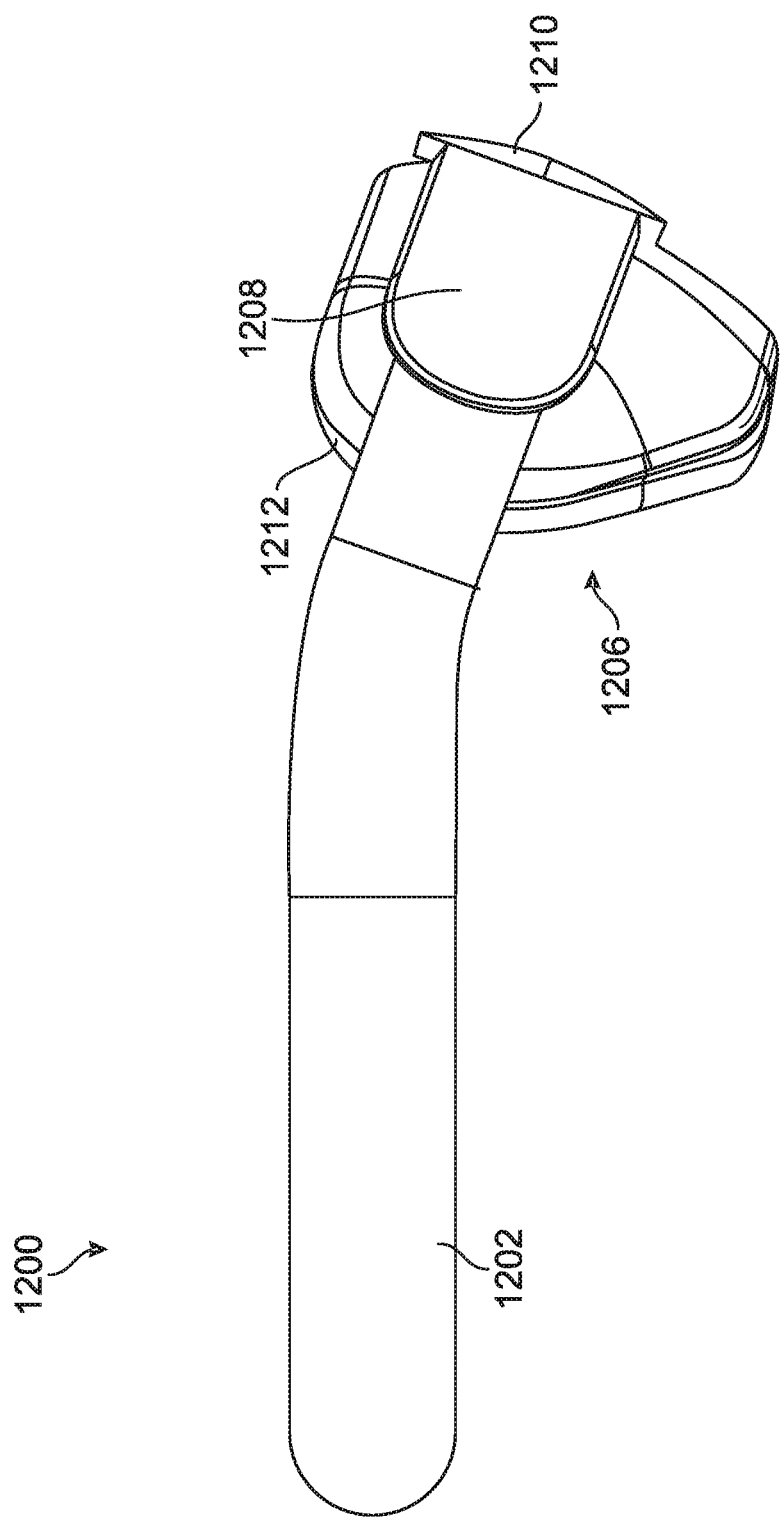
FIG. 13 is a side view of an exemplary strap assembly for a head-mounted display device in accordance with some embodiments.
Figure 14:
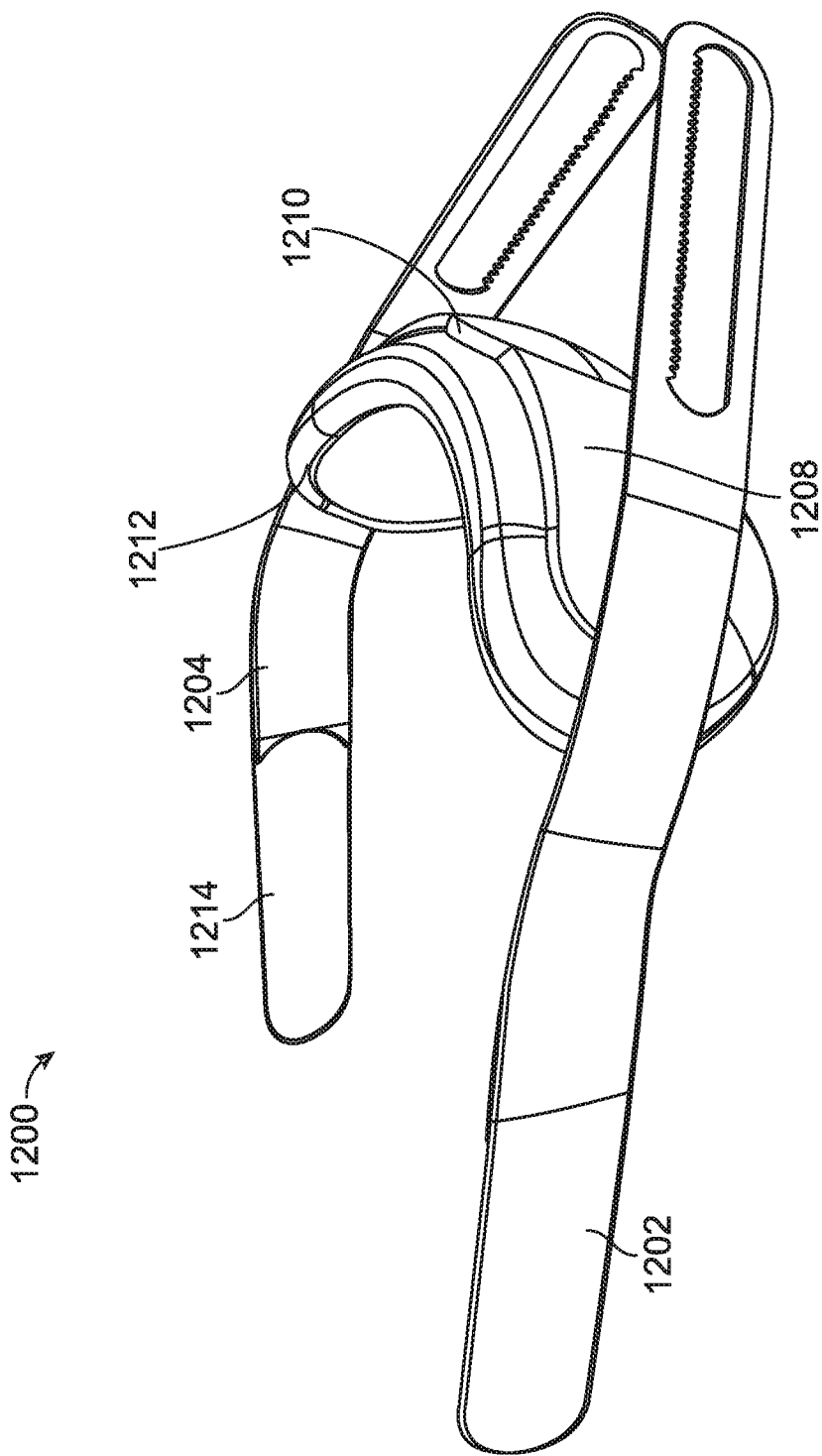
FIG. 14 is a perspective view of the strap assembly illustrated in FIG. 13.
Figure 15:
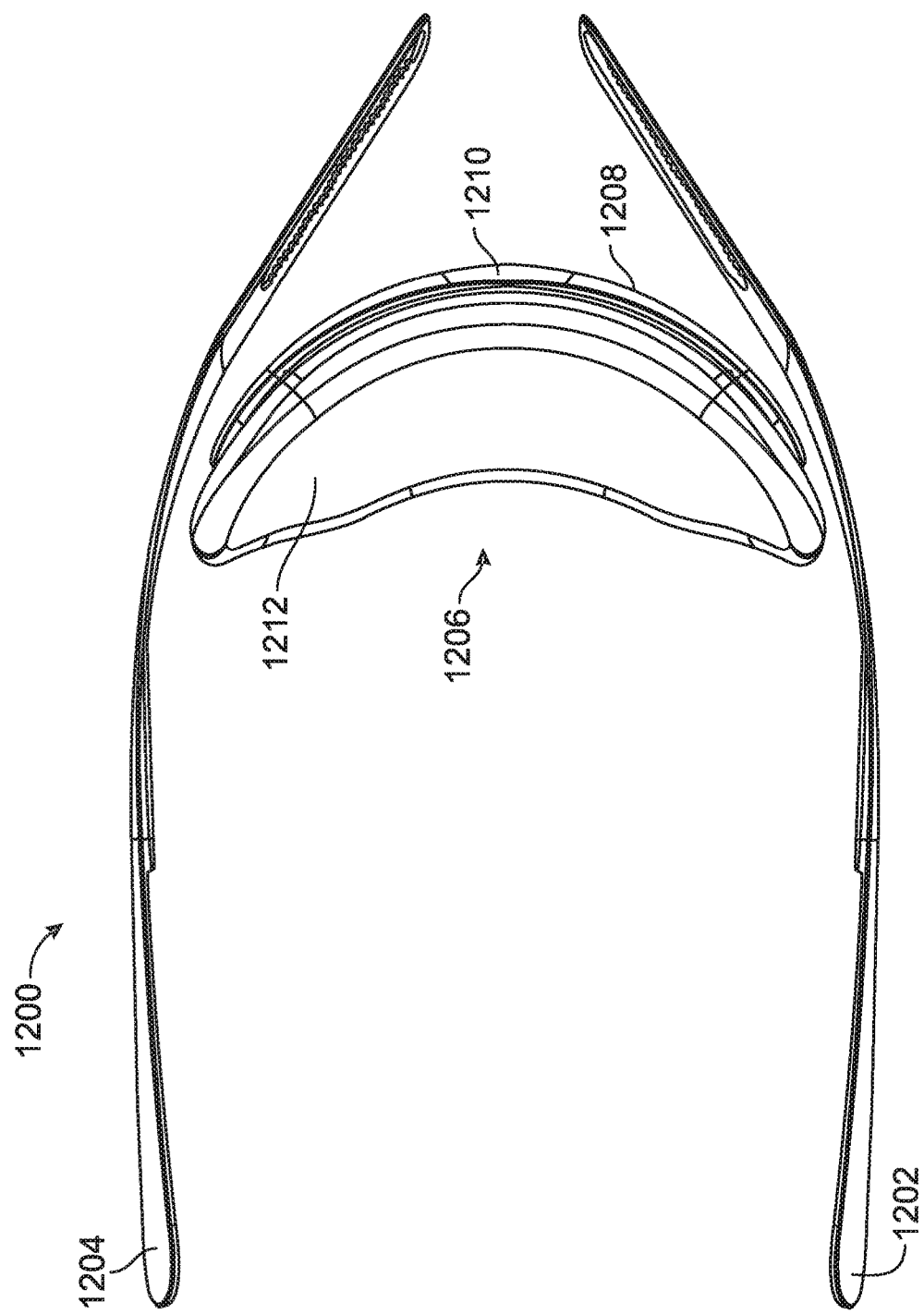
FIG. 15 is a top view of the strap assembly illustrated in FIG. 13.

In some embodiments, strap assembly 606 may be used to mount head-mounted display device 602 on a user's head. As shown in FIG. 7, strap assembly 606 may include an upper strap 618 and lower straps 620. Lower straps 620 may each be coupled to one of audio subsystems 604, which are shown coupled to head-mounted display device 602. In some embodiments, upper strap 618 and lower straps 620 may be formed from a soft and/or flexible material that enable upper strap 618 and lower straps 620 to adjustably conform to the top and/or sides of a user's head when the user is wearing head-mounted display device 602. In this example, strap assembly 606 may include strap retaining components 624, 626, and 628 that may couple upper strap 618 and lower straps 620 and enable them to be adjusted. In some embodiments, strap assembly 606 may include curved batteries and/or various electronic components that may generate and/or display data.

Figure 16:
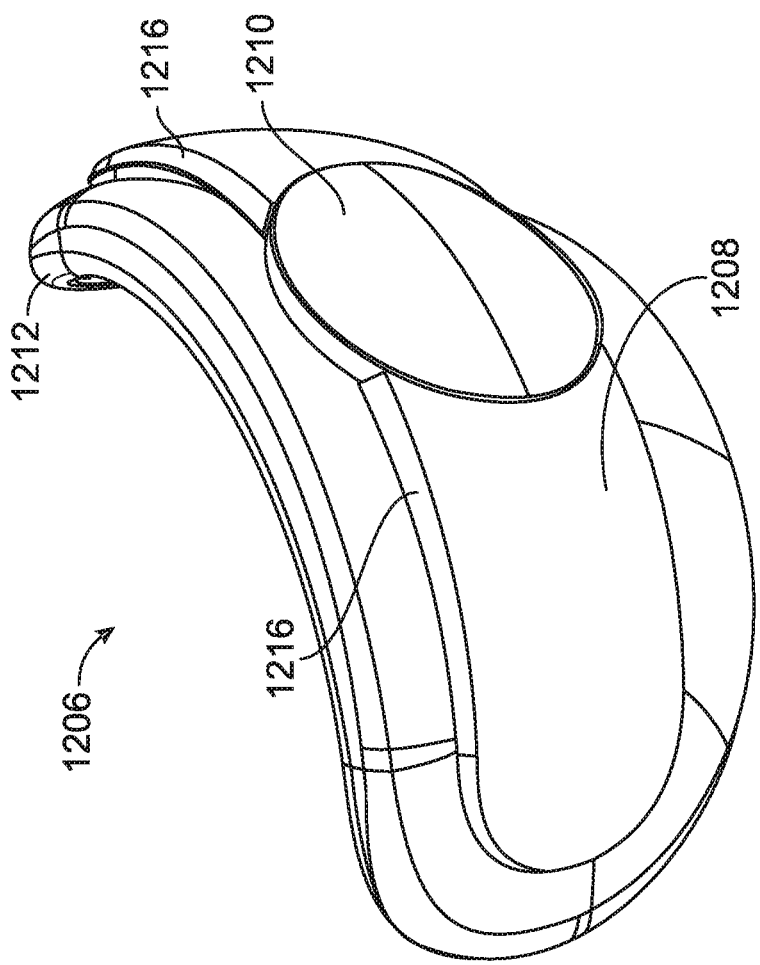
FIG. 16 is a perspective view of the backpiece illustrated in FIG. 13.
Figure 17:
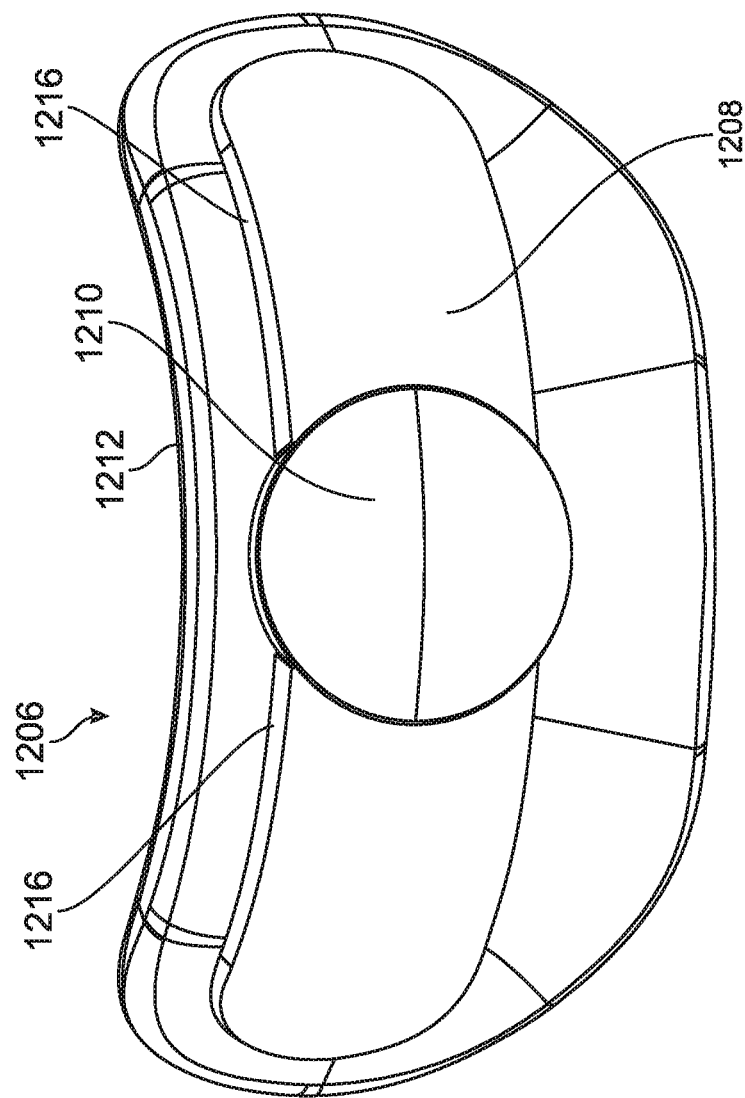
FIG. 17 is a rear view of the backpiece illustrated in FIG. 13.
Figure 18:
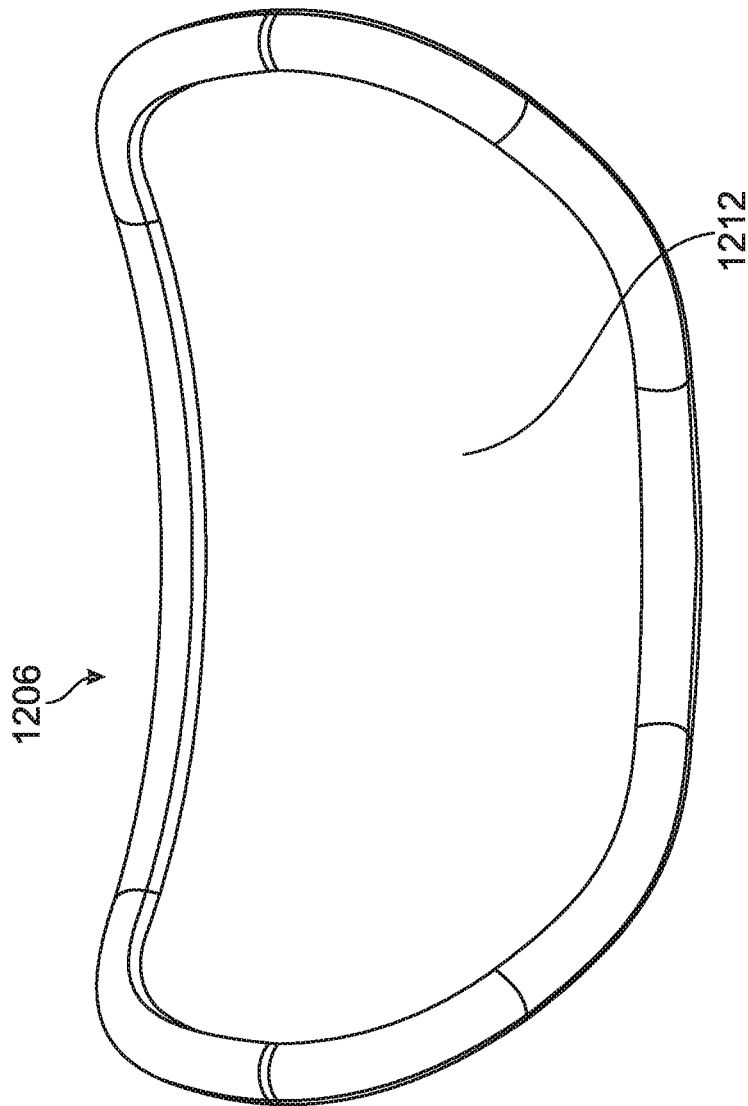
FIG. 18 is a front view of the backpiece illustrated in FIG. 13.

FIGS. 13-18 illustrate an exemplary strap assembly 1200. While the components illustrated in these figures are not illustrated as incorporating the curved batteries disclosed herein, any of the curved components of exemplary strap assembly 1200 may include or integrate curved batteries. In some examples, strap assembly 1200 may replace strap assembly 606 and may be used to mount head-mounted display device 602 on a user's head. As shown in FIGS. 13-18, strap assembly 1200 may include a left strap 1202, a right strap 1204, and a backpiece 1206 (including a cushion 1212) to rest against the back of the user's head (e.g., around the user's occipital lobe). In some embodiments, left strap 1202 and right strap 1204 may include interfaces (e.g., snap interface 1214) that couple left strap 1202 and right strap 1204 to one of audio subsystems 604. In some embodiments, left strap 1202 and right strap 1204 may be formed from a rigid or semi-rigid material that enable left strap 1202 and right strap 1204 to adjustably conform to the sides of a user's head when the user is wearing head-mounted display device 602. As shown, strap assembly 1200 may include a dial 1210 for adjusting and/or locking the positions of left strap 1202 and right strap 1204. In some embodiments, dial 1210 may be used to interface with a strap adjustment assembly contained within a strap housing 1208. As shown in FIG. 16, strap housing 1208 may include surfaces 1216.

Figure 28:
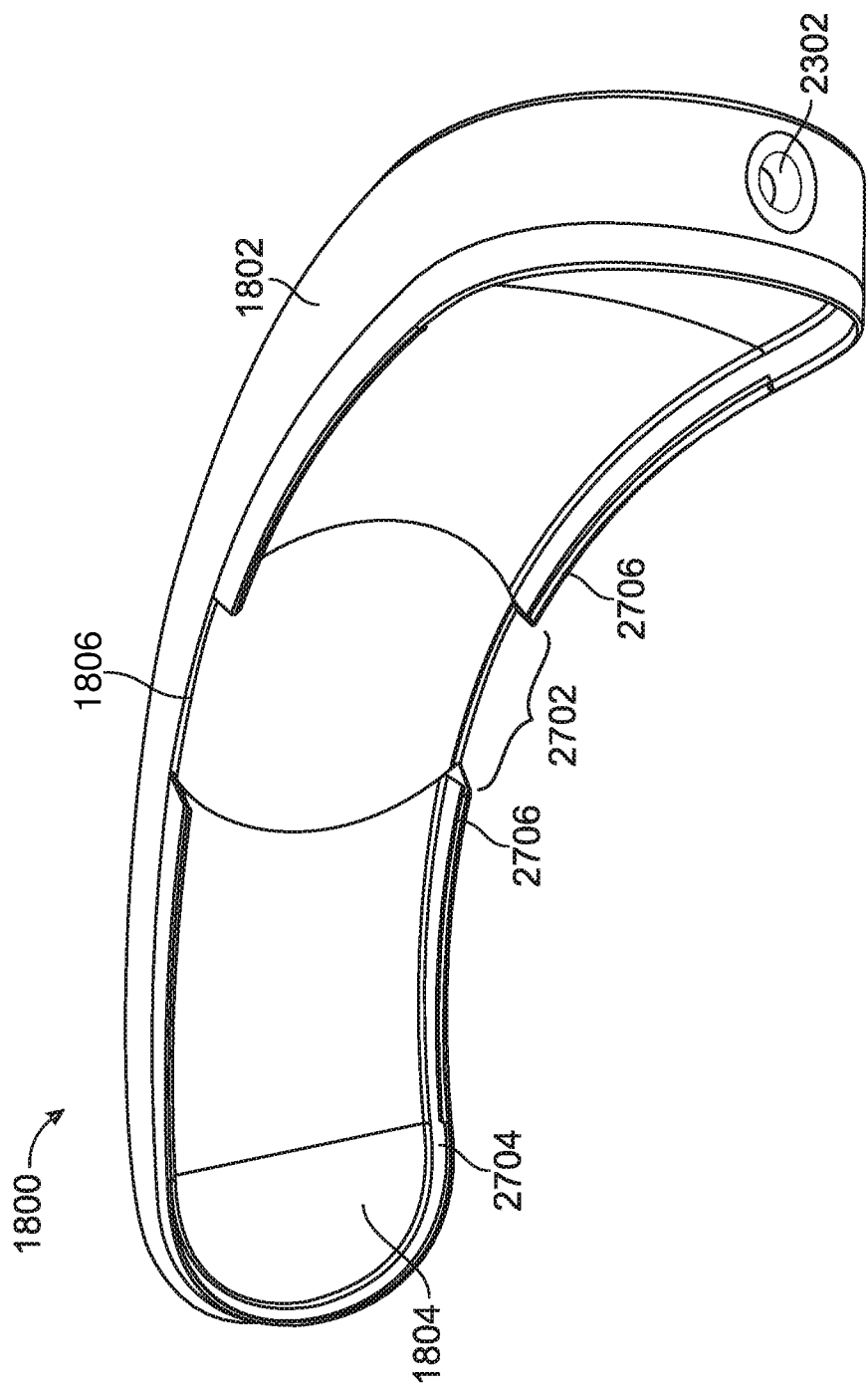
FIG. 28 is another perspective view of the exemplary battery-pack accessory illustrated in FIG. 19.
Figure 29:
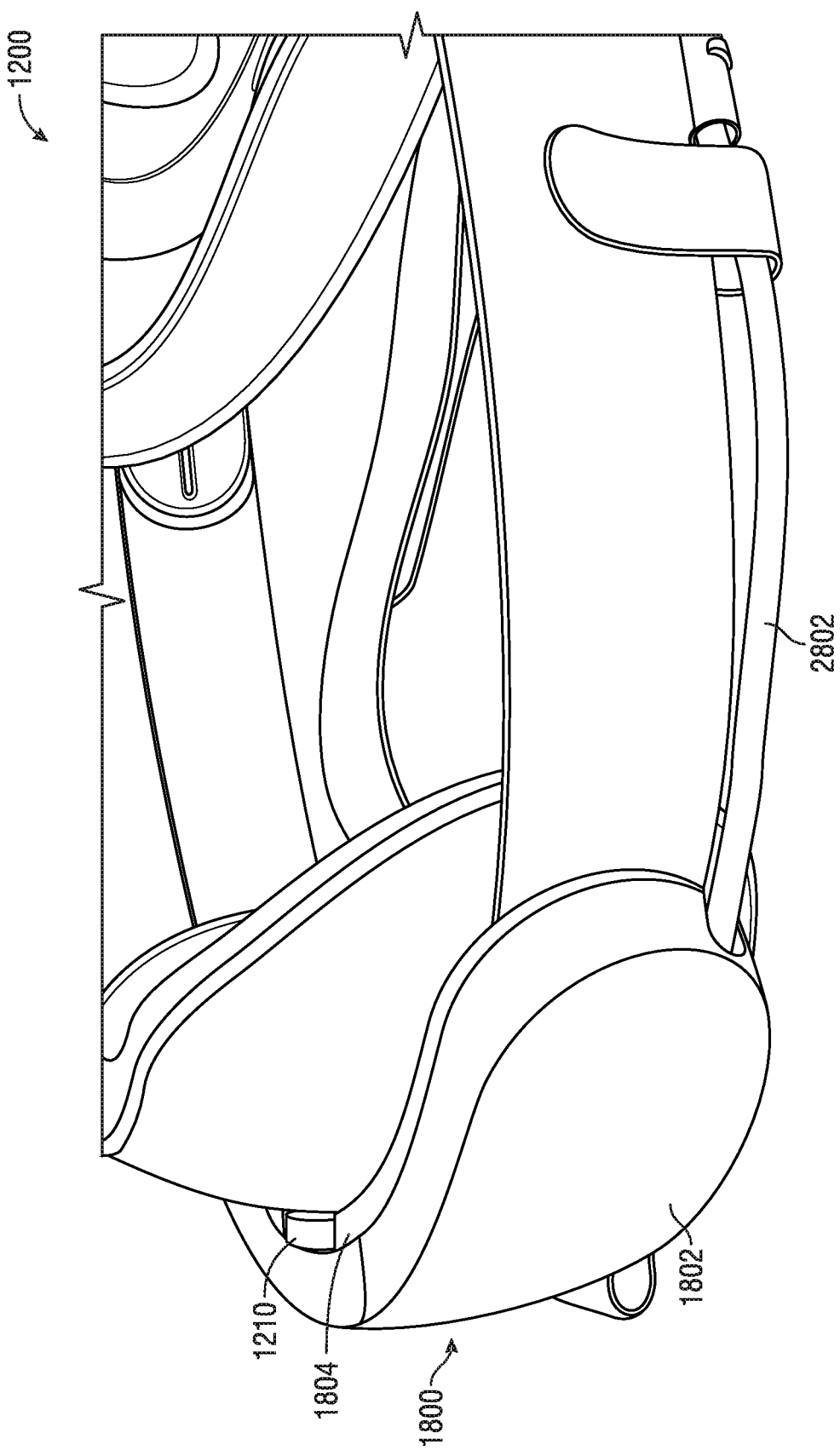
FIG. 29 is a perspective view of an exemplary battery-pack accessory mounted to a head-mounted display device in accordance with some embodiments.
Figure 30:
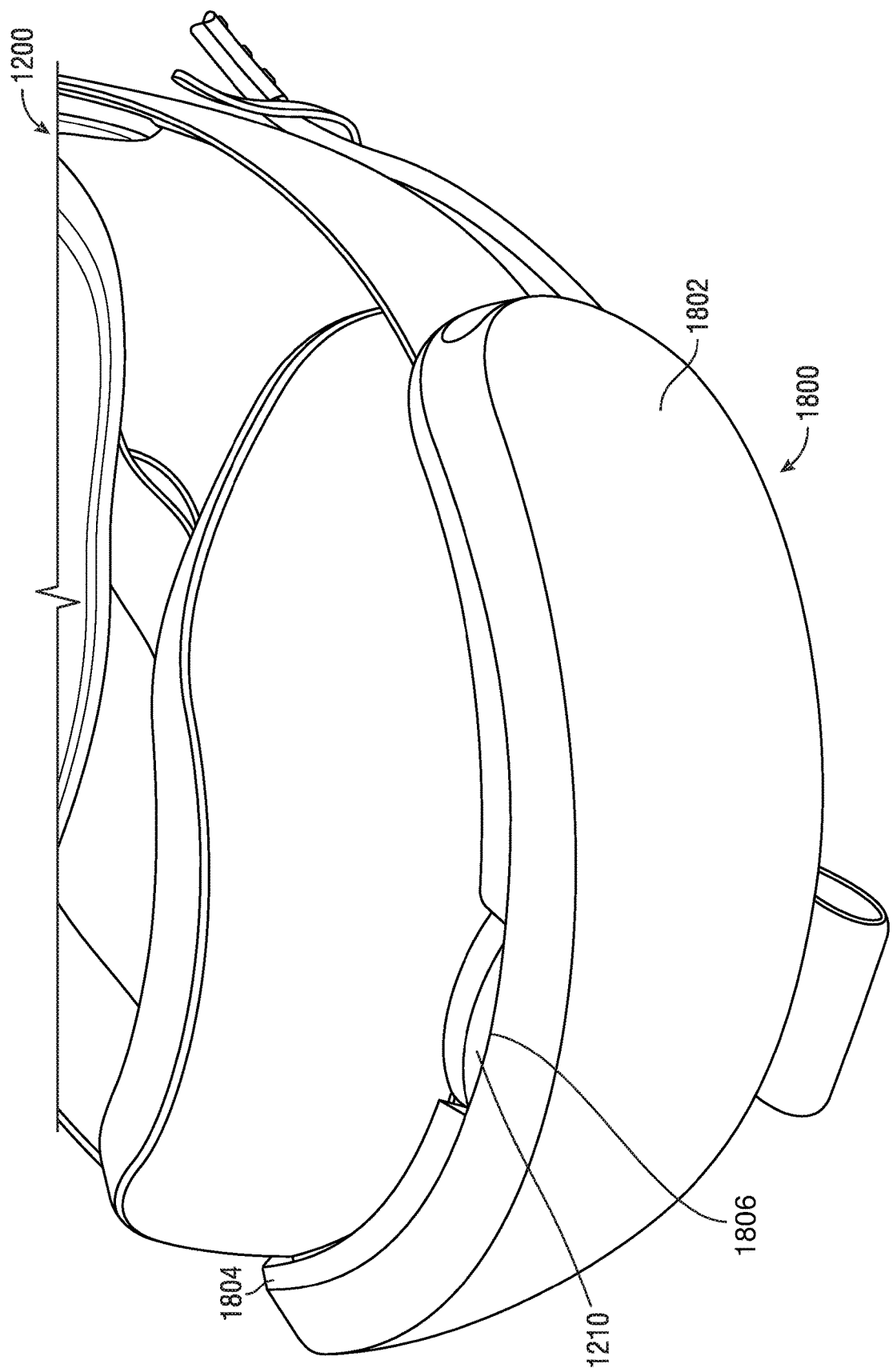
FIG. 30 is another perspective view of the exemplary battery-pack accessory and head-mounted display device shown in FIG. 29.
Figure 31:
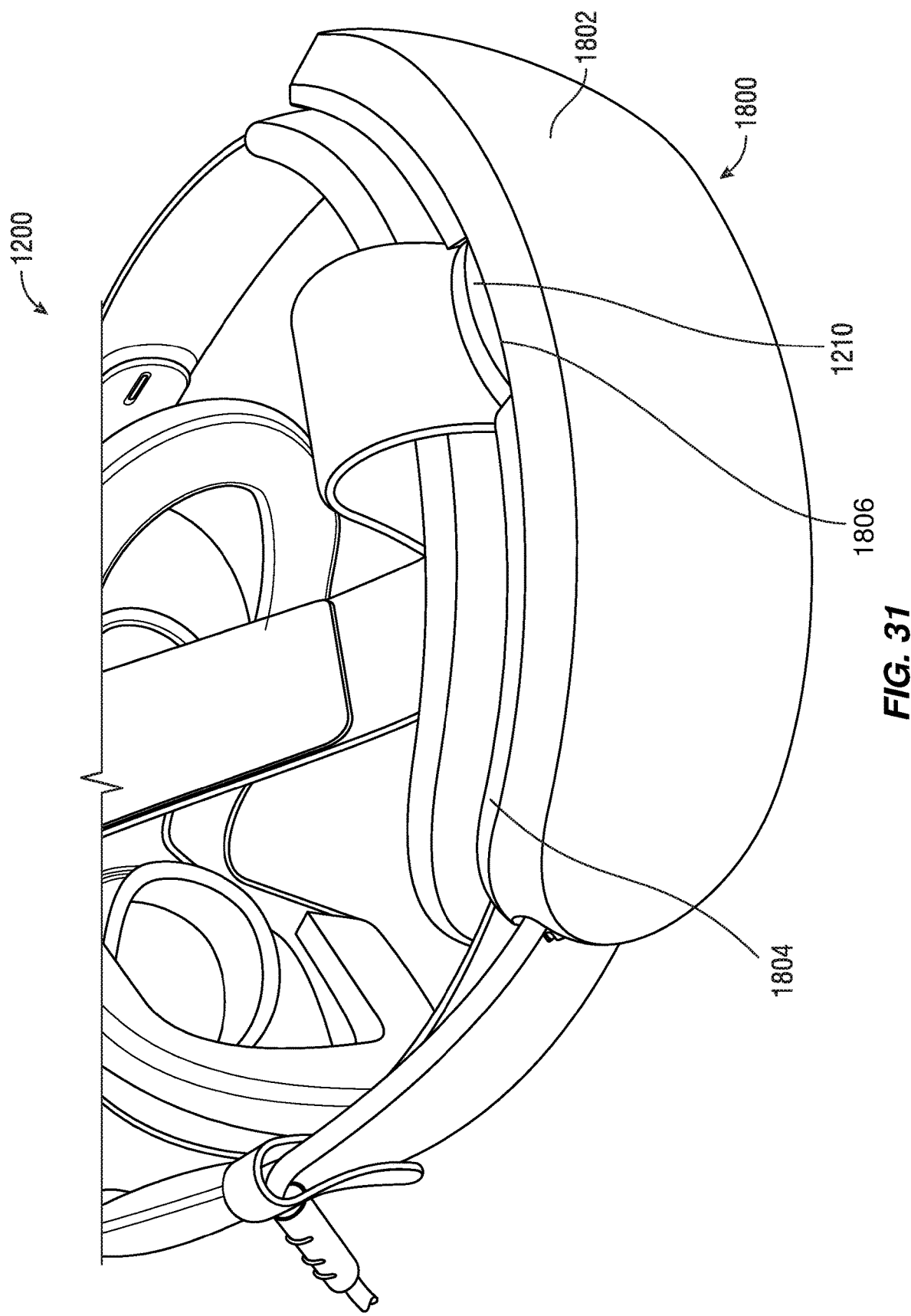
FIG. 31 is another perspective view of the exemplary battery-pack accessory and head-mounted display device shown in FIG. 29.

In some embodiments, a curved battery-pack accessory that includes one or more of the curved batteries disclosed herein may be attached to strap assembly 606 or strap assembly 1200 to provide primary or auxiliary power to head-mounted display device 602. FIGS. 19-31 illustrate an exemplary removable curved battery-pack accessory 1800 for a head-mounted-display system (e.g., head-mounted-display system 600). In some examples, battery-pack accessory 1800 may be configured to be worn near or against the back of a user's head and/or act as a counterweight that counterbalances other components of a head-mounted display system worn near or against the user's face (e.g., head-mounted display device 602). As shown in FIGS. 29-31, battery-pack accessory 1800 may be shaped and configured to attach to backpiece 1206 of strap assembly 1200. In the example shown, battery-pack accessory 1800 may be shaped and configured to surround and attach to strap housing 1208 via a friction or snap fit.

Figure 19:
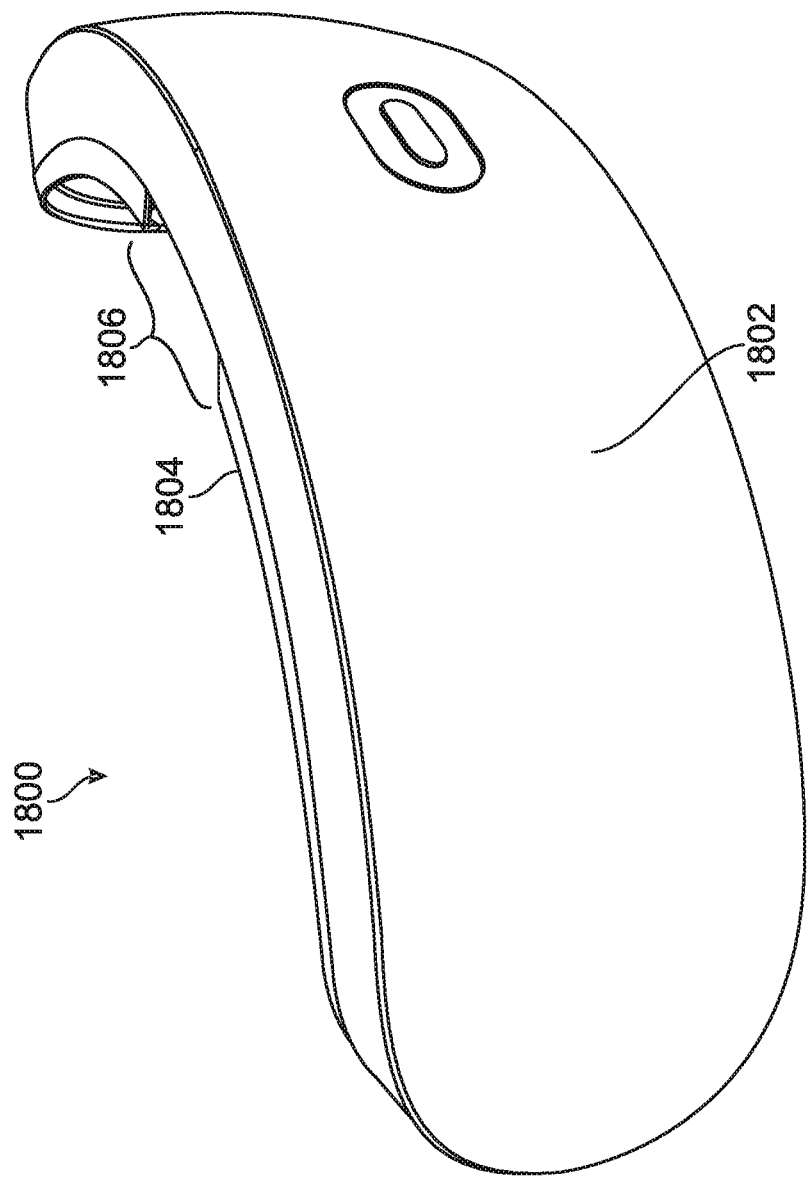
FIG. 19 is a perspective view of an exemplary battery-pack accessory for a head-mounted display device in accordance with some embodiments.
Figure 20:
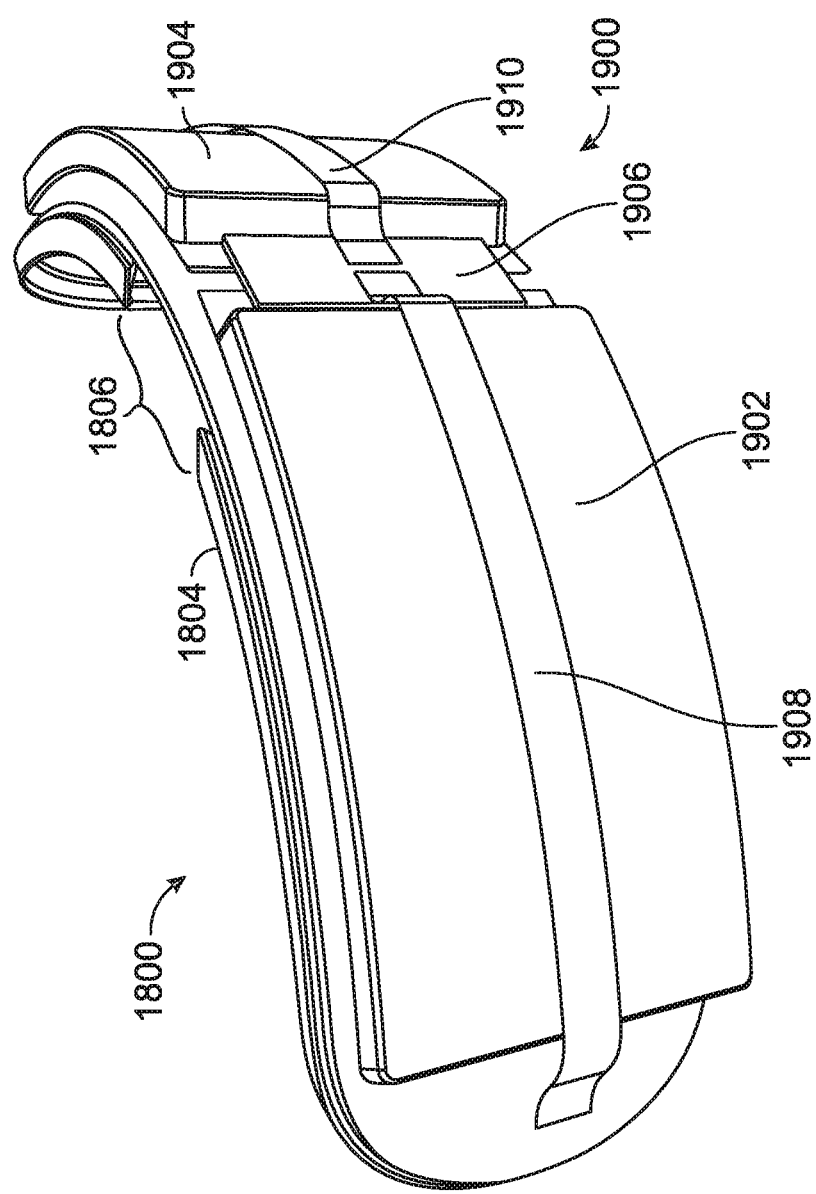
FIGS. 20 and 21 are perspective views of exemplary components of the battery-pack accessory illustrated in FIG. 19.
Figure 21:
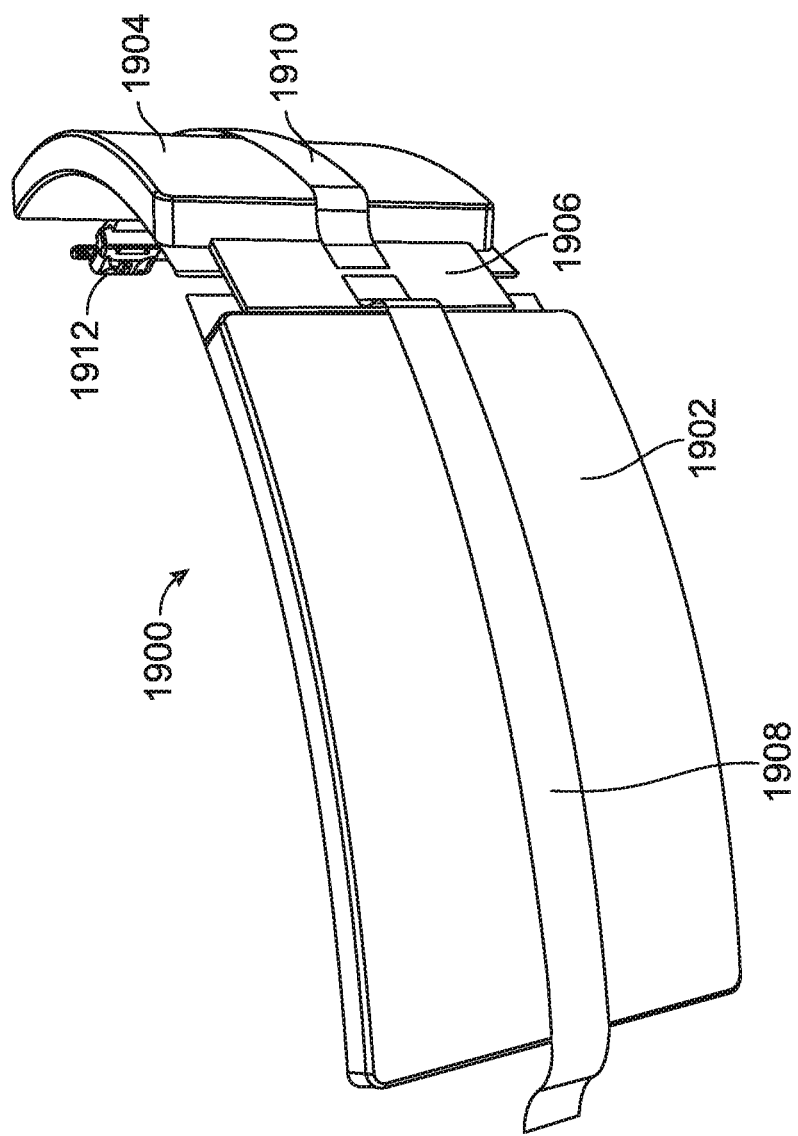
Figure 22:
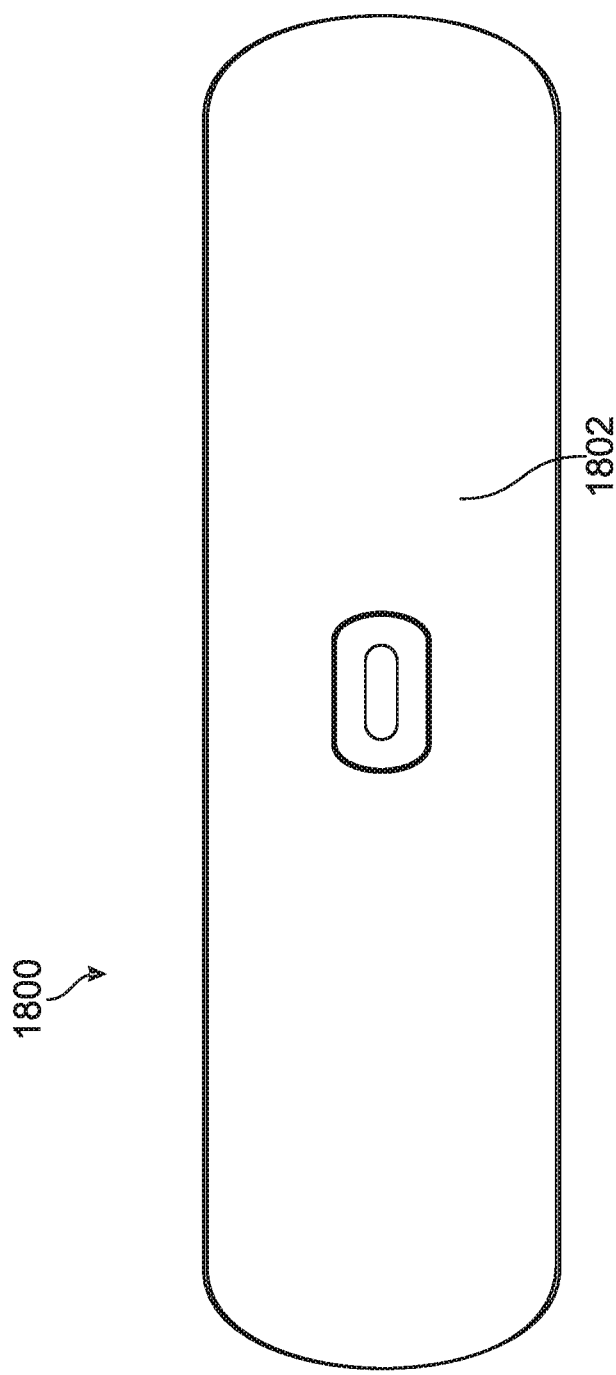
FIG. 22 is a rear view of the exemplary battery-pack accessory illustrated in FIG. 19.
Figure 23:
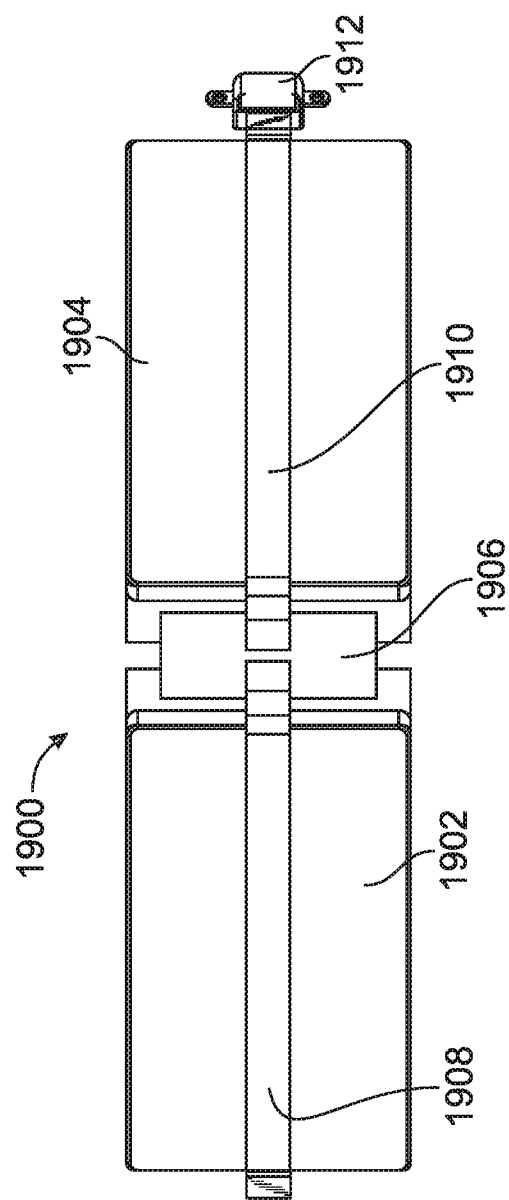
FIG. 23 is a rear view of the exemplary components illustrated in FIGS. 20 and 21.
Figure 24:
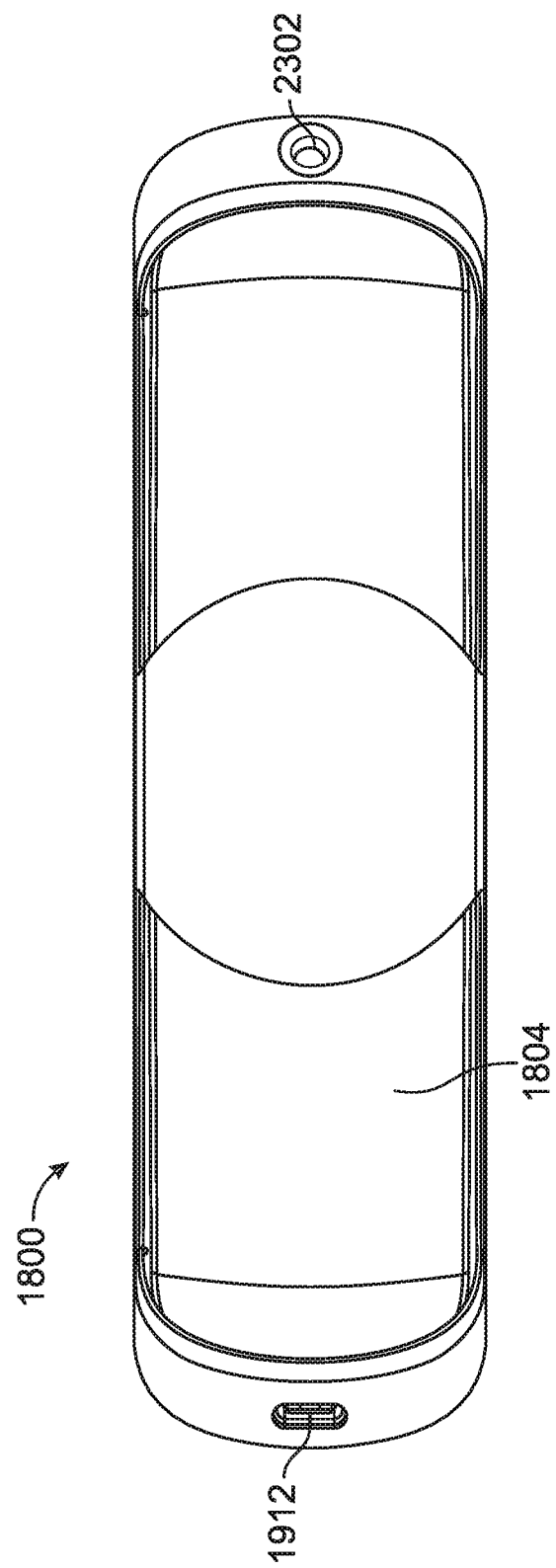
FIG. 24 is a front view of the exemplary battery-pack accessory illustrated in FIG. 19.
Figure 25:
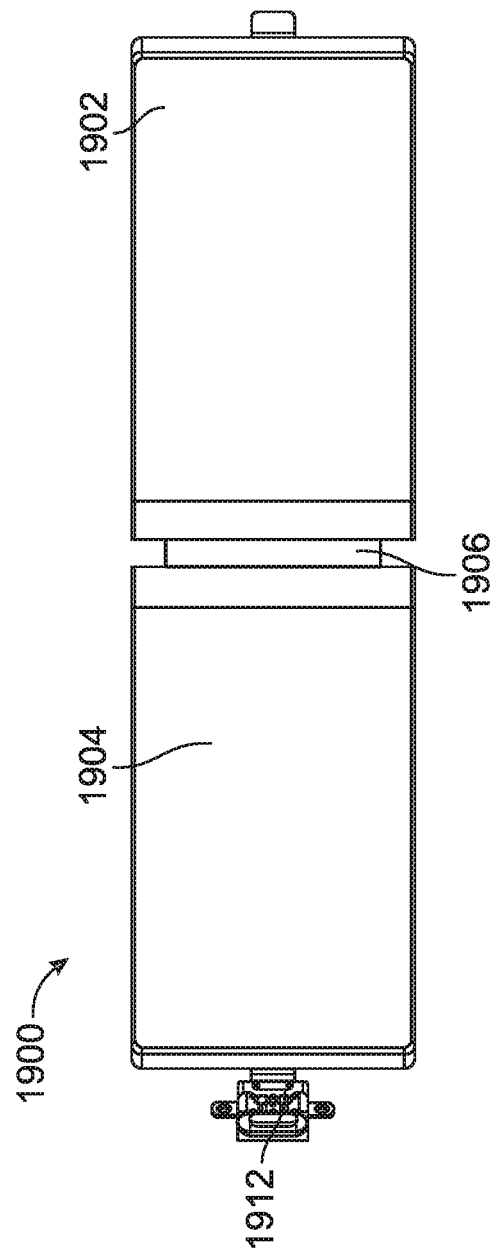
FIG. 25 is a front view of the exemplary components illustrated in FIGS. 20 and 21.
Figure 26:
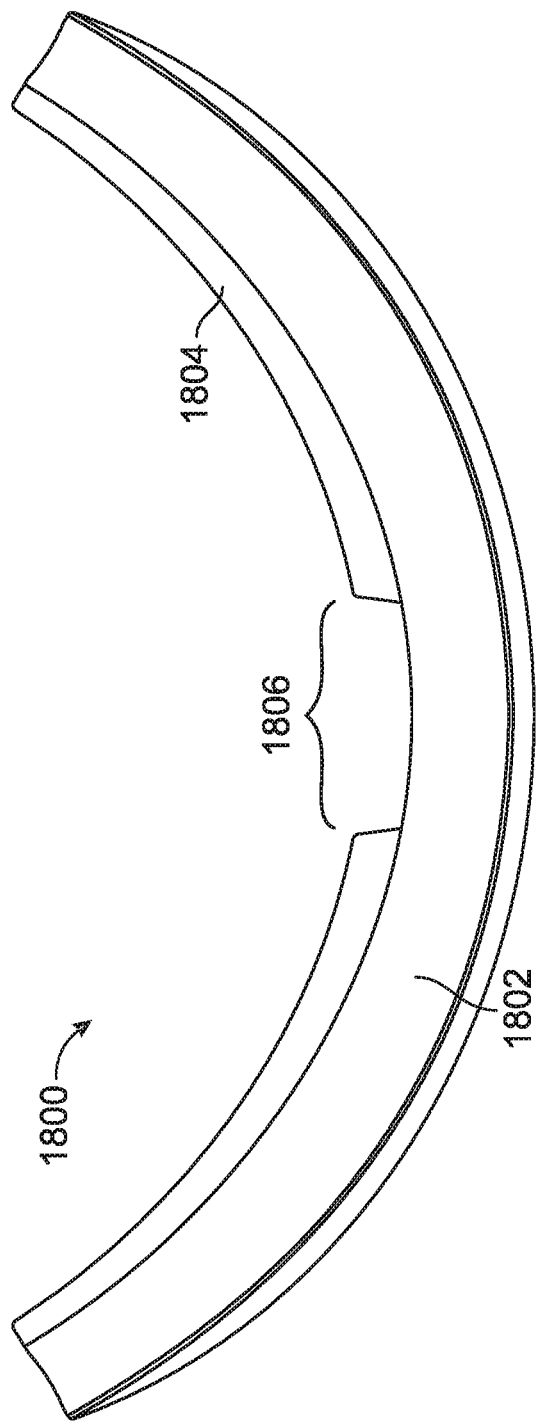
FIG. 26 is a top view of the exemplary battery-pack accessory illustrated in FIG. 19.
Figure 27:
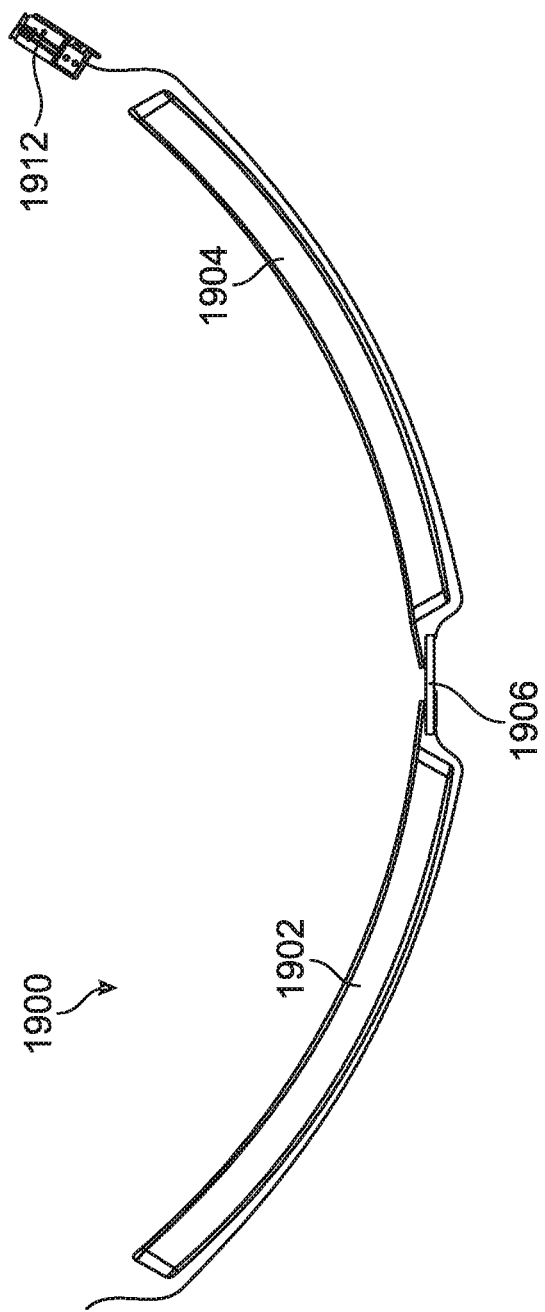
FIG. 27 is a top view of the exemplary components illustrated in FIGS. 20 and 21.

As shown in FIG. 19, removable battery-pack accessory 1800 may include a curved back element 1802 and a curved front element 1804 that house and surround a curved battery assembly 1900 shown in FIG. 20. In some examples, curved front element 1804 may be sized to interface with strap housing 1208 of backpiece 1206. As shown in FIGS. 19 and 28, curved front element 1804 may include a notch or opening 1806 and/or a notch or opening 2702 for exposing dial 1210 when attached to backpiece 1206 (e.g., as illustrated in FIGS. 29-31).

In the example shown in FIG. 20, battery assembly 1900 may include a left curved battery 1902, a right curved battery 1904, a printed circuit board 1906, ribbon cables 1908 and 1910, and at least one connector 1912. In some embodiments, curved batteries 1902 and or 1904 may be configured similar to curved battery cell 100, curved battery cell 200, or curved battery 300. In alternative embodiments, curved battery-pack accessory 1800 may include a single curved battery or more than two curved batteries.

In some embodiments, battery assembly 1900 may provide primary or auxiliary power to head-mounted display device 602. As shown in FIG. 29, removable battery-pack accessory 1800 may transmit power and/or other data to head-mounted display device 602 via a cable 2802. In some embodiments, battery assembly 1900 may receive power via one connector (e.g., connector 1912) and transmit power via another. In other embodiments, battery assembly 1900 may receive and transmit power via a single connector. In some embodiments, battery assembly 1900 may act as a power conduit that relays power to head-mounted display device 602. In some embodiments, printed circuit board 1906 may include circuitry configured to charge batteries 1902 and 1904 and/or relay power from batteries 1902 and 1904 to a connected head-mounted display system. In some embodiments, printed circuit board 1906 may represent a protection control module or a protection circuit module.

Removable battery-pack accessory 1800 may be attached to backpiece 1206 in any suitable manner. In one embodiment, removable battery-pack accessory 1800 may include an inner surface 2704 that is sized for a friction fit with surfaces 1216. Additionally or alternatively, removable battery-pack accessory 1800 may include ridges 2706 that are sized for a snap fit with surfaces 1216.

Figure 32:
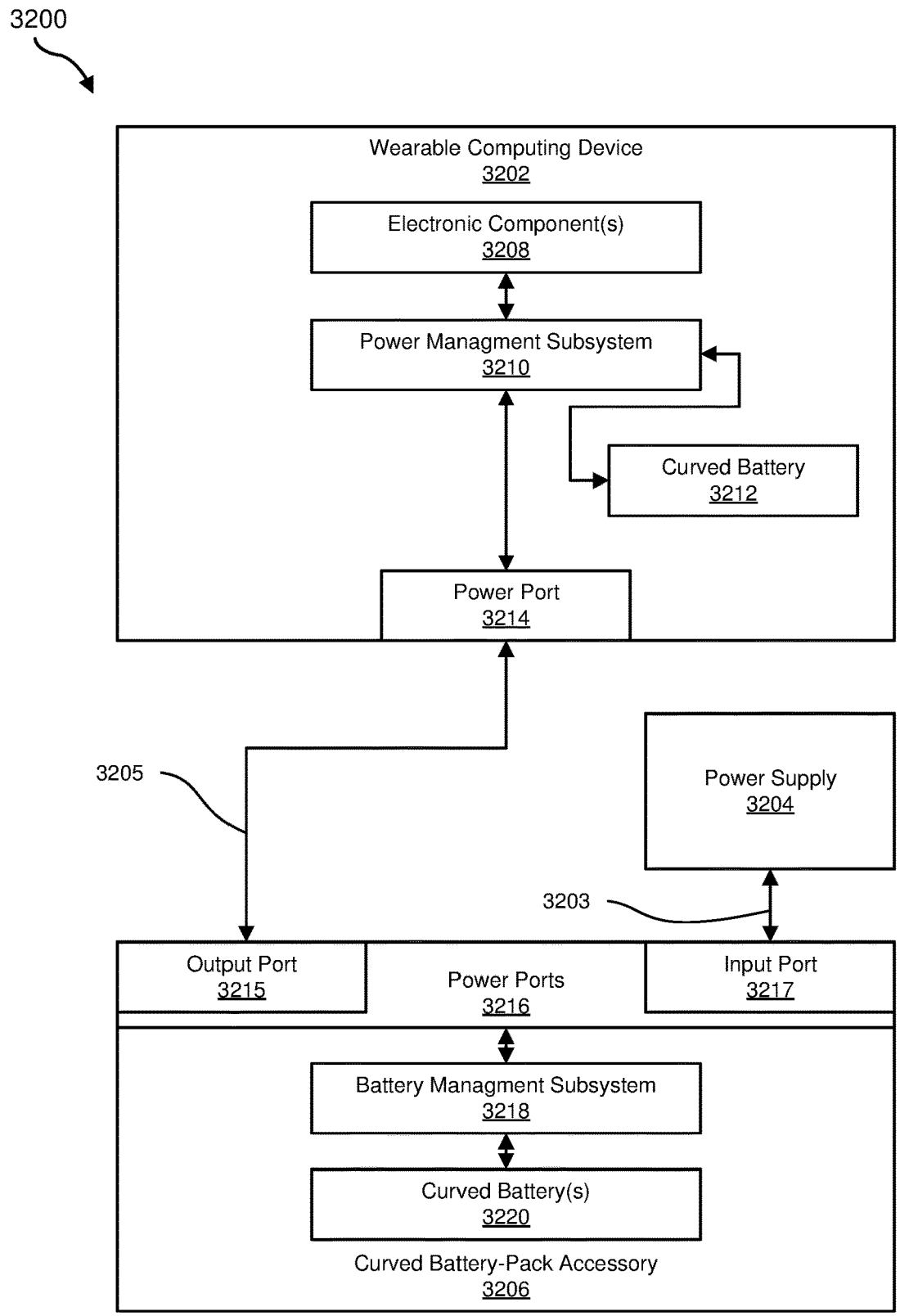
FIG. 32 is a block diagram of an exemplary wearable computing device and curved battery-pack accessory in accordance with some embodiments.

FIG. 32 shows an exemplary system 3200 consisting of a wearable computing device 3202 (e.g., head-mounted display 602), a power supply 3204 (e.g., an Alternating Current (AC) power source or a Direct Current (DC) power source), and a curved battery-pack accessory 3206 (e.g., curved battery-pack accessory 1800). As shown, wearable computing device 3202 may include one or more electronic components 3208, a power management subsystem 3210 for supplying power to electronic components 3208, one or more curved batteries 3212 for supplying power to power management subsystem 3210, and a power port 3214 for connecting to external power sources (e.g., power supply 3204 or curved battery-pack accessory 3206). Curved battery-pack accessory 3206 may include one or more curved batteries 3220, a battery management subsystem 3218 for supplying power to or extracting power from curved batteries 3220, and power ports 3216 (e.g., an input port 3217 for receiving power from an external power source and an output port 3215 for supplying power to an external device).

In the configuration shown in FIG. 32, power supply 3204 may be detachably connected to curved battery-pack accessory 3206 by a power cable 3203 at input port 3217, and wearable computing device 3202 may be detachably connected to curved battery-pack accessory 3206 by a power cable 3205 at power port 3214 and output port 3215. In this configuration, curved battery-pack accessory 3206 may relay power from power supply 3204 to wearable computing device 3202 while also charging curved batteries 3220. In an alternative configuration, power supply 3204 may be detached from curved battery-pack accessory 3206. In this configuration, curved battery-pack accessory 3206 may supply power from curved batteries 3220 to wearable computing device 3202. In another alternative configuration, power supply 3204 may be attached to curved battery-pack accessory 3206 while wearable computing device 3202 is detached from curved battery-pack accessory 3206. In this configuration, curved battery-pack accessory 3206 may charge curved batteries 3220 without supplying power to any external device.

Figure 33:
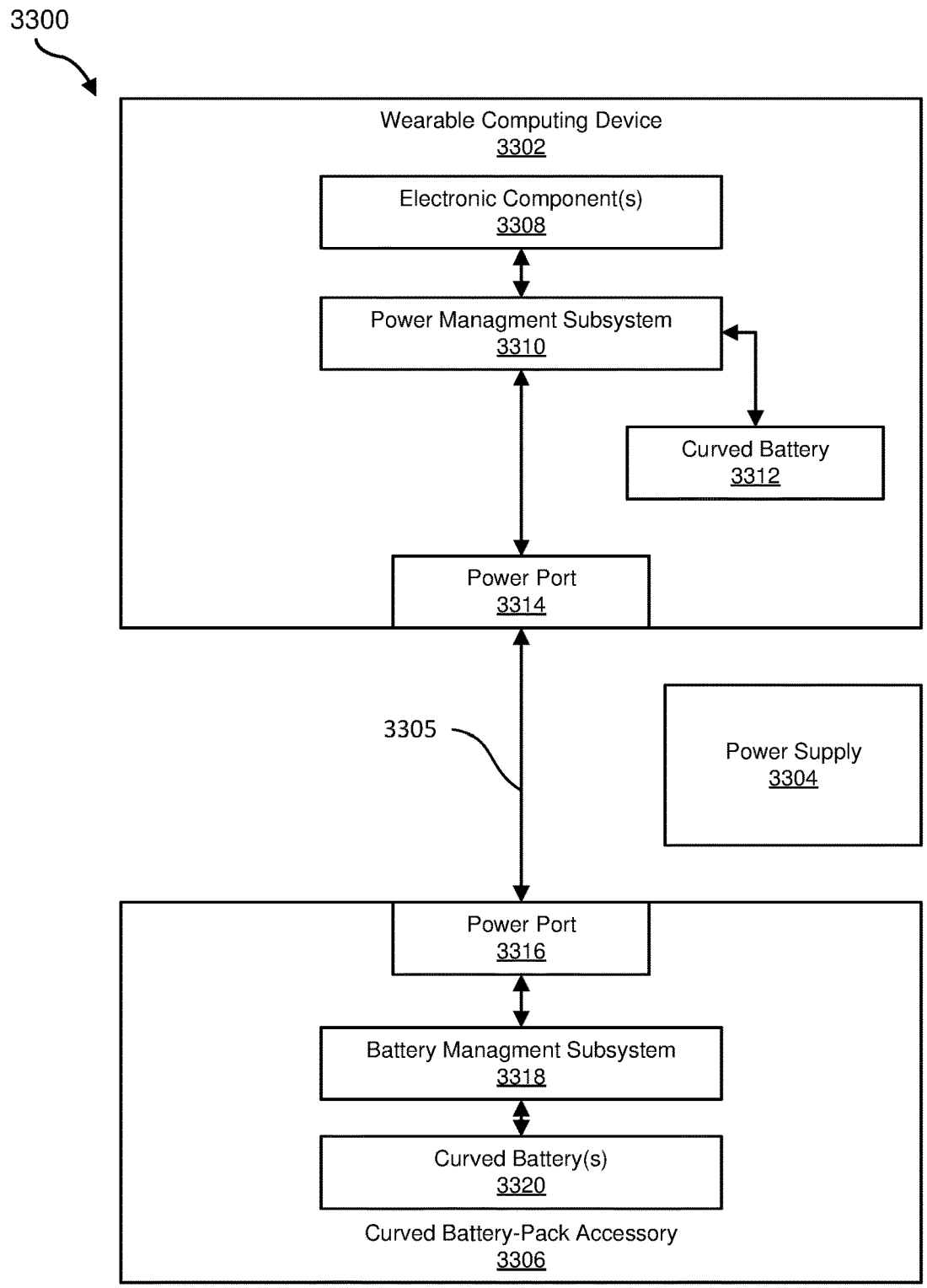
FIG. 33 is a block diagram of an exemplary wearable computing device and curved battery-pack accessory in accordance with some embodiments.
Figure 34:
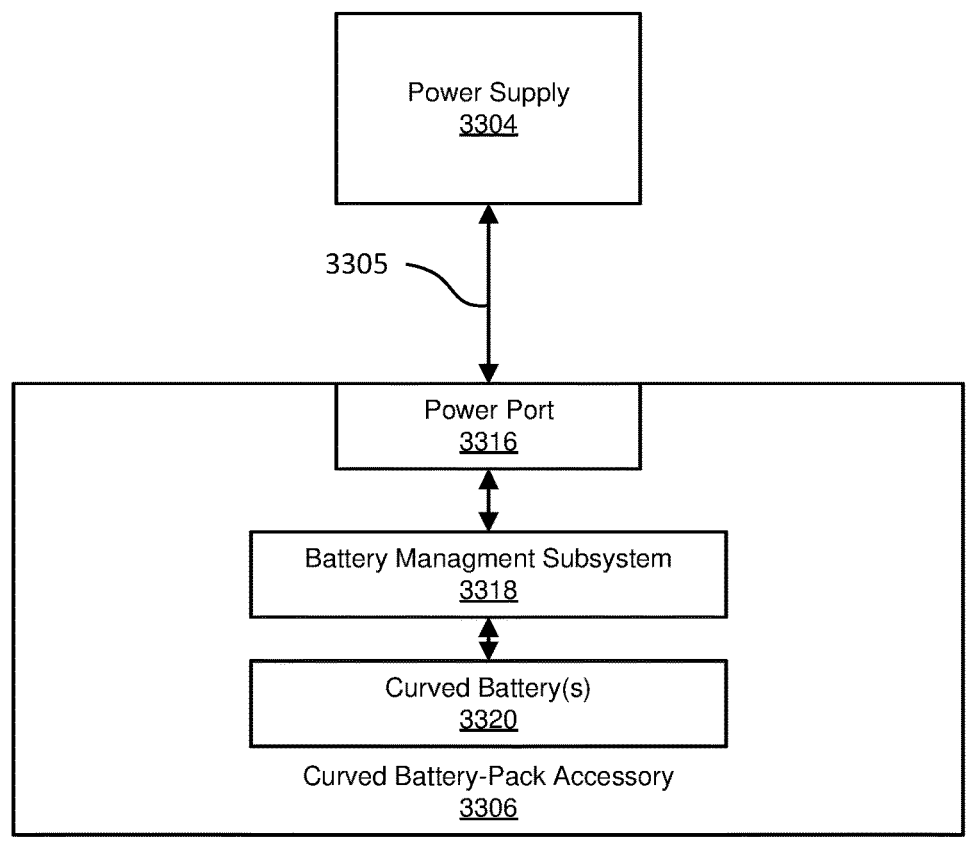
FIG. 34 is another block diagram of the exemplary curved battery-pack accessory shown in FIG. 33 in accordance with some embodiments.

FIG. 33 shows an exemplary system 3300 consisting of a wearable computing device 3302 (e.g., head-mounted display 602), a power supply 3304 (e.g., an Alternating Current (AC) power source or a Direct Current (DC) power source), and a curved battery-pack accessory 3306 (e.g., curved battery-pack accessory 1800). As shown, wearable computing device 3302 may include one or more electronic components 3308, a power management subsystem 3310 for supplying power to electronic components 3308, one or more curved batteries 3312 for supplying power to power management subsystem 3310, and a power port 3314 for connecting to external power sources (e.g., power supply 3304 or curved battery-pack accessory 3306). Curved battery-pack accessory 3306 may include one or more curved batteries 3320, a battery management subsystem 3318 for supplying power to or extracting power from curved batteries 3320, and a power port 3316 for receiving power from an external power source and for supplying power to an external device.

In the configuration shown in FIG. 33, power port 3314 of wearable computing device 3302 may be detachably connected to power port 3316 of curved battery-pack accessory 3306. In this configuration, curved battery-pack accessory 3306 may supply power from curved batteries 3320 to wearable computing device 3302. In the configuration shown in FIG. 34, power supply 3304 may be detachably connected to curved battery-pack accessory 3306 by power carrying cable 3305 at power port 3316. In this configuration, curved battery-pack accessory 3306 may use power from power supply 3304 to charge curved batteries 3320.

Figure 35:
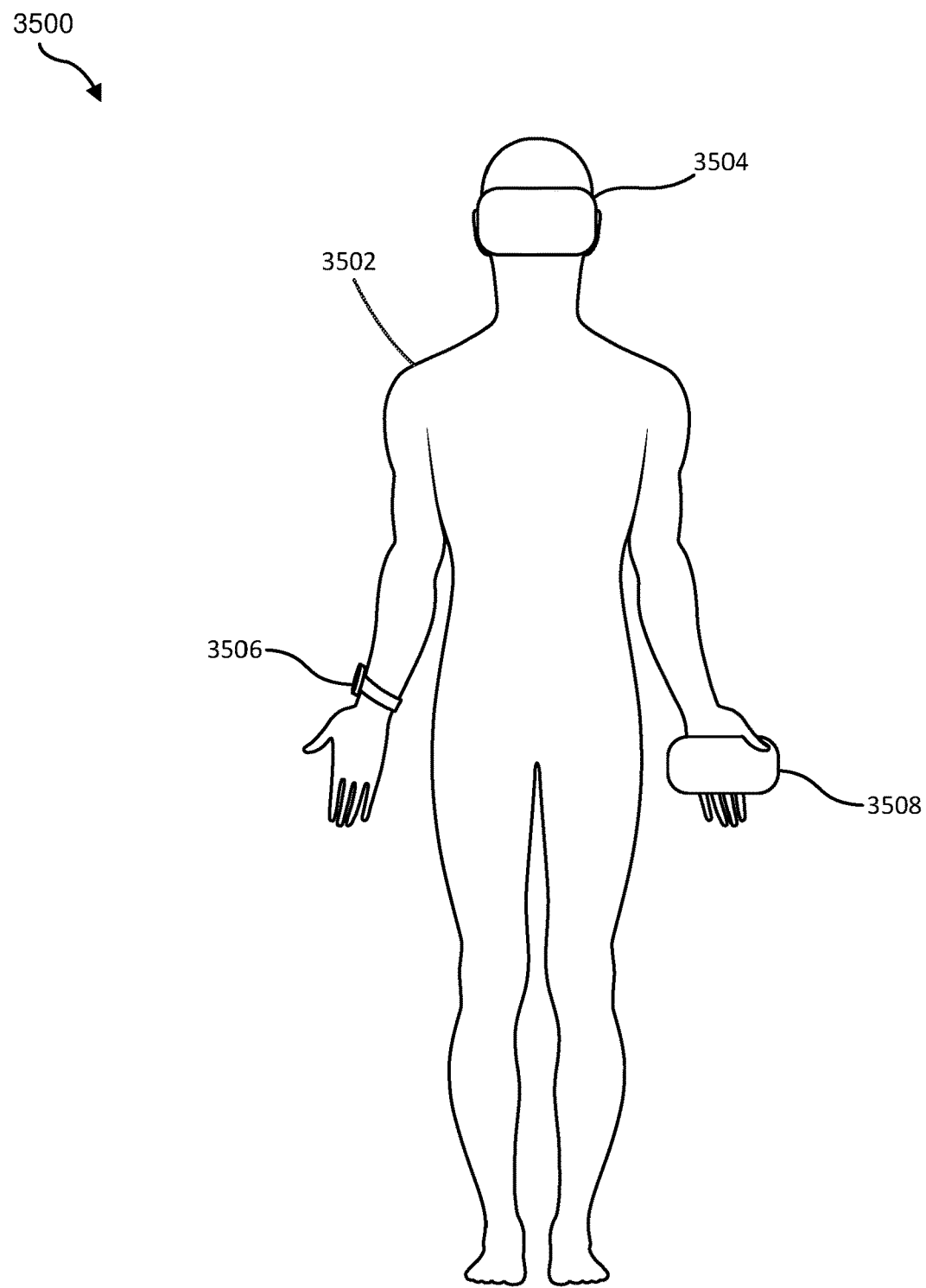
FIG. 35 is a front view of a user wearing exemplary curved wearable devices in accordance with some embodiments.
Figure 36:
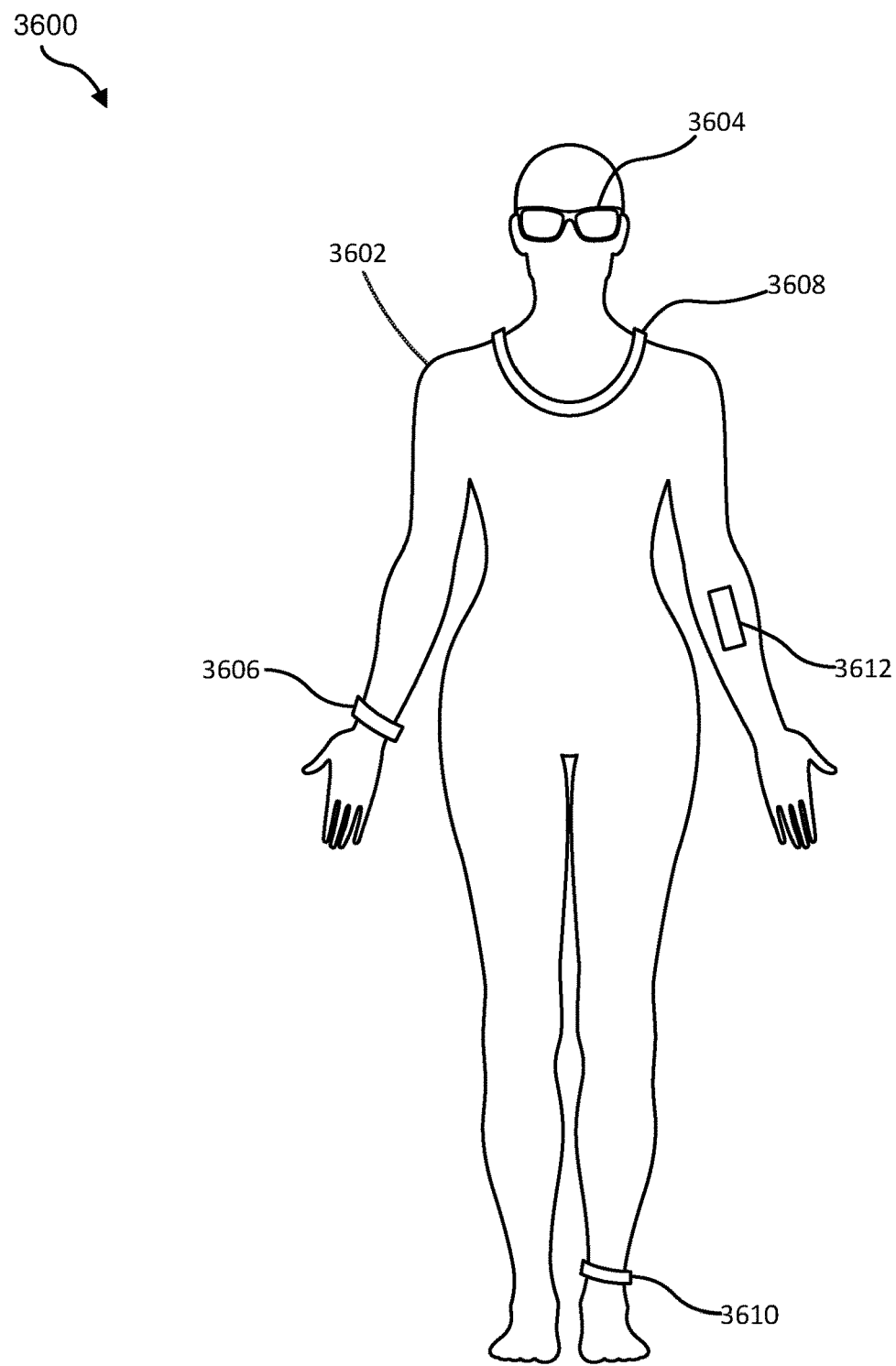
FIG. 36 is a front view of another user wearing exemplary curved wearable devices in accordance with some embodiments.

The curved batteries and curved battery-pack accessories disclosed herein may be implemented into, conformed to, and/or suitably shaped to fit within a variety of wearable devices. For example, all or a portion of example systems 3200 or 3300 may represent portions of example systems 3500 and 3600 shown in FIGS. 35 and 36. As shown in FIG. 35, system 3500 may include a user 3502 and various power-consuming and power-supplying devices that are worn or held by user 3502. For example, FIG. 35 illustrates a head-mounted display system 3504, such as head-mounted display system 600, worn on the head of user 3502, a smart watch 3506 worn on a wrist of user 3502, and a smart phone 3508 held in a hand of user 3502. As shown in FIG. 36, system 3600 may include a user 3602 and various power-consuming and power-supplying devices that are worn or held by user 3602. For example, FIG. 36 illustrates a head-mounted display device 3604, such as head-mounted display device 4700 illustrated in FIG. 47, worn on the head of user 3602, an electronic device 3606 worn on a wrist of user 3602, an electronic device 3608 worn about neck region of user 3602, an electronic device 3610 worn on an ankle of user 3602, and a flexible electronic device 3612 worn on a forearm of user 3602. In some examples, one or more of the devices shown in FIGS. 35 and 36 may be shaped to conform to a corresponding portion of the wearers' bodies, and the curved batteries contained therein may be similarly shaped to conform to the corresponding portion of the wearers' bodies.

Figure 37:
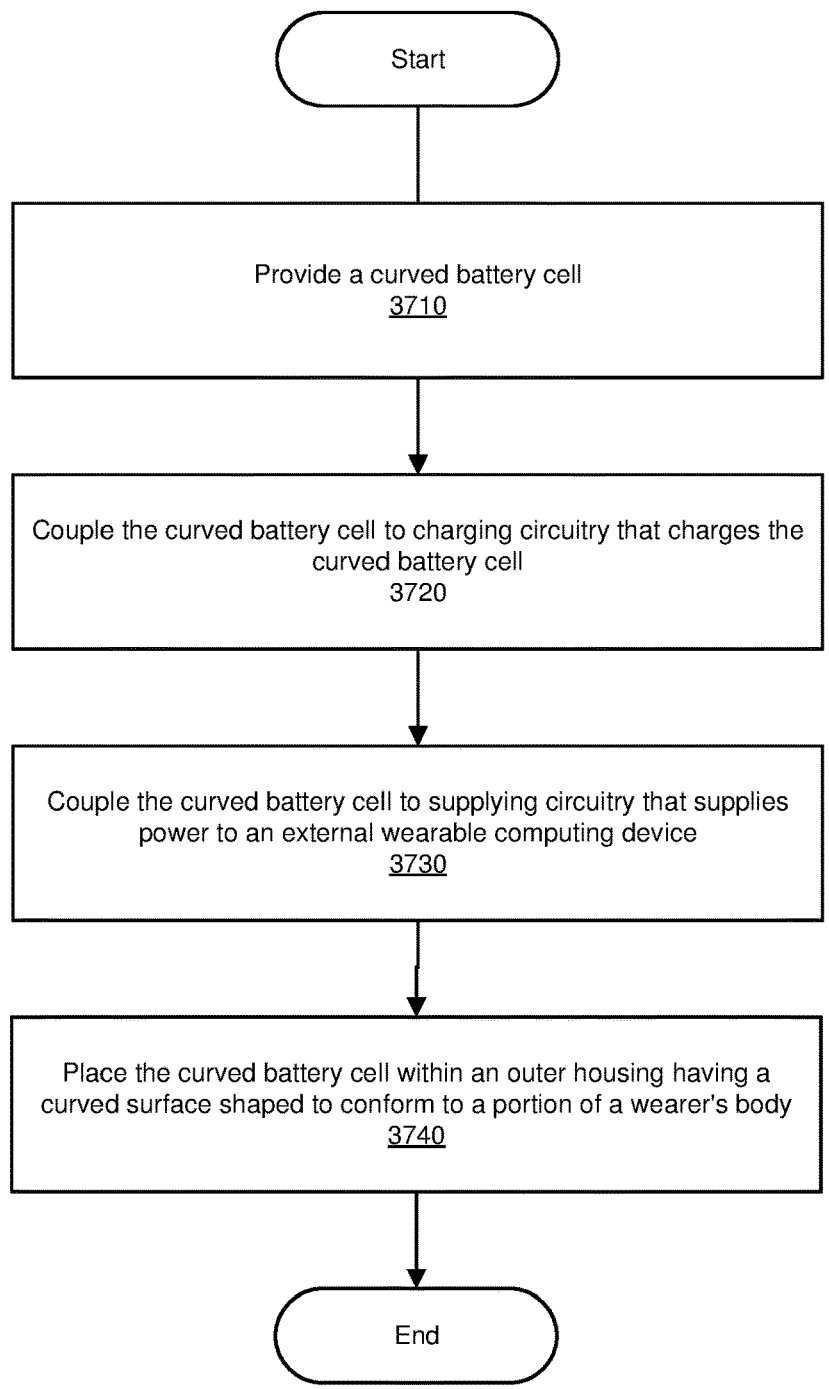
FIG. 37 is a flow diagram of an exemplary method for assembling a curved battery-pack accessory.

FIG. 37 is a flow diagram of an exemplary assembly method 3700 for assembling a curved battery-pack accessory according to any of the embodiments disclosed herein. The steps shown in FIG. 37 may be performed by an individual and/or by any suitable manual and/or automated apparatus. As illustrated in FIG. 37, at step 3710, a curved battery cell shaped to fit within the curved battery-pack accessory may be provided. In some examples, the curved battery cell may be shaped to minimize the size of the curved battery-pack accessory. At step 3720, the curved battery cell may be coupled to charging circuitry configured to charge the curved battery within the curved battery-pack accessory. At step 3730, the curved battery cell may be coupled to supplying circuitry configured to supply power to an external wearable computing device. At step 3740, the curved battery cell may be placed within an outer housing having a curved surface shaped to conform to a portion of a wearer's body.

Figure 38:
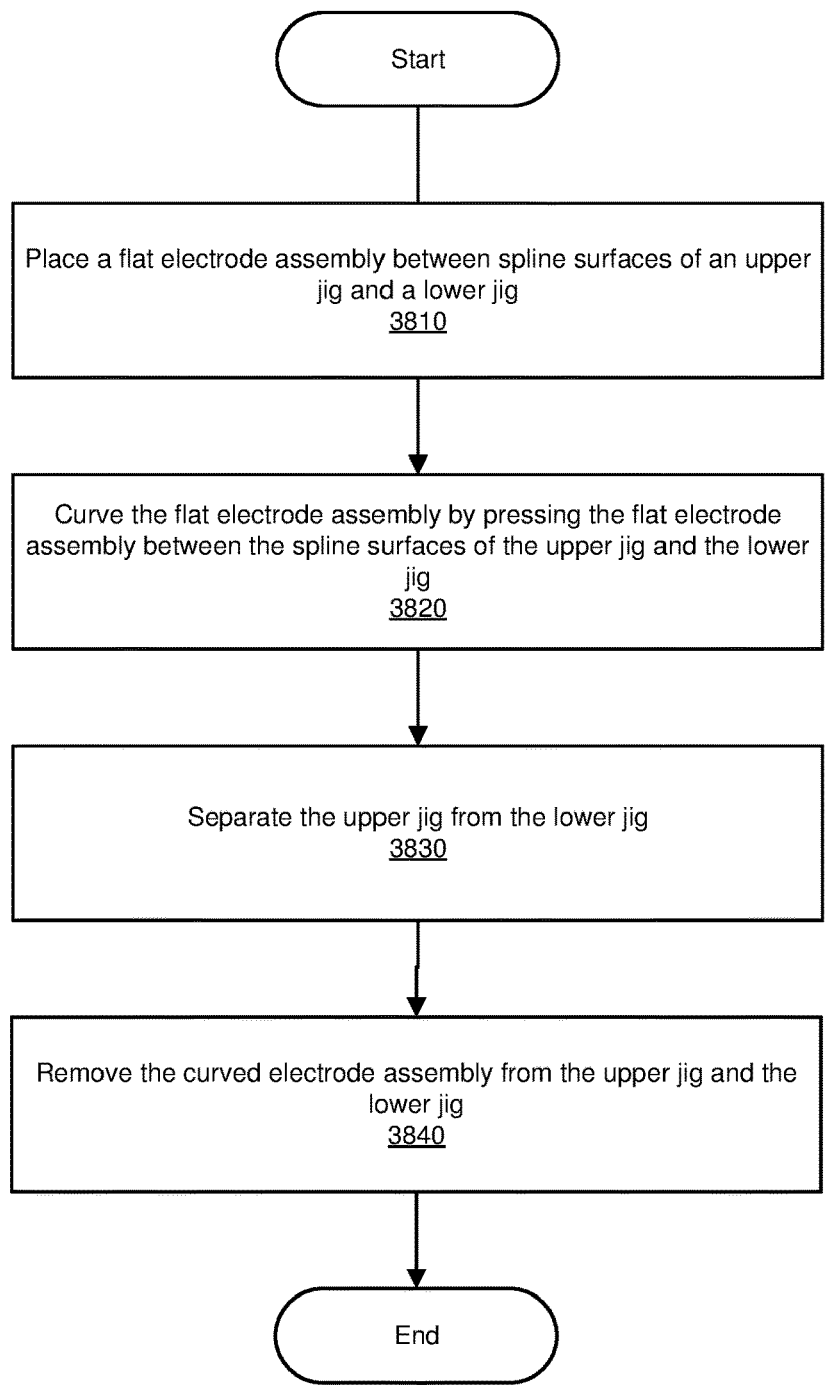
FIG. 38 is a flow diagram of an exemplary method for manufacturing a curved battery.
Figure 39:
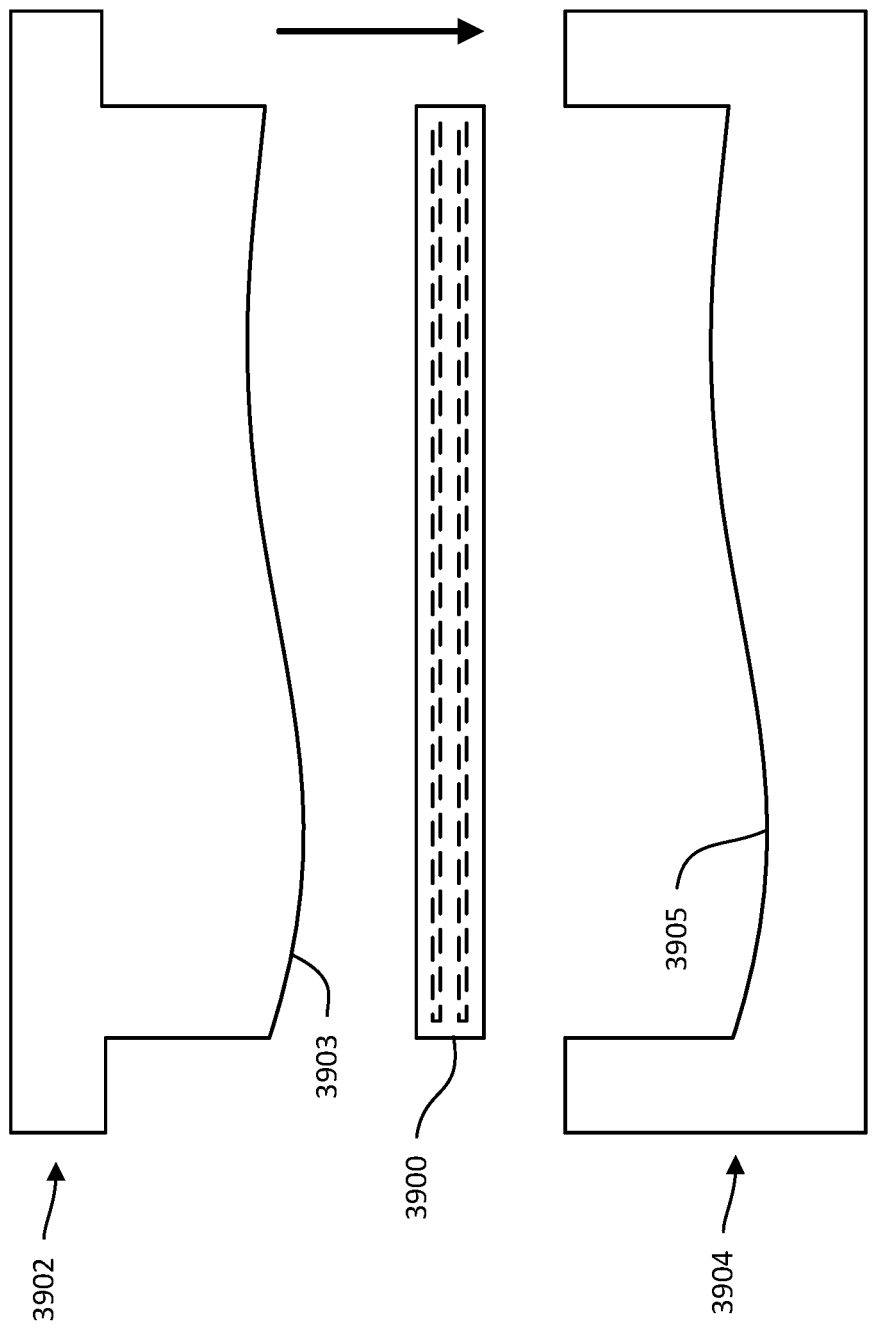
FIG. 39 is an illustration of an exemplary step of manufacturing a curved battery in accordance with some embodiments.
Figure 40:
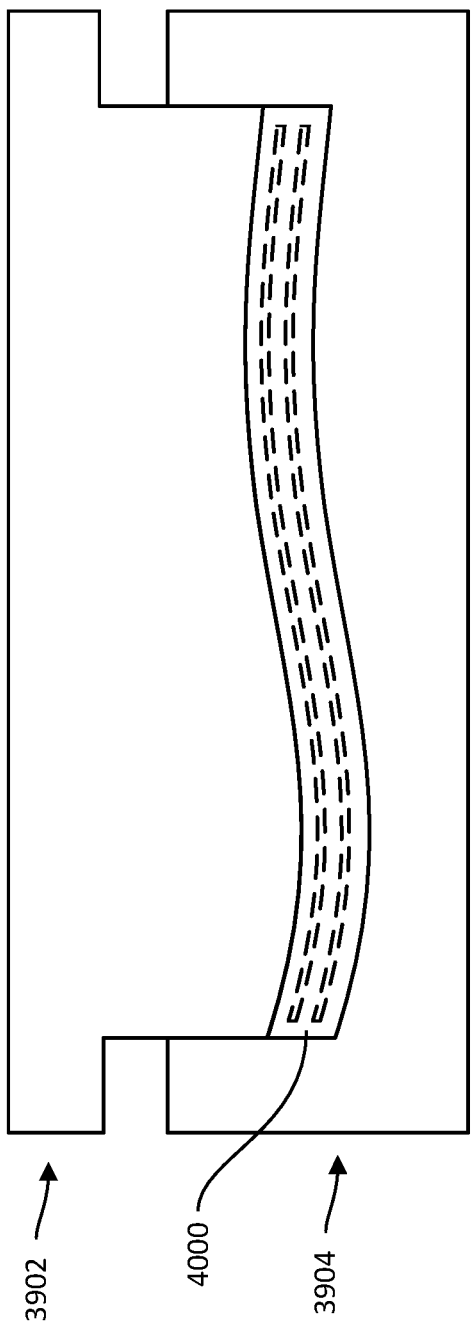
FIG. 40 is an illustration of another exemplary step of manufacturing a curved battery in accordance with some embodiments.
Figure 41:
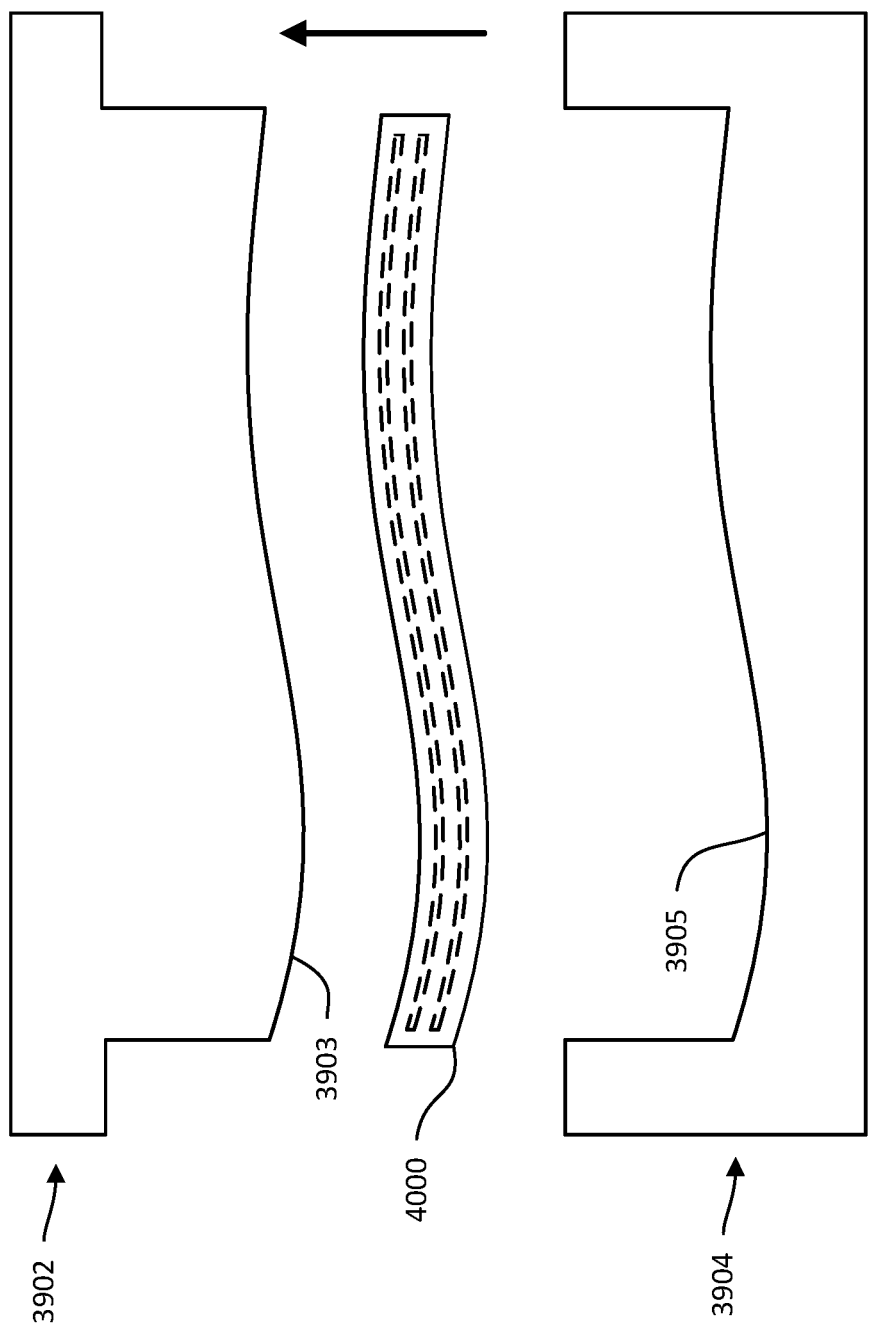
FIG. 41 is an illustration of another exemplary step of manufacturing a curved battery in accordance with some embodiments.

FIG. 38 is a flow diagram of an exemplary manufacturing method 3800 for forming curved battery cells according to any of the embodiments disclosed herein. The steps shown in FIG. 38 may be performed by an individual and/or by any suitable manual and/or automated apparatus. As illustrated in FIG. 38, at step 3810, a flat electrode assembly may be placed between spline surfaces of an upper jig and a lower jig of a molding or punching tool. Using FIG. 39 as an example, a flat cuboidal electrode assembly 3900 may be placed between an upper jig 3902 and a lower jig 3904. As shown in FIG. 39, upper jig 3902 and lower jig 3904 may have matching spline surfaces 3903 and 3905. In some embodiments, the spline surfaces of upper jig 3902 and/or lower jig 3904 may be machined or otherwise shaped to substantially match the curvatures of one or more users' bodies (e.g., faces, heads, wrists, etc.).

At step 3820 in FIG. 38, the flat electrode assembly may be curved by pressing the flat electrode assembly between the spline surfaces of the upper jig and the lower jig. Using FIGS. 39 and 40 as examples, flat cuboidal electrode assembly 3900 may be turned into curved electrode assembly 4000 by pressing flat cuboidal electrode assembly 3900 between upper jig 3902 and lower jig 3904. In some examples, the upper jig and the lower jig may be heated before or while pressing the flat electrode assembly. In some examples, pressing step 3820 may be repeated multiple times to get the final shape needed.

At step 3830 in FIG. 38, the upper jig may be separated from the lower jig to reveal the curved electrode assembly. Then at step 3840, the curved electrode assembly may be removed from the upper jig and the lower jig. Using FIG. 40 as an example, upper jig 3902 may be separated from lower jig 3904 to reveal curved electrode assembly 4000. After removal, a curved electrode assembly may be placed in a cell case or packaging. An electrolyte may also be added to the cell case or packaging, and a charging formation process may be initiated. Finally, the curved electrode assembly may be incorporated into a wearable device (e.g., a head-mounted device) or a curved battery pack. In some embodiments, the curved electrode assembly may be combined with additional curved electrode assemblies to form a curved battery pack. In some embodiments, the curved electrode assembly and the additional curved electrode assemblies may have substantially similar curvatures. Alternatively, the curved electrode assembly and the additional curved electrode assemblies may have different curvatures.

Figure 42:
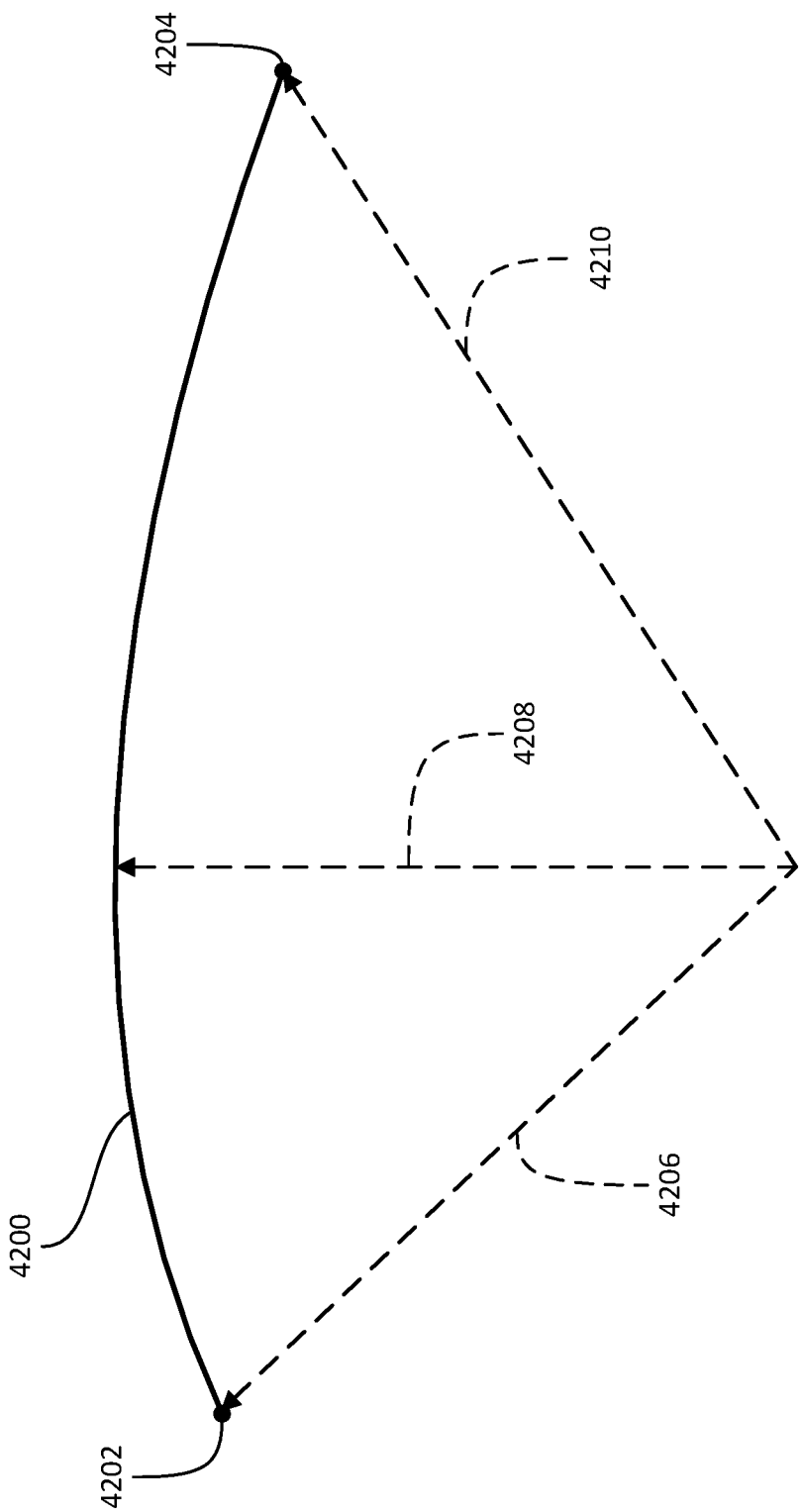
FIG. 42 is an illustration of an exemplary curve in accordance with some embodiments.
Figure 43:
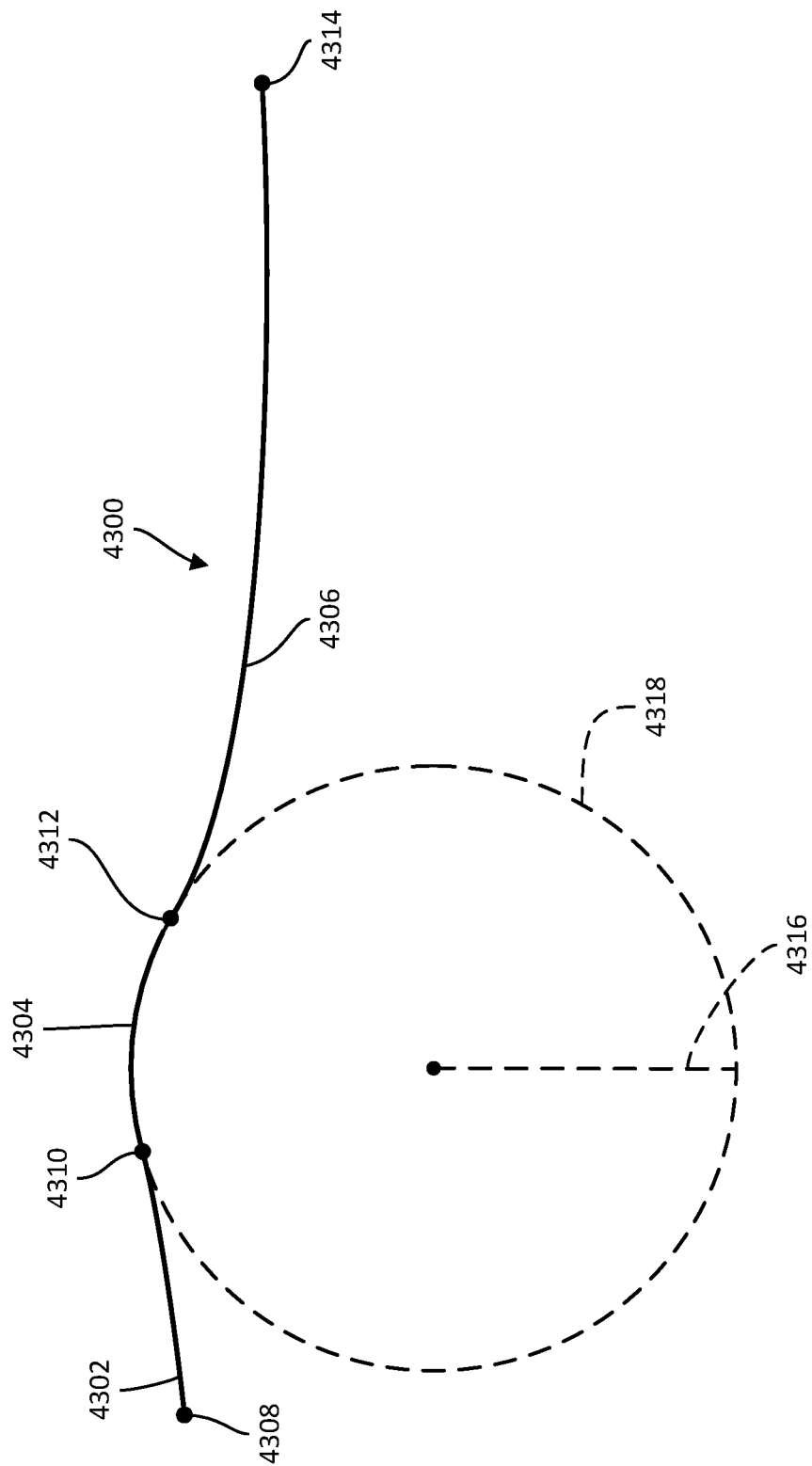
FIG. 43 is an illustration of another exemplary curve in accordance with some embodiments.
Figure 44:
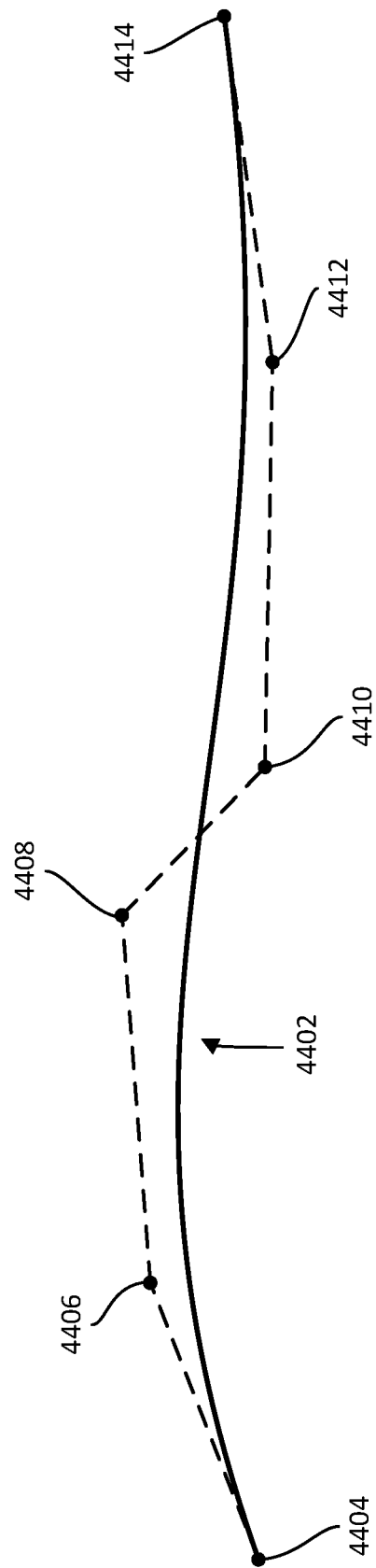
FIG. 44 is an illustration of another exemplary curve in accordance with some embodiments.

The curved batteries and curved battery-pack accessories described herein may be modeled by or shaped to conform to any suitable simple or complex curve. For example, the curved batteries and curved battery-pack accessories described herein may be modeled by or shaped to conform to all or a portion of one of the exemplary curves illustrated in FIGS. 42-44. FIG. 42 illustrates an exemplary non-uniform curve 4200 having a starting point 4202 and an ending point 4204. In this example, the radius of curvature of non-uniform curve 4200 may range from a radius 4206 at point 4202 to a radius 4208 midway between starting point 4202 and ending point 4204 to a radius 4210 at ending point 4204. As shown, radius 4206, radius 4208, and radius 4210 may all be different radii. FIG. 43 illustrates a non-uniform curve 4300 having multiple curve segments 4302, 4304, and 4306. In some examples, the systems disclosed herein may represent one or more of curve segments 4302-4306 using a polynomial function. As shown, curve segment 4302 may begin at point 4308 and end at point 4310, curve segment 4304 may begin at point 4310 and end at point 4312, and curve segment 4306 may begin at point 4312 and end at point 4314. In this example, curve segment 4302 may have a continuously varying radius of curvature, curve segment 4304 may have a constant radius of curvature (i.e., equal to radius 4316 of circle 4318), and curve segment 4306 may have a continuously varying radius of curvature. FIG. 44 illustrates an exemplary spline 4402 formed by multiple control points (e.g., control points 4404, 4406, 4408, 4410, 4412, and 4414). In some examples, spline 4402 may represent an approximating curve and may pass near one or more of control points 4404-4414.

Example Embodiments

Example 1: A wearable battery-pack accessory including (1) one or more curved batteries, (2) charging circuitry that charges the one or more curved batteries, (3) supplying circuitry that supplies power to a connected external computing device, and (4) an outer housing including a curved surface shaped to conform to a portion of a wearer's body.

Example 2: The wearable battery-pack accessory of Example 1, wherein the connected external computing device is a head-mounted display system.

Example 3: The wearable battery-pack accessory of any of Examples 1 and 2 further including an interface for coupling the wearable battery-pack accessory to a strap assembly of the head-mounted display system.

Example 4: The wearable battery-pack accessory of any of Examples 1-3, wherein the one or more curved batteries include (1) a top battery curved to conform to a top side of the wearer's head, (2) a right battery curved to conform to a right side of the wearer's head, or (3) a left battery curved to conform to a left side of the wearer's head.

Example 5: The wearable battery-pack accessory of any of Examples 1-4, wherein the one or more curved batteries include a single battery curved to conform to a back side of the wearer's head and extend from a right side of the wearer's head to a left side of the wearer's head.

Example 6: The wearable battery-pack accessory of any of Examples 1-5, wherein the curved surface of the outer housing has a non-uniform radius of curvature that approximates a curvature of the portion of the wearer's body.

Example 7: The wearable battery-pack accessory of any of Examples 1-6, wherein each of the one or more curved batteries has an inner radius between 80 millimeters and 95 millimeters.

Example 8: The wearable battery-pack accessory of any of Examples 1-7, wherein each of the one or more curved batteries has an inner radius between 70 millimeters and 125 millimeters.

Example 9: The wearable battery-pack accessory of any of Examples 1-8, further including (1) an input port for receiving power from an external power source and (2) an output port for transmitting power to the connected external computing device, wherein the charging circuitry charges the one or more curved batteries using power from the external power source while the supplying circuitry supplies power to the connected external computing device.

Example 10: The wearable battery-pack accessory of any of Examples 1-9, further including an input/output port for receiving power from an external power source and transmitting power to the connected external computing device, wherein the charging circuitry charges the one or more curved batteries when the external power source is connected to the input/output port and the supplying circuitry supplies power to the connected external computing device when the connected external computing device is connected to the input/output port.

Example 11: A head-mounted display system including (1) a head-mounted display, (2) a strap that is coupled to the head-mounted display and wraps around the back of a user's head when the user is wearing the head-mounted display, and (3) a battery-pack accessory detachably coupled to the strap, the battery-pack accessory including (a) one or more curved batteries, (b) charging circuitry that charges the one or more curved batteries, (c) supplying circuitry that supplies power to the head-mounted display, and (d) an outer housing including a curved surface shaped to conform to a portion of the user's head.

Example 12: The head-mounted display system of Example 11, wherein the strap includes an adjustment mechanism for adjusting a size of the strap, the adjustment mechanism includes a dial, and the outer housing of the battery-pack accessory includes a notch that exposes the dial when the battery-pack accessory is coupled to the strap.

Example 13: The head-mounted display system of any of Examples 11-12, wherein the outer housing of the battery-pack accessory includes an interface for coupling the battery-pack accessory, via a friction fit, to the strap of the head-mounted display system.

Example 14: The head-mounted display system of any of Examples 11-13, wherein the one or more curved batteries include (1) a top battery curved to conform to a top side of the wearer's head, (2) a right battery curved to conform to a right side of the user's head, or (3) a left battery curved to conform to a left side of the user's head.

Example 15: The head-mounted display system of any of Examples 11-14, wherein the one or more curved batteries include a single battery curved to conform to a back side of the user's head and extend from a right side of the user's head to a left side of the user's head.

Example 16: The head-mounted display system of any of Examples 11-15, wherein each of the one or more curved batteries has an inner radius between 80 millimeters and 95 millimeters.

Example 17: The head-mounted display system of any of Examples 11-16, wherein each of the one or more curved batteries has an inner radius between 70 millimeters and 125 millimeters.

Example 18: The head-mounted display system of any of Examples 11-17, wherein the battery-pack accessory further includes (1) an input port for receiving power from an external power source and (2) an output port for transmitting power to the head-mounted display, wherein the charging circuitry charges the one or more curved batteries using power from the external power source while the supplying circuitry supplies power to the head-mounted display.

Example 19: The head-mounted display system of any of Examples 11-18, further including an input/output port for receiving power from an external power source and transmitting power to the head-mounted display, wherein the charging circuitry charges the one or more curved batteries when the external power source is connected to the input/output port and the supplying circuitry supplies power to the head-mounted display when the head-mounted display is connected to the input/output port.

Example 20: A method including (1) providing a curved battery, (2) coupling the curved battery to charging circuitry that charges the curved battery, (3) coupling the curved battery to supplying circuitry that supplies power to an external computing device; and (4) placing the curved battery, the charging circuitry, and the supplying circuitry within an outer housing comprising a curved surface shaped to conform to a portion of a wearer's body.

Additional Example Embodiments

Example 21: A curved battery cell including (1) a positive terminal, (2) a negative terminal, (3) one or more curved electrodes, and (4) an outer case encasing the one or more curved electrodes, wherein the outer case includes at least one curved surface having a non-uniform radius of curvature.

Example 22: The curved battery cell of Example 21, wherein the curved surface is a spline surface.

Example 23: The curved battery cell of any of Examples 21-22, wherein the curved surface is shaped to conform to one or more users' bodies.

Example 24: The curved battery cell of any of Examples 21-23, wherein the curved surface is shaped to conform to one or more users' heads.

Example 25: The curved battery cell of any of Examples 21-24, wherein the curved surface is shaped to conform to one side of the back of one or more users' heads.

Example 26: The curved battery cell of any of Examples 21-25, wherein the curved surface is shaped to conform to a portion of a strap of a head-mounted display system when the head-mounted display system is worn and the portion of the strap conforms to a user's head.

Example 27: The curved battery cell of any of Examples 21-26, wherein the curved surface includes at least a first area and a second area, the first area has a first radius of curvature, the second area has a second radius of curvature, and the first radius of curvature and the second radius of curvature are different.

Example 28: The curved battery cell of any of Examples 21-27, wherein the curved surface includes at least a first area and a second area, the first area has a constant radius of curvature, and the second area has a varying radius of curvature.

Example 29: The curved battery cell of any of Examples 21-28, wherein the curved surface is an inner surface of the outer case having a non-uniform inner radius within a range of 80 millimeters and 95 millimeters.

Example 30: The curved battery cell of any of Examples 21-29, wherein the curved surface is an inner surface of the outer case having a non-uniform inner radius within a range of 70 millimeters and 125 millimeters.

Example 31: A curved battery pack including (1) a first curved battery cell having a first outer surface, wherein the first outer surface has a first non-uniform curvature and (2) a second curved battery cell having a second outer surface, wherein the second outer surface has a second non-uniform curvature.

Example 32: The curved battery pack of Example 31, wherein the first outer surface and the second outer surface are spline surfaces.

Example 33: The curved battery pack of any of Examples 31-32, wherein the first non-uniform curvature and the second non-uniform curvature are equal.

Example 34: The curved battery pack of any of Examples 31-33, wherein the first non-uniform curvature and the second non-uniform curvature are mirrored.

Example 35: The curved battery pack of any of Examples 31-34, wherein the first non-uniform curvature and the second non-uniform curvature are spline curvatures.

Example 36: The curved battery pack of any of Examples 31-35, wherein the first outer surface and the second outer surface are shaped to conform to one or more users' bodies.

Example 37: The curved battery pack of any of Examples 31-36 further including a bendable joining member coupling the first curved battery cell to the second curved battery cell.

Example 38: A method including (1) placing a flat electrode assembly between matching spline surfaces of an upper jig and a lower jig, (2) curving the flat electrode assembly by pressing the flat electrode assembly between the spline surfaces of the upper jig and the lower jig, (3) separating the upper jig from the lower jig, and (4) removing the curved electrode assembly from the upper jig and the lower jig.

Example 39: The method of Example 38 further including heating the upper jig and the lower jig.

Example 40: The method of any of Examples 38-39, wherein the flat electrode assembly includes a plurality of stacked electrodes.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 4500 in FIG. 45. Other artificial-reality systems may include an NED that also provides visibility into the real world (e.g., augmented-reality system 4600 in FIG. 46) or that visually immerses a user in an artificial reality (e.g., virtual-reality system 4800 in FIG. 48). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 45:
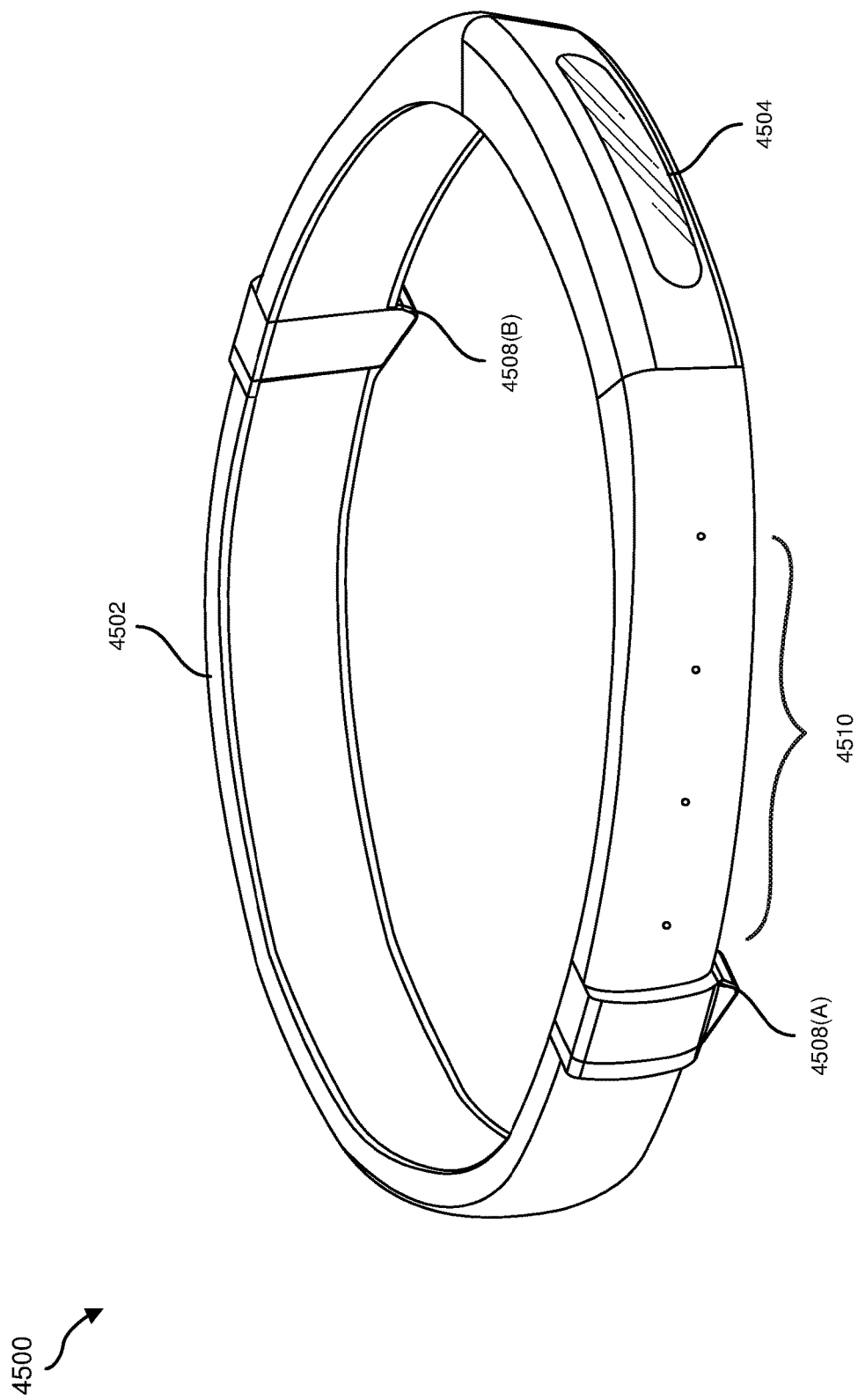
FIG. 45 is an illustration of an exemplary artificial-reality headband that may be used in connection with embodiments of this disclosure.

Turning to FIG. 45, augmented-reality system 4500 generally represents a wearable device dimensioned to fit about a body part (e.g., a head) of a user. As shown in FIG. 45, system 4500 may include a frame 4502 and a camera assembly 4504 that is coupled to frame 4502 and configured to gather information about a local environment by observing the local environment. Augmented-reality system 4500 may also include one or more audio devices, such as output audio transducers 4508(A) and 4508(B) and input audio transducers 4510. Output audio transducers 4508(A) and 4508(B) may provide audio feedback and/or content to a user, and input audio transducers 4510 may capture audio in a user's environment.

As shown, augmented-reality system 4500 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 4500 may not include an NED, augmented-reality system 4500 may include other types of screens or visual feedback devices (e.g., a display screen integrated into a side of frame 4502).

Figure 46:
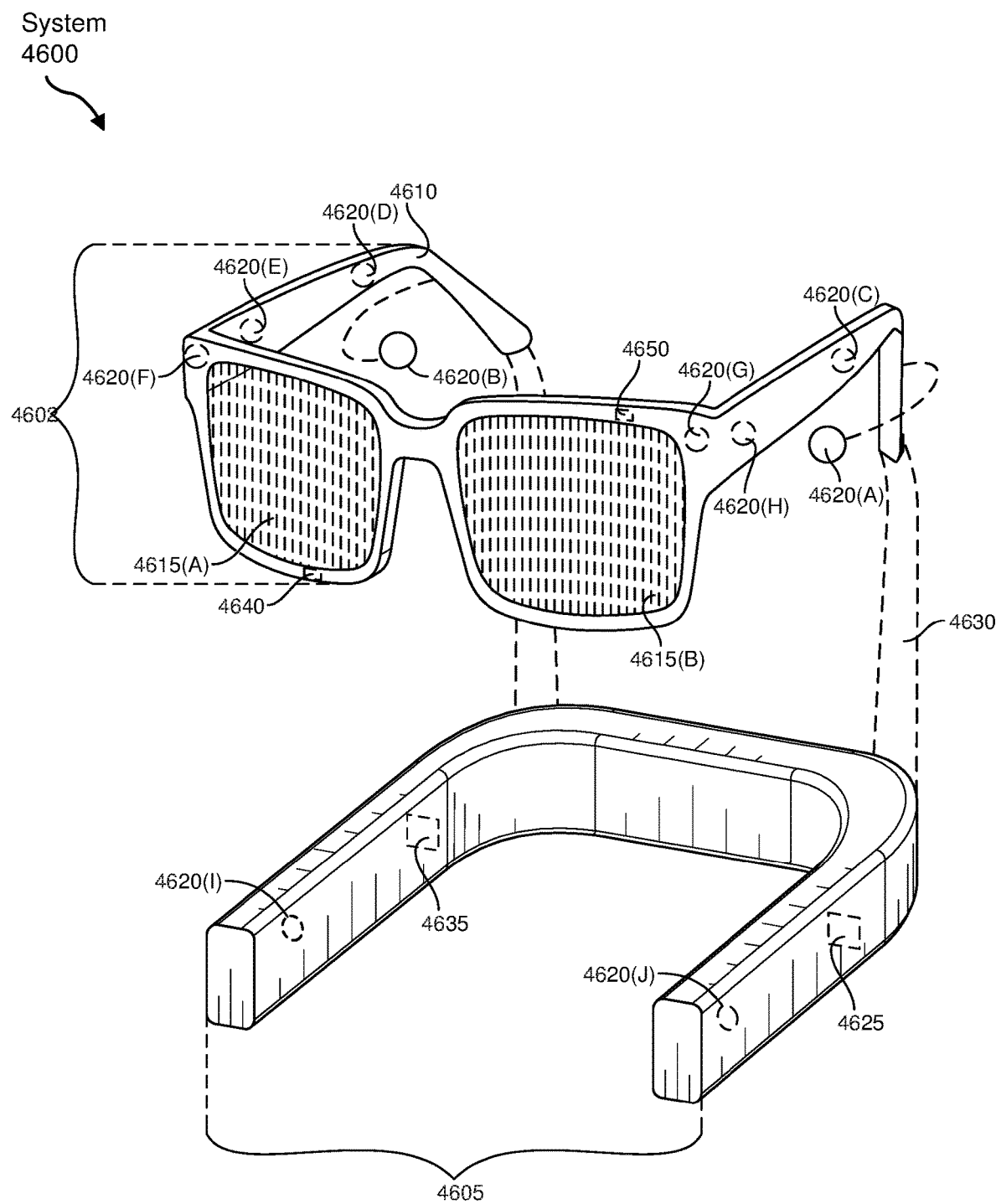
FIG. 46 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 46, augmented-reality system 4600 may include an eyewear device 4602 with a frame 4610 configured to hold a left display device 4615(A) and a right display device 4615(B) in front of a user's eyes. Display devices 4615(A) and 4615(B) may act together or independently to present an image or series of images to a user. While augmented-reality system 4600 includes two displays, embodiments of this disclosure may be implemented in augmented-reality systems with a single NED or more than two NEDs.

In some embodiments, augmented-reality system 4600 may include one or more sensors, such as sensor 4640. Sensor 4640 may generate measurement signals in response to motion of augmented-reality system 4600 and may be located on substantially any portion of frame 4610. Sensor 4640 may represent a position sensor, an inertial measurement unit (IMU), a depth camera assembly, or any combination thereof. In some embodiments, augmented-reality system 4600 may or may not include sensor 4640 or may include more than one sensor. In embodiments in which sensor 4640 includes an IMU, the IMU may generate calibration data based on measurement signals from sensor 4640. Examples of sensor 4640 may include, without limitation, accelerometers, gyroscopes, magnetometers, other suitable types of sensors that detect motion, sensors used for error correction of the IMU, or some combination thereof.

Augmented-reality system 4600 may also include a microphone array with a plurality of acoustic transducers 4620 (A)-4620(J), referred to collectively as acoustic transducers 4620. Acoustic transducers 4620 may be transducers that detect air pressure variations induced by sound waves. Each acoustic transducer 4620 may be configured to detect sound and convert the detected sound into an electronic format (e.g., an analog or digital format). The microphone array in FIG. 2 may include, for example, ten acoustic transducers: 4620(A) and 4620(B), which may be designed to be placed inside a corresponding ear of the user, acoustic transducers 4620(C), 4620(D), 4620(E), 4620(F), 4620(G), and 4620 (H), which may be positioned at various locations on frame 4610, and/or acoustic transducers 4620(I) and 4620(J), which may be positioned on a corresponding neckband 4605.

In some embodiments, one or more of acoustic transducers 4620(A)-(F) may be used as output transducers (e.g., speakers). For example, acoustic transducers 4620(A) and/ or 4620(B) may be earbuds or any other suitable type of headphone or speaker.

The configuration of acoustic transducers 4620 of the microphone array may vary. While augmented-reality system 4600 is shown in FIG. 46 as having ten acoustic transducers 4620, the number of acoustic transducers 4620 may be greater or less than ten. In some embodiments, using higher numbers of acoustic transducers 4620 may increase the amount of audio information collected and/or the sensitivity and accuracy of the audio information. In contrast, using a lower number of acoustic transducers 4620 may decrease the computing power required by an associated controller 4650 to process the collected audio information. In addition, the position of each acoustic transducer 4620 of the microphone array may vary. For example, the position of an acoustic transducer 4620 may include a defined position on the user, a defined coordinate on frame 4610, an orientation associated with each acoustic transducer 4620, or some combination thereof.

Acoustic transducers 4620(A) and 4620(B) may be positioned on different parts of the user's ear, such as behind the pinna or within the auricle or fossa. Or, there may be additional acoustic transducers 4620 on or surrounding the ear in addition to acoustic transducers 4620 inside the ear canal. Having an acoustic transducer 4620 positioned next to an ear canal of a user may enable the microphone array to collect information on how sounds arrive at the ear canal. By positioning at least two of acoustic transducers 4620 on either side of a user's head (e.g., as binaural microphones), augmented-reality device 4600 may simulate binaural hearing and capture a 3D stereo sound field around about a user's head. In some embodiments, acoustic transducers 4620(A) and 4620(B) may be connected to augmented-reality system 4600 via a wired connection 4630, and in other embodiments, acoustic transducers 4620(A) and 4620(B) may be connected to augmented-reality system 4600 via a wireless connection (e.g., a Bluetooth connection). In still other embodiments, acoustic transducers 4620(A) and 4620(B) may not be used at all in conjunction with augmented-reality system 4600.

Acoustic transducers 4620 on frame 4610 may be positioned along the length of the temples, across the bridge, above or below display devices 4615(A) and 4615(B), or some combination thereof. Acoustic transducers 4620 may be oriented such that the microphone array is able to detect sounds in a wide range of directions surrounding the user wearing the augmented-reality system 4600. In some embodiments, an optimization process may be performed during manufacturing of augmented-reality system 4600 to determine relative positioning of each acoustic transducer 4620 in the microphone array.

In some examples, augmented-reality system 4600 may include or be connected to an external device (e.g., a paired device), such as neckband 4605. Neckband 4605 generally represents any type or form of paired device. Thus, the following discussion of neckband 4605 may also apply to various other paired devices, such as charging cases, smart watches, smart phones, wrist bands, other wearable devices, hand-held controllers, tablet computers, laptop computers and other external compute devices, etc.

As shown, neckband 4605 may be coupled to eyewear device 4602 via one or more connectors. The connectors may be wired or wireless and may include electrical and/or non-electrical (e.g., structural) components. In some cases, eyewear device 4602 and neckband 4605 may operate independently without any wired or wireless connection between them. While FIG. 46 illustrates the components of eyewear device 4602 and neckband 4605 in example locations on eyewear device 4602 and neckband 4605, the components may be located elsewhere and/or distributed differently on eyewear device 4602 and/or neckband 4605. In some embodiments, the components of eyewear device 4602 and neckband 4605 may be located on one or more additional peripheral devices paired with eyewear device 4602, neckband 4605, or some combination thereof.

Pairing external devices, such as neckband 4605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 4600 may be provided by a paired device or shared between a paired device and an eyewear device, thus reducing the weight, heat profile, and form factor of the eyewear device overall while still retaining desired functionality. For example, neckband 4605 may allow components that would otherwise be included on an eyewear device to be included in neckband 4605 since users may tolerate a heavier weight load on their shoulders than they would tolerate on their heads. Neckband 4605 may also have a larger surface area over which to diffuse and disperse heat to the ambient environment. Thus, neckband 4605 may allow for greater battery and computation capacity than might otherwise have been possible on a stand-alone eyewear device. Since weight carried in neckband 4605 may be less invasive to a user than weight carried in eyewear device 4602, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 4605 may be communicatively coupled with eyewear device 4602 and/or to other devices. These other devices may provide certain functions (e.g., tracking, localizing, depth mapping, processing, storage, etc.) to augmented-reality system 4600. In the embodiment of FIG. 46, neckband 4605 may include two acoustic transducers (e.g., 4620(I) and 4620(J)) that are part of the microphone array (or potentially form their own microphone subarray). Neckband 4605 may also include a controller 4625 and a power source 4635.

Acoustic transducers 4620(I) and 4620(J) of neckband 4605 may be configured to detect sound and convert the detected sound into an electronic format (analog or digital). In the embodiment of FIG. 46, acoustic transducers 4620(I) and 4620(J) may be positioned on neckband 4605, thereby increasing the distance between the neckband acoustic transducers 4620(I) and 4620(J) and other acoustic transducers 4620 positioned on eyewear device 4602. In some cases, increasing the distance between acoustic transducers 4620 of the microphone array may improve the accuracy of beamforming performed via the microphone array. For example, if a sound is detected by acoustic transducers 4620(C) and 4620(D) and the distance between acoustic transducers 4620(C) and 4620(D) is greater than, e.g., the distance between acoustic transducers 4620(D) and 4620(E), the determined source location of the detected sound may be more accurate than if the sound had been detected by acoustic transducers 4620(D) and 4620(E).

Controller 4625 of neckband 4605 may process information generated by the sensors on neckband 4605 and/or augmented-reality system 4600. For example, controller 4625 may process information from the microphone array that describes sounds detected by the microphone array. For each detected sound, controller 4625 may perform a direction-of-arrival (DOA) estimation to estimate a direction from which the detected sound arrived at the microphone array. As the microphone array detects sounds, controller 4625 may populate an audio data set with the information.

In embodiments in which augmented-reality system 4600 includes an inertial measurement unit, controller 4625 may compute all inertial and spatial calculations from the IMU located on eyewear device 4602. A connector may convey information between augmented-reality system 4600 and neckband 4605 and between augmented-reality system 4600 and controller 4625. The information may be in the form of optical data, electrical data, wireless data, or any other transmittable data form. Moving the processing of information generated by augmented-reality system 4600 to neckband 4605 may reduce weight and heat in eyewear device 4602, making it more comfortable to the user.

Power source 4635 in neckband 4605 may provide power to eyewear device 4602 and/or to neckband 4605. Power source 4635 may include, without limitation, lithium ion batteries, lithium-polymer batteries, primary lithium batteries, alkaline batteries, or any other form of power storage. In some cases, power source 4635 may be a wired power source. Including power source 4635 on neckband 4605 instead of on eyewear device 4602 may help better distribute the weight and heat generated by power source 4635.

Figure 47:
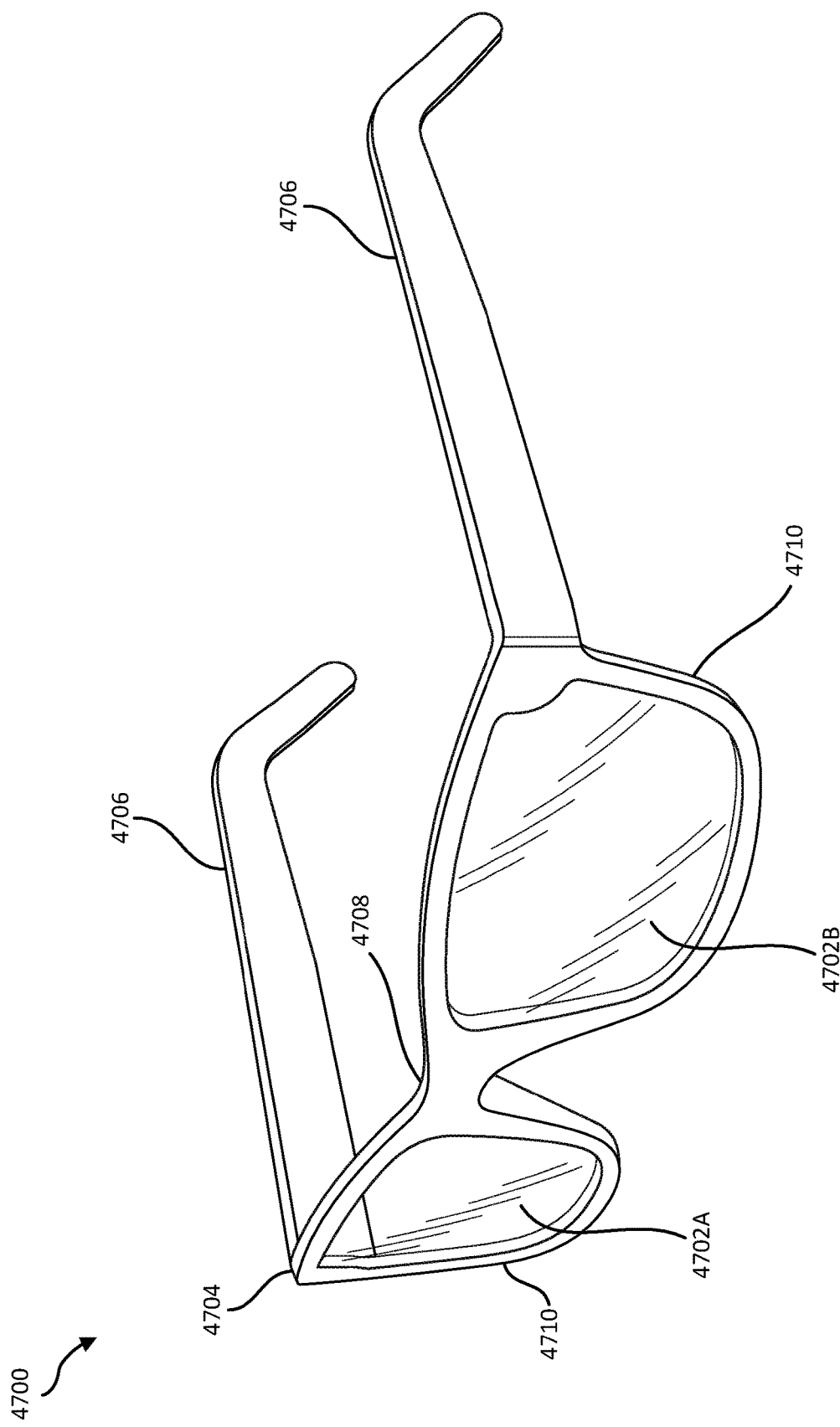
FIG. 47 is a perspective view of an exemplary head-mounted display device in accordance with some embodiments.

FIG. 47 is an illustration of a head-mounted display device 4700 according to some embodiments. The depicted embodiment includes a right near-eye display 4702A and a left near-eye display 4702B, which are collectively referred to as near-eye displays 4702. Near-eye displays 4702 may be transparent or semi-transparent lenses that include or utilize a display system (e.g., a projection display system) to present media to a user. Examples of media presented by near-eye displays 4702 include one or more images, a series of images (e.g., a video), audio, or some combination thereof. Near-eye displays 4702 may be configured to operate as an augmented-reality near-eye display, such that a user can see media projected by near-eye displays 4702 and see the real-world environment through near-eye displays 4702. However, in some embodiments, near-eye displays 4702 may be modified to also operate as virtual-reality near-eye displays, mixed-reality near-eye displays, or some combination thereof. Accordingly, in some embodiments, near-eye displays 4702 may augment views of a physical, real-world environment with computer-generated elements (e.g., images, video, sound, etc.).

As shown in FIG. 47, head-mounted display device 4700 may include a support or frame 4704 that secures near-eye displays 4702 in place on the head of a user, in embodiments in which near-eye displays 4702 includes separate left and right displays. In some embodiments, frame 4704 may be a frame of eye-wear glasses. Frame 4704 may include temples 4706 configured to rest on the top of and/or behind a user's ears, a bridge 4708 configured to rest on the top on the bridge of the user's nose, and rims 4710 sized and configured to rest on or against the user's cheeks. In various embodiments, any or all of the components of frame 4704 may include or integrate the curved batteries disclosed herein. Although not illustrated in FIG. 47, in some embodiments, head-mounted display device 4700 may include nose pads for resting on the bridge of the user's nose. Head-mounted-display device 4700 may additionally or alternatively include various other features and/or components, including, for example, directional speakers to provide audio to a user, bone conduction transducers for providing sound signals to a user via vibrational bone conduction in an auditory region of the user's head, tracking and/or recording cameras, passive and/or active front and/or rear facing cameras to capture images from the user's environment, eye tracking cameras, ambient light, night vision, and/or thermal imaging sensors, multimode connectivity antennas for wireless communication, audio microphones for capturing sound in the user's environment, lights for illuminating a user's environment, inertial, haptic, environmental, and/or health monitoring sensors, and/or any other suitable components, without limitation.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 4800 in FIG. 48, that mostly or completely covers a user's field of view. Virtual-reality system 4800 may include a front rigid body 4802 and a band 4804 shaped to fit around a user's head. Virtual-reality system 4800 may also include output audio transducers 4806(A) and 4806(B). Furthermore, while not shown in FIG. 48, front rigid body 4802 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 4600 and/or virtual-reality system 4800 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 4600 and/or virtual-reality system 4800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 4500, augmented-reality system 4600, and/or virtual-reality system 4800 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 45 and 48, output audio transducers 4508(A), 4508(B), 4806(A), and 4806(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 4510 may include condenser microphones, dynamic microphones, ribbon microphones, and/or any other type or form of input transducer. In some embodiments, a single transducer may be used for both audio input and audio output.

While not shown in FIGS. 45-48, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, artificial-reality systems 4500, 4600, and 4800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 49:
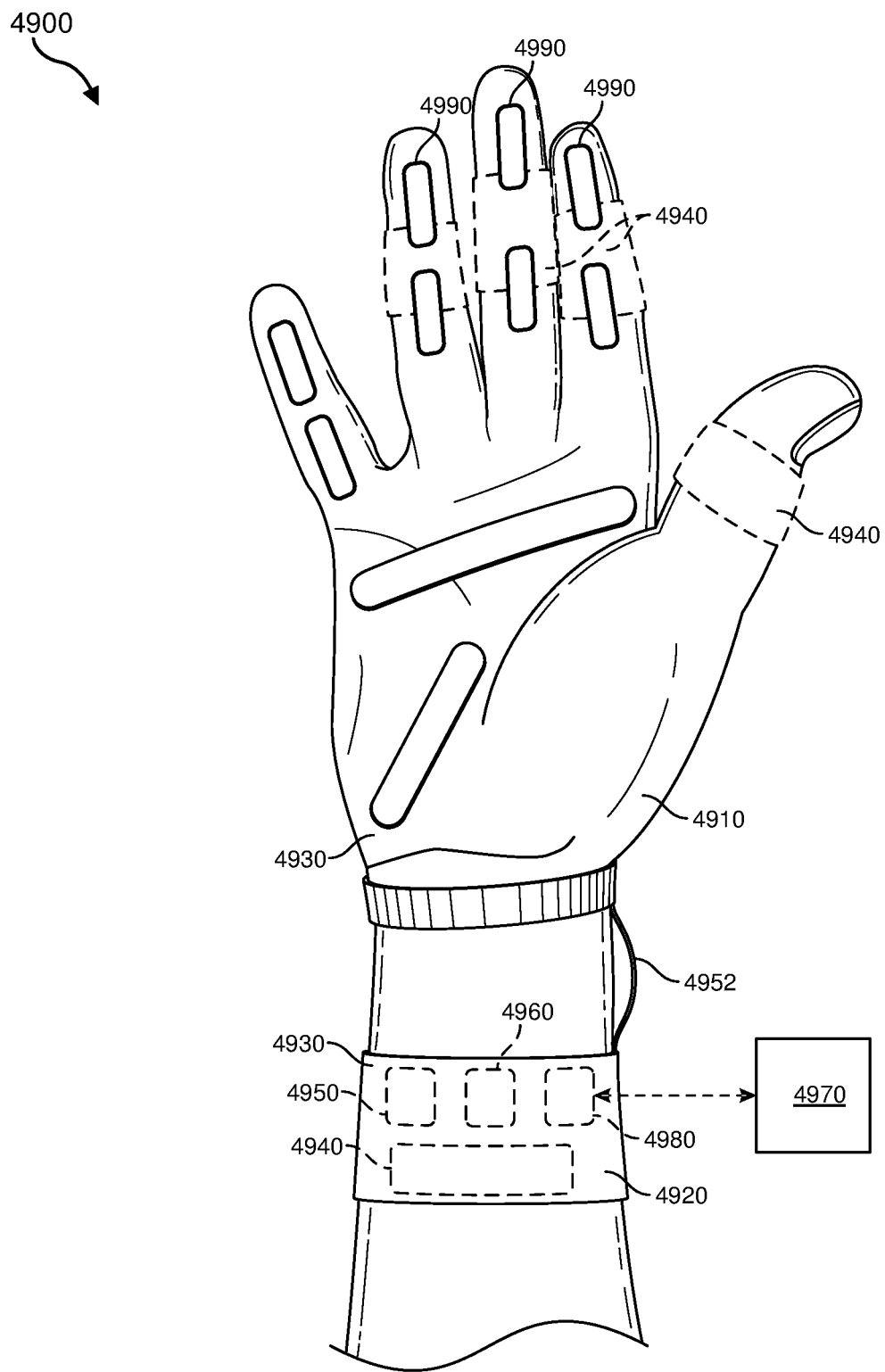
FIG. 49 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 49 illustrates a vibrotactile system 4900 in the form of a wearable glove (haptic device 4910) and wristband (haptic device 4920). Haptic device 4910 and haptic device 4920 are shown as examples of wearable devices that include a flexible, wearable textile material 4930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 4940 may be positioned at least partially within one or more corresponding pockets formed in textile material 4930 of vibrotactile system 4900. Vibrotactile devices 4940 may be positioned in locations to provide a vibrating sensation (e.g., haptic feedback) to a user of vibrotactile system 4900. For example, vibrotactile devices 4940 may be positioned against the user's finger(s), thumb, or wrist, as shown in FIG. 49. Vibrotactile devices 4940 may, in some examples, be sufficiently flexible to conform to or bend with the user's corresponding body part(s).

A power source 4950 (e.g., a battery) for applying a voltage to the vibrotactile devices 4940 for activation thereof may be electrically coupled to vibrotactile devices 4940, such as via conductive wiring 4952. In some examples, each of vibrotactile devices 4940 may be independently electrically coupled to power source 4950 for individual activation. In some embodiments, a processor 4960 may be operatively coupled to power source 4950 and configured (e.g., programmed) to control activation of vibrotactile devices 4940.

Vibrotactile system 4900 may be implemented in a variety of ways. In some examples, vibrotactile system 4900 may be a standalone system with integral subsystems and components for operation independent of other devices and systems. As another example, vibrotactile system 4900 may be configured for interaction with another device or system 4970. For example, vibrotactile system 4900 may, in some examples, include a communications interface 4980 for receiving and/or sending signals to the other device or system 4970. The other device or system 4970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 4980 may enable communications between vibrotactile system 4900 and the other device or system 4970 via a wireless (e.g., Wi-Fi, Bluetooth, cellular, radio, etc.) link or a wired link. If present, communications interface 4980 may be in communication with processor 4960, such as to provide a signal to processor 4960 to activate or deactivate one or more of the vibrotactile devices 4940.

Vibrotactile system 4900 may optionally include other subsystems and components, such as touch-sensitive pads 4990, pressure sensors, motion sensors, position sensors, lighting elements, and/or user interface elements (e.g., an on/off button, a vibration control element, etc.). During use, vibrotactile devices 4940 may be configured to be activated for a variety of different reasons, such as in response to the user's interaction with user interface elements, a signal from the motion or position sensors, a signal from the touch-sensitive pads 4990, a signal from the pressure sensors, a signal from the other device or system 4970, etc.

Although power source 4950, processor 4960, and communications interface 4980 are illustrated in FIG. 49 as being positioned in haptic device 4920, the present disclosure is not so limited. For example, one or more of power source 4950, processor 4960, or communications interface 4980 may be positioned within haptic device 4910 or within another wearable textile.

Figure 50:
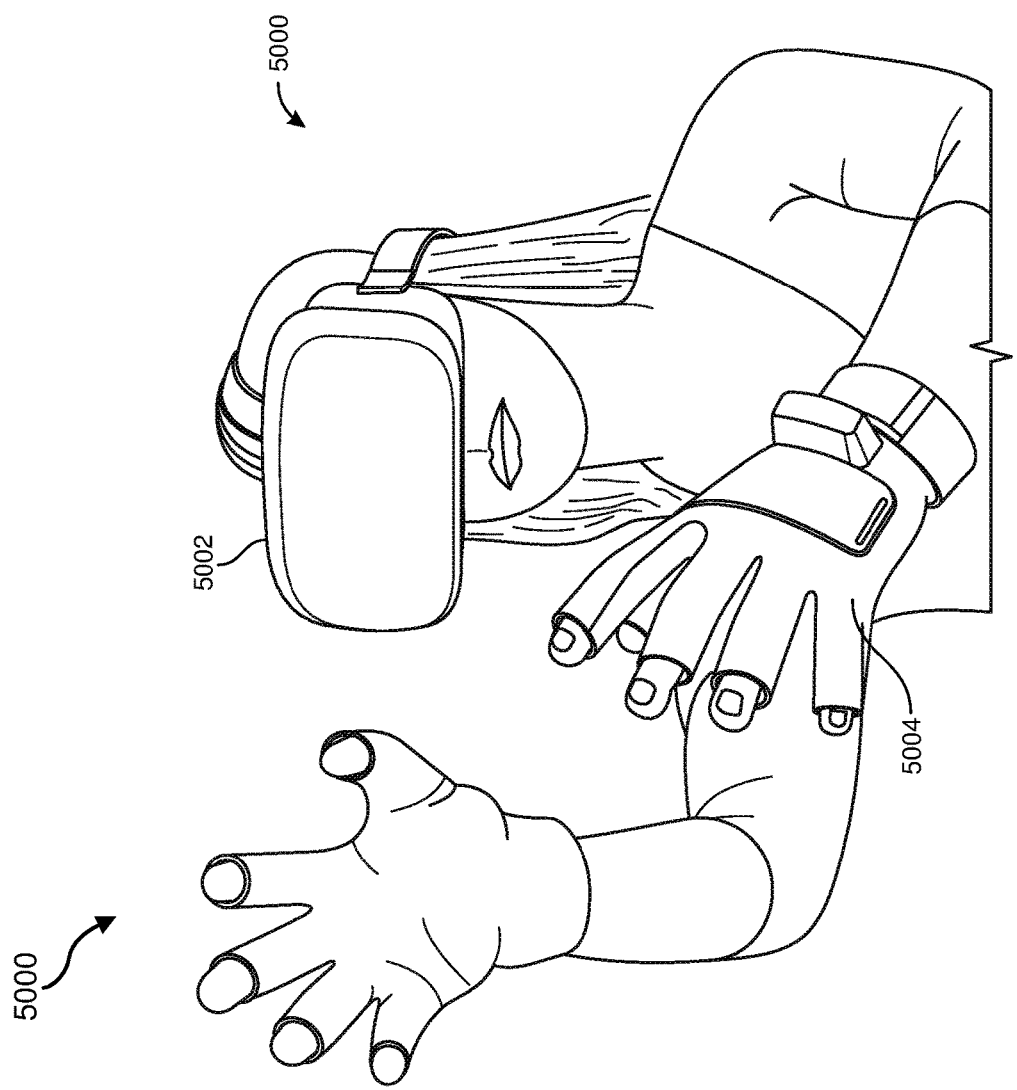
FIG. 50 is an illustration of an exemplary virtual-reality environment according to embodiments of this disclosure.

Haptic wearables, such as those shown in and described in connection with FIG. 49, may be implemented in a variety of types of artificial-reality systems and environments. FIG. 50 shows an example artificial-reality environment 5000 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 48:
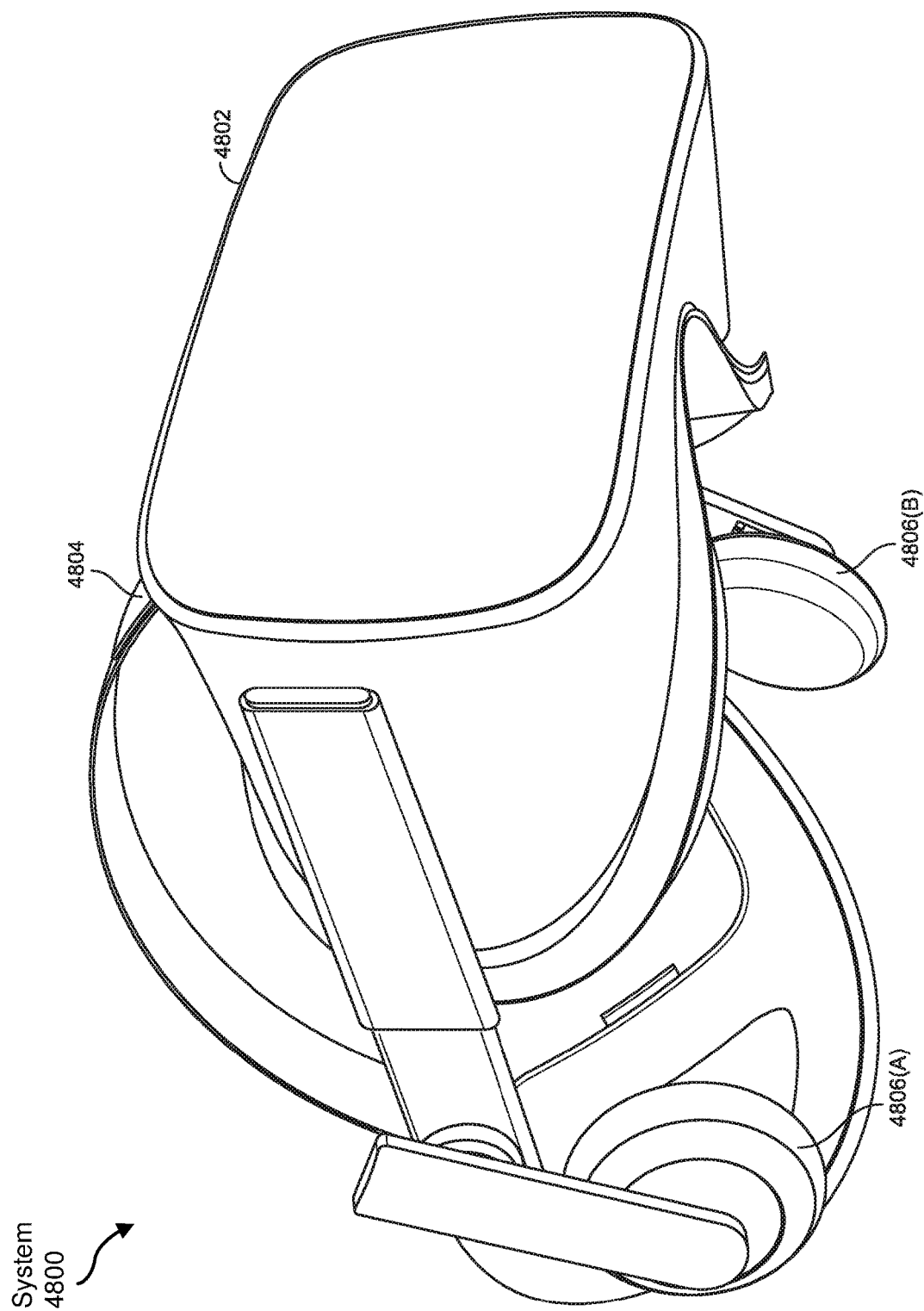
FIG. 48 is an illustration of an exemplary virtual-reality headset that may be used in connection with embodiments of this disclosure.

Head-mounted display 5002 generally represents any type or form of virtual-reality system, such as virtual-reality system 4800 in FIG. 48. Haptic device 5004 generally represents any type or form of wearable device, worn by a user of an artificial-reality system, that provides haptic feedback to the user to give the user the perception that he or she is physically engaging with a virtual object. In some embodiments, haptic device 5004 may provide haptic feedback by applying vibration, motion, and/or force to the user. For example, haptic device 5004 may limit or augment a user's movement. To give a specific example, haptic device 5004 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 5004 to send action requests to a console. Examples of action requests include, without limitation, requests to start an application and/or end the application and/or requests to perform a particular action within the application.

Figure 51:
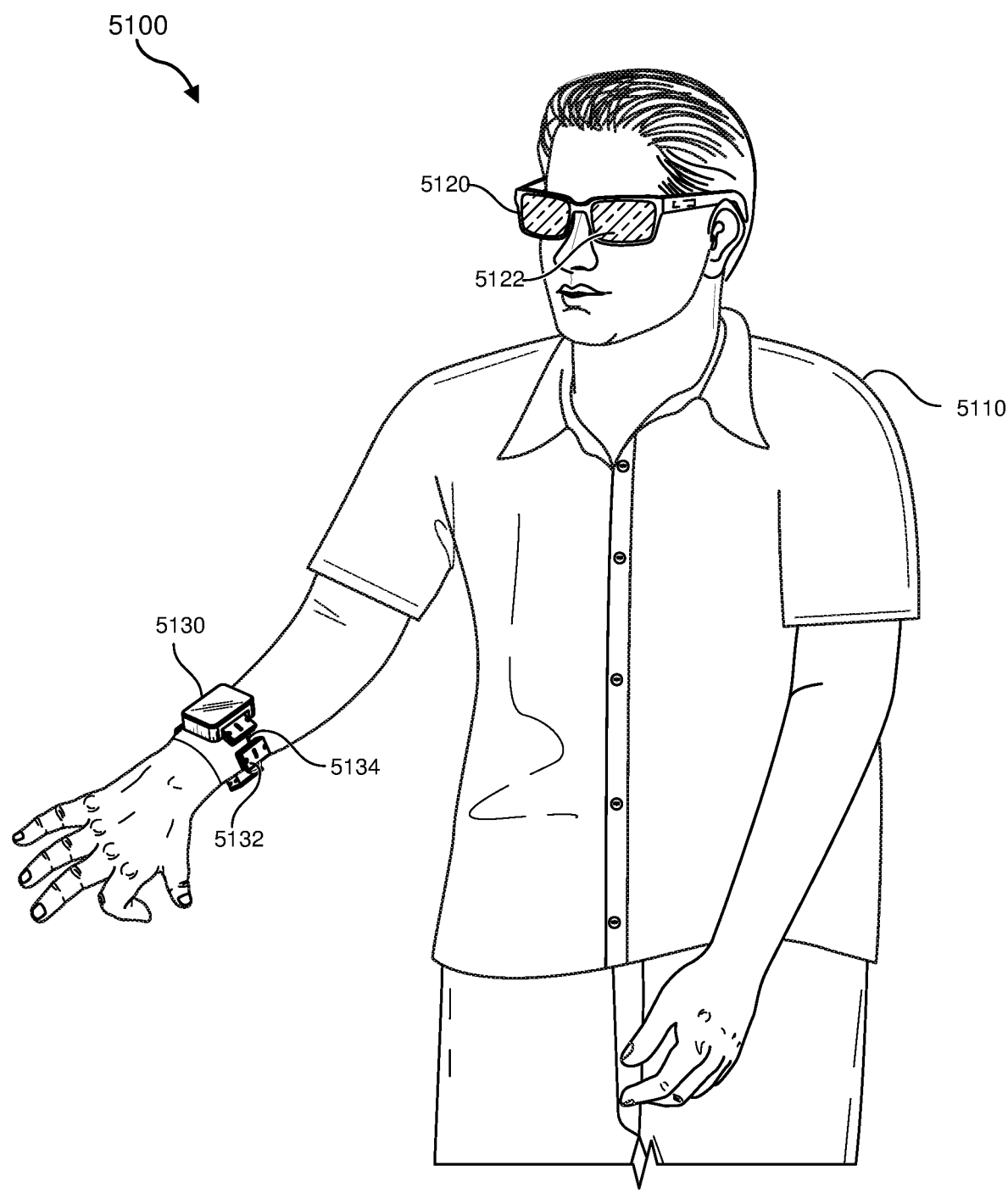
FIG. 51 is an illustration of an exemplary augmented-reality environment according to embodiments of this disclosure.

While haptic interfaces may be used with virtual-reality systems, as shown in FIG. 50, haptic interfaces may also be used with augmented-reality systems, as shown in FIG. 51. FIG. 51 is a perspective view of a user 5110 interacting with an augmented-reality system 5100. In this example, user 5110 may wear a pair of augmented-reality glasses 5120 that may have one or more displays 5122 and that are paired with a haptic device 5130. In this example, haptic device 5130 may be a wristband that includes a plurality of band elements 5132 and a tensioning mechanism 5134 that connects band elements 5132 to one another.

One or more of band elements 5132 may include any type or form of actuator suitable for providing haptic feedback. For example, one or more of band elements 5132 may be configured to provide one or more of various types of cutaneous feedback, including vibration, force, traction, texture, and/or temperature. To provide such feedback, band elements 5132 may include one or more of various types of actuators. In one example, each of band elements 5132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 4910, 4920, 5004, and 5130 may include any suitable number and/or type of haptic transducer, sensor, and/or feedback mechanism. For example, haptic devices 4910, 4920, 5004, and 5130 may include one or more mechanical transducers, piezoelectric transducers, and/or fluidic transducers. Haptic devices 4910, 4920, 5004, and 5130 may also include various combinations of different types and forms of transducers that work together or independently to enhance a user's artificial-reality experience. In one example, each of band elements 5132 of haptic device 5130 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

What is claimed is:

1. A wearable battery-pack accessory comprising:
   one or more curved batteries;
   charging circuitry that charges the one or more curved batteries;
   supplying circuitry that supplies power to a connected external computing device; and
   an outer housing comprising at least:

a first curved surface oriented to face away from a user when the wearable battery-pack accessory is worn by the user; and
a second curved surface oriented to face towards the user when the wearable battery-pack accessory is worn by the user, the second curved surface having a varying radius of curvature derived by:
measuring body contours of a plurality of individuals; and
constructing a model of a body based at least in part on an averaging of the body contours of the plurality of individuals, wherein:
the model of the body comprises one or more spline curves; and
the varying radius of curvature of the second curved surface substantially matches a varying radius of curvature of the one or more spline curves of the model of the body.

2. The wearable battery-pack accessory of claim 1, wherein the connected external computing device comprises a head-mounted display system.

3. The wearable battery-pack accessory of claim 2, wherein the one or more curved batteries comprise:
a top battery having a first spline surface curved to conform to a top side of the user's head;
a right battery having a second spline surface curved to conform to a right side of the user's head; or
a left battery having a third spline surface curved to conform to a left side of the user's head.

4. The wearable battery-pack accessory of claim 1, wherein:
the first curved surface of the outer housing has:
a first radius of curvature at a first point; and
a second radius of curvature at a second point;
the first radius of curvature differs from the second radius of curvature;
the second curved surface of the outer housing has:
a third radius of curvature at a third point; and
a fourth radius of curvature at a fourth point; and
the third radius of curvature differs from the fourth radius of curvature.

5. The wearable battery-pack accessory of claim 1, wherein each of the one or more curved batteries has an inner radius between 80 millimeters and 95 millimeters.

6. The wearable battery-pack accessory of claim 1, wherein each of the one or more curved batteries has an inner radius between 70 millimeters and 125 millimeters.

7. The wearable battery-pack accessory of claim 1, further comprising:
an input port for receiving power from an external power source; and
an output port for transmitting power to the connected external computing device, wherein the charging circuitry charges the one or more curved batteries using power from the external power source while the supplying circuitry supplies power to the connected external computing device.

8. The wearable battery-pack accessory of claim 1, further comprising an input/output port for receiving power from an external power source and transmitting power to the connected external computing device, wherein:
the charging circuitry charges the one or more curved batteries when the external power source is connected to the input/output port; and
the supplying circuitry supplies power to the connected external computing device when the connected external computing device is connected to the input/output port.

9. A head-mounted display system comprising:
a head-mounted display;
a strap that is coupled to the head-mounted display and wraps around the back of a user's head when the user is wearing the head-mounted display; and
a battery-pack accessory detachably coupled to the strap, the battery-pack accessory comprising:
one or more curved batteries;
charging circuitry that charges the one or more curved batteries;
supplying circuitry that supplies power to the head-mounted display; and
an outer housing comprising at least:
a first curved surface oriented to face away from the user when the battery-pack accessory is worn by the user; and
a second curved surface oriented to face towards the user when the battery-pack accessory is worn by the user, the second curved surface having a varying radius of curvature derived by:
measuring head contours of a plurality of individuals; and
constructing a model of a head based at least in part on an averaging of the head contours of the plurality of individuals, wherein:
the model of the head comprises one or more spline curves; and
the varying radius of curvature of the second curved surface substantially matches a varying radius of curvature of the one or more spline curves of the model of the head.

10. The head-mounted display system of claim 9, wherein:
the strap comprises an adjustment mechanism for adjusting a size of the strap;
the adjustment mechanism comprises a dial;
the outer housing of the battery-pack accessory comprises a notch that exposes the dial when the battery-pack accessory is coupled to the strap.

11. The head-mounted display system of claim 9, wherein the outer housing of the battery-pack accessory comprises an interface for coupling the battery-pack accessory, via a friction fit, to the strap of the head-mounted display system.

12. The head-mounted display system of claim 9, wherein:
the one or more curved batteries comprise:
a top battery curved to conform to a top side of the user's head;
a right battery curved to conform to a right side of the user's head; or
a left battery curved to conform to a left side of the user's head; and
at least one of the one or more curved batteries has a varying radius of curvature.

13. The head-mounted display system of claim 9, wherein each of the one or more curved batteries has an inner radius between 80 millimeters and 95 millimeters.

14. The head-mounted display system of claim 9, wherein each of the one or more curved batteries has an inner radius between 70 millimeters and 125 millimeters.

15. The head-mounted display system of claim 9, wherein the battery-pack accessory further comprises:
an input port for receiving power from an external power source; and
an output port for transmitting power to the head-mounted display, wherein the charging circuitry charges the one or more curved batteries using power from the external power source while the supplying circuitry supplies power to the head-mounted display.

16. A method comprising:

measuring body contours of a plurality of individuals;

constructing a model of a body based at least in part on an averaging of the body contours of the plurality of individuals, wherein the model of the body comprises one or more spline curves;

providing a curved battery;

coupling the curved battery to charging circuitry that charges the curved battery;

coupling the curved battery to supplying circuitry that supplies power to an external computing device; and placing the curved battery, the charging circuitry, and the supplying circuitry within an outer housing of a battery-pack accessory, the outer housing comprising at least:
- a first curved surface oriented to face away from a user when the battery-pack accessory is worn by the user; and
- a second curved surface oriented to face towards the user when the battery-pack accessory is worn by the user, the second curved surface having a varying radius of curvature substantially matching a varying radius of curvature of the one or more spline curves of the model of the body.

17. The method of claim 16, wherein providing the curved battery comprises:

placing a flat electrode assembly of the curved battery between spline surfaces of an upper jig and a lower jig;

curving the flat electrode assembly by pressing the flat electrode assembly between the spline surfaces of the upper jig and the lower jig;

separating the upper jig from the lower jig; and removing the curved electrode assembly from the upper jig and the lower jig.

18. The wearable battery-pack accessory of claim 1, wherein:

the one or more spline curves of the model of the body are defined by at least:
- a starting point;
- an ending point;
- a midpoint;
- a first radius at the starting point;
- a second radius at the ending point; and
- a third radius at the midpoint; and the first radius, the second radius, and the third radius are different.

19. The wearable battery-pack accessory of claim 1, wherein the one or more spline curves of the model of the body are defined by at least:
- a first curve segment having a continuously varying radius of curvature; and
- a second curve segment having a constant radius of curvature.

20. The wearable battery-pack accessory of claim 1, wherein the one or more spline curves of the model of the body are defined by multiple control points.

* * * * *